US012812071B2

(12) United States Patent
Sakata et al.

(10) Patent No.: US 12,812,071 B2
(45) Date of Patent: Nov. 24, 2026

(54) GATE SYSTEM, GATE DEVICE CONTROLLING METHOD, AND NON-TRANSITORY COMPUTER READABLE MEDIUM STORING CONTROL PROGRAM OF GATE DEVICE

(71) Applicant: PANASONIC INTELLECTUAL PROPERTY MANAGEMENT CO., LTD., Osaka (JP)

(72) Inventors: Yoshifumi Sakata, Kanagawa (JP); Yoshinobu Uno, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 15 days.

(21) Appl. No.: 19/040,099

(22) Filed: Jan. 29, 2025

(65) Prior Publication Data

US 2025/0175581 A1 May 29, 2025

Related U.S. Application Data

(63) Continuation of application No. PCT/JP2023/022451, filed on Jun. 16, 2023.

(30) Foreign Application Priority Data

Jul. 29, 2022 (JP) ................................ 2022-121914

(51) Int. Cl.
*H04N 7/18* (2006.01)
*G06V 10/98* (2022.01)
(Continued)

(52) U.S. Cl.
CPC ........... *H04N 7/181* (2013.01); *G06V 10/993* (2022.01); *G06V 20/53* (2022.01); *G06V 40/161* (2022.01); *G07C 9/10* (2020.01)

(58) Field of Classification Search
CPC ........ H04N 7/181; G07C 9/10; G06V 40/161; G06V 10/993; G06V 20/53
See application file for complete search history.

(56) References Cited

U.S. PATENT DOCUMENTS 10,887,553 B2 * 1/2021 Tsukahara ............ G06V 40/161
11,450,186 B2 * 9/2022 Kamio .................. G06V 20/52
(Continued)

FOREIGN PATENT DOCUMENTS

JP 2007-148987 A 6/2007
JP 2008-085874 A 4/2008
(Continued)

OTHER PUBLICATIONS

International Search Report issued in WIPO Patent Application No. PCT/JP2023/022451, dated Aug. 29, 2023, along with an English translation thereof.

*Primary Examiner* — Sunghyoun Park
(74) *Attorney, Agent, or Firm* — GREENBLUM & BERNSTEIN, P.L.C.

(57) ABSTRACT

There is provided a gate system including: a first image capturing device capable of capturing an image of a face of a person moving in a first direction; a second image capturing device capable of capturing an image of a face of a person moving in a second direction; a first display device having a screen visible to the person moving in the first direction; and a second display device having a screen visible to the person moving in the second direction, each of the first image capturing device and the second image capturing device captures a face image of the person moving through a passage, the first display device displays a collation result of the face image of the person moving in the first direction, and the second display device displays a collation result of the face image of the person moving in the second direction.

16 Claims, 33 Drawing Sheets

(51) Int. Cl.

| | |
|---|---|
| ***G06V 20/52*** | (2022.01) |
| ***G06V 40/16*** | (2022.01) |
| ***G07C 9/10*** | (2020.01) |

(56) References Cited

U.S. PATENT DOCUMENTS

| | | | | |
|---|---|---|---|---|
| 2005/0078184 | A1* | 4/2005 | Sakai | G08B 13/19643 348/143 |
| 2007/0122011 | A1 | 5/2007 | Takizawa | |
| 2011/0277518 | A1* | 11/2011 | Lais | G07C 9/10 340/5.83 |
| 2013/0050502 | A1 | 2/2013 | Saito et al. | |
| 2016/0224824 | A1* | 8/2016 | Yamada | G06V 40/168 |
| 2016/0307597 | A1* | 10/2016 | Koide | G06V 40/161 |
| 2018/0300557 | A1* | 10/2018 | Rodenas | G06V 20/40 |
| 2018/0342067 | A1 | 11/2018 | Saito et al. | |
| 2020/0014847 | A1* | 1/2020 | Ito | G06T 5/77 |
| 2020/0118368 | A1 | 4/2020 | Tagawa et al. | |
| 2021/0081649 | A1* | 3/2021 | Kochi | G06T 7/0014 |
| 2022/0005302 | A1 | 1/2022 | Tagawa et al. | |
| 2022/0139087 | A1 | 5/2022 | Nakamura et al. | |
| 2022/0237970 | A1 | 7/2022 | Hirasawa et al. | |
| 2022/0351559 | A1 | 11/2022 | Yamaoka et al. | |
| 2024/0054834 | A1 | 2/2024 | Kubota | |

FOREIGN PATENT DOCUMENTS

| | | | |
|---|---|---|---|
| JP | 2010-161573 | A | 7/2010 |
| JP | 2010-262326 | A | 11/2010 |
| JP | 2014-219704 | A | 11/2014 |
| JP | 2016-014936 | A | 1/2016 |
| JP | 2020-205001 | A | 12/2020 |
| JP | 2022-040173 | A | 3/2022 |
| JP | 2022-090301 | A | 6/2022 |
| JP | 2022-136702 | A | 9/2022 |
| KR | 10-2012-0120499 | A | 11/2012 |
| WO | 2020/179730 | A1 | 9/2020 |
| WO | WO2022/003786 | A1 | 1/2022 |

* cited by examiner

FIG. 14

| ZONE TYPE | FACE IMAGE | PATTERN | COLLATION STATE | DISPLAY MESSAGE | DISPLAY IMAGE | OUTPUT SOUND |
|---|---|---|---|---|---|---|
| OUTSIDE OF ZONES | – | | – | – | – | – |
| COLLATION ZONE | PRESENCE | A0 | DURING COLLATION | DURING COLLATION | FACE IMAGE | – |
| | | A1 | SUCCESSFULLY COLLATED | SUCCESSFULLY COLLATED | FACE IMAGE | COLLATION SUCCESS SOUND |
| | | A2 | UNSUCCESSFULLY COLLATED | UNSUCCESSFULLY COLLATED | FACE IMAGE | COLLATION FAILURE SOUND |
| | ABSENCE (BODY IMAGE IS PRESENT) | A3 | – | WARNING | BODY IMAGE | WARNING SOUND |
| PASSING DETERMINATION ZONE | PRESENCE | A4 | DURING COLLATION | DURING COLLATION | FACE IMAGE | – |
| | | A5 | SUCCESSFULLY COLLATED | PASSING | FACE IMAGE | PASSING SOUND |
| | | A6 | UNSUCCESSFULLY COLLATED | UNAUTHORIZED PASSING | FACE IMAGE | UNAUTHORIZED PASSING SOUND |
| | ABSENCE (BODY IMAGE IS PRESENT) | A7 | – | UNAUTHORIZED PASSING | BODY IMAGE | UNAUTHORIZED PASSING SOUND |

SECOND EXAMPLE OF FACE COLLATION RESULT INFORMATION PROCESS IN MANAGEMENT DEVICE

GATE SYSTEM, GATE DEVICE CONTROLLING METHOD, AND NON-TRANSITORY COMPUTER READABLE MEDIUM STORING CONTROL PROGRAM OF GATE DEVICE

CROSS-REFERENCE TO RELATED APPLICATIONS

The present application is a continuation application of PCT/JP2023/022451 that claims priority to Japanese Patent Application No. 2022-121914 filed on Jul. 29, 2022, the entire content of which is incorporated herein by reference.

TECHNICAL FIELD

The present disclosure relates to a gate system, a gate device controlling method, and a control program of a gate device.

BACKGROUND ART

JP2008-085874A discloses a person monitoring system in which a plurality of imaging devices are provided in a predetermined area, and each of the imaging devices collates a plurality of subjects present in a monitoring area capable of being captured, and displays a result of the collation to an administrator in real time.

In an operation of displaying a collation result, for example, it is conceivable to show a collation result of a passerby entering and exiting a facility or the like to the passerby, but this is not taken into consideration in the above technique in view of entrance and exit and in view of displaying the collation result to the passerby. Further, when a plurality of imaging devices are installed in order to monitor a predetermined area as in the above technique, depending on a facial orientation and a movement direction of a subject, there may be an imaging device capable of acquiring a face image of the subject and an imaging device incapable of acquiring a face image. For example, it is assumed that the predetermined area is a passage area for allowing passersby to enter and exit a facility or the like, an imaging device for collating a passerby who enters is provided on the entrance side, and an imaging device for collating a passerby who exits is provided on the exit side. In the passage area, two-way passage (the entrance and exit) is possible, when an image pickup capable range of the imaging device installed on the entrance side and an image pickup capable range of the imaging device installed on the exit side overlap each other, a face image of a passerby cannot be acquired by the imaging device installed on the opposite side to a traveling direction of the passerby, and thus the possibility is considered that as a collation result, an error message such as unauthorized passing or the back of the passerby may be displayed on a display device installed on the opposite side to the traveling direction of the passerby. In this case, the possibility that the passerby confirms the collation result is low, the display of the collation result is useless in the operation of a collation system, and the display causes unnecessary perturbation to a person who is moving in the opposite direction to the passerby. Therefore, it is desirable to determine the traveling direction of the passerby and appropriately display the collation result of the passerby on a display device installed in a direction in which the passerby moves.

SUMMARY OF INVENTION

The present disclosure provides a technique capable of allowing a person who enters or exits to visually confirm a collation result and restraining occurrence of congestion.

One aspect of the present disclosure provides a gate system that includes a first image capturing device capable of capturing an image of a face of a person who moves in a first direction within a predetermined area of a passage; a second image capturing device capable of capturing an image of a face of a person who moves in a second direction opposite to the first direction within the predetermined area of the passage; a first display device having a screen which is visible to the person moving in the first direction; and a second display device having a screen which is visible to the person moving in the second direction, in which each of the first image capturing device and the second image capturing device captures a face image of the person moving through the passage, the first display device displays a collation result of the face image of the person moving in the first direction and does not display a collation result of the face image of the person moving in the second direction, and the second display device displays the collation result of the face image of the person moving in the second direction and does not display the collation result of the face image of the person moving in the first direction.

One aspect of the present disclosure provides a gate device controlling method, a gate device includes a first image capturing device capable of capturing an image of a face of a person who moves in a first direction within a predetermined area of a passage, a second image capturing device capable of capturing an image of a face of a person who moves in a second direction opposite to the first direction within the predetermined area of the passage, a first display device having a screen which is visible to the person moving in the first direction, and a second display device having a screen which is visible to the person moving in the second direction, each of the first image capturing device and the second image capturing device captures a face image of the person moving through the passage, the first display device displays a collation result of the face image of the person moving in the first direction and does not display a collation result of the face image of the person moving in the second direction, and the second display device displays the collation result of the face image of the person moving in the second direction and does not display the collation result of the face image of the person moving in the first direction.

One aspect of the present disclosure provides a control program of a gate device, the gate device includes a first image capturing device capable of capturing an image of a face of a person who moves in a first direction within a predetermined area of a passage, a second image capturing device capable of capturing an image of a face of a person who moves in a second direction opposite to the first direction within the predetermined area of the passage, a first display device having a screen which is visible to the person moving in the first direction, and a second display device having a screen which is visible to the person moving in the second direction, the control program is executed so that the gate device causes each of the first image capturing device and the second image capturing device to capture a face image of the person moving through the passage, causes the first display device to display a collation result of the face image of the person moving in the first direction and not display a collation result of the face image of the person moving in the second direction, and causes the second display device to display the collation result of the face image of the person moving in the second direction and not display the collation result of the face image of the person moving in the first direction.

These comprehensive or specific aspects may be implemented by a system, a device, a method, an integrated circuit, a computer program, or a recording medium, or any combination of the system, the device, the method, the integrated circuit, the computer program, and the recording medium.

According to the present disclosure, it is possible to allow a person who enters or exits to visually confirm a collation result and restrain occurrence of congestion.

BRIEF DESCRIPTION OF DRAWINGS

FIG. 14 is a diagram for illustrating examples of a display pattern on the first display device according to Embodiment 1;

DESCRIPTION OF EMBODIMENTS

Hereinafter, embodiments of the present disclosure will be described in detail with reference to the drawings as appropriate. However, unnecessarily detailed description may be omitted. For example, detailed description of already well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Embodiment 1

Overview of Gate System

Figure 1:
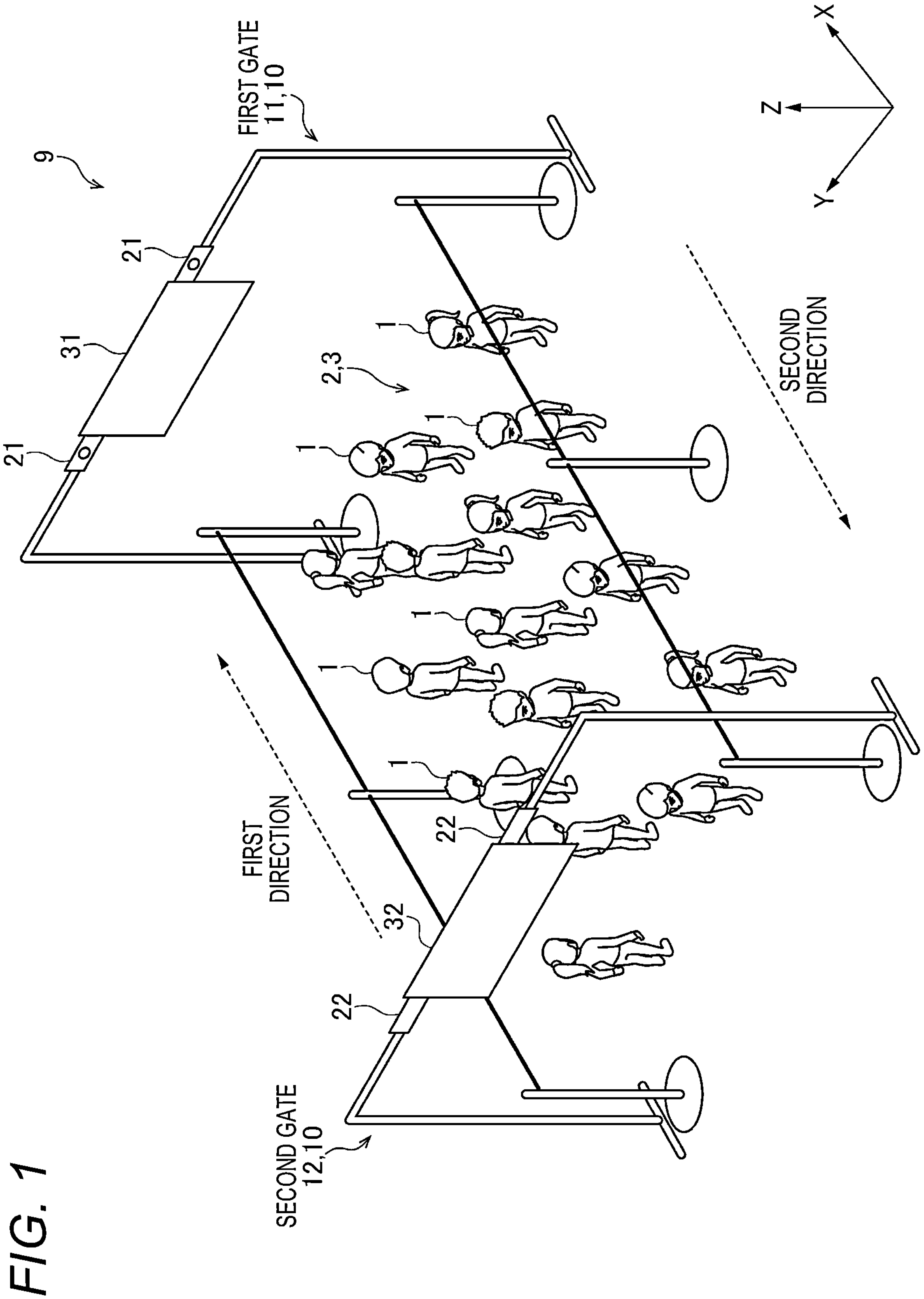
FIG. 1 is a diagram for illustrating an overview of a gate system according to Embodiment 1.
Figure 2:
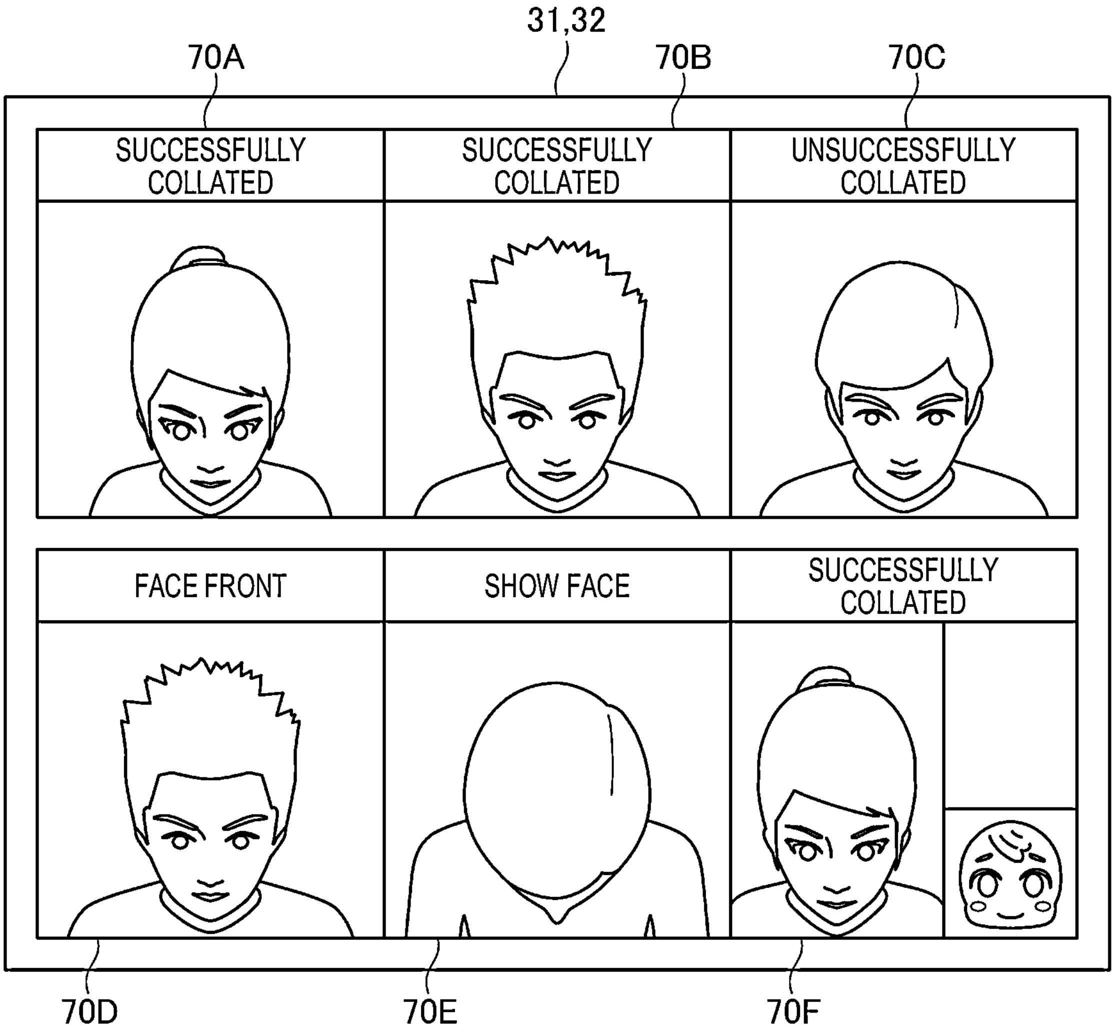
FIG. 2 is a diagram showing a display example of a collation result on a first display device or a second display device according to Embodiment 1.

FIG. 1 is a diagram for illustrating an overview of a gate system 9 according to Embodiment 1. FIG. 2 is a diagram showing a display example of a collation result on a first display device 31 or a second display device 32 according to Embodiment 1.

The gate system 9 is a system that collates a face image of each person 1 and determines whether the person 1 has a right to pass through a gate. The gate system 9 includes a first gate 11 and a second gate 12. The first gate 11 and the second gate 12 are installed at a predetermined distance in a passage 2 through which the persons 1 move. In the present embodiment, a direction from the second gate 12 to the first gate 11 is defined as a first direction, and a direction from the first gate 11 to the second gate 12 is defined as a second direction. In the present embodiment, an area between the first gate 11 and the second gate 12 in the passage 2 is referred to as a person detection area 3. The gate system 9 does not necessarily need to include the first gate 11 and the second gate 12 through which the persons pass downward as shown in FIG. 1, and may have a configuration shown in FIG. 31 to be described later. In this case, the gate system 9 may set a virtual first line instead of the first gate 11, set a virtual second line instead of the second gate 12, and set an area between the first line and the second line as the detection area 3. Further, a direction from the first line to the second line may be defined as the first direction, and a direction from the second line to the first line may be defined as the second direction. Therefore, in the following description, the first gate 11 may be described as the first line, and the second gate 12 may be described as the second line.

In the present embodiment, for convenience of description, an axis along the first direction or the second direction is referred to as an X-axis, an axis orthogonal to the X-axis and extending in a height direction is referred to as a Z-axis, and an axis orthogonal to the X-axis and the Z-axis is referred to as a Y-axis.

The first gate 11 includes first image capturing devices 21 each capable of capturing an image of at least a part of the detection area 3, and the first display device 31 having a screen facing in a direction of the second gate 12. Although the first gate 11 includes two first image capturing devices 21 in FIG. 1, the first gate 11 may include one first image capturing device 21 or may include three or more first image capturing devices 21. Although the first gate 11 includes one first display device 31 in FIG. 1, the first gate 11 may include two or more first display devices 31.

The second gate 12 includes second image capturing devices 22 each capable of capturing an image of at least a part of the detection area 3, and the second display device 32 having a screen facing in a direction of the first gate 11. Although the second gate 12 includes two second image capturing devices 22 in FIG. 1, the second gate 12 may include one second image capturing device 22 or may include three or more second image capturing devices 22. Although the second gate 12 includes one second display device 32 in FIG. 1, the second gate 12 may include two or more second display devices 32.

In the present embodiment, it is assumed that the first direction is an entrance direction to a facility or the like having a right to control entrance and exit and the second direction is an exit direction from the facility or the like. However, the first direction may be the exit direction from the facility or the like, and the second direction may be the entrance direction to the facility or the like.

The gate system 9 collates the face images of the persons 1 moving in the first direction, which are captured by the first image capturing devices 21 of the first gate 11, with collation face images registered in advance, and displays collation results on the first display device 31 as shown in FIG. 2.

The gate system 9 collates the face images of the persons 1 moving in the second direction, which are captured by the second image capturing devices 22 of the second gate 12, with the collation face images registered in advance, and displays collation results on the second display device 32 as shown in FIG. 2.

A gate width of each of the first gate 11 and the second gate 12 or a width of the detection area 3 in a Y direction may be a width by which a plurality of persons 1 can pass side by side. Accordingly, the gate system 9 according to the present embodiment can allow a plurality of persons 1 to enter and exit more smoothly than a gate system having a gate width by which only one person can pass. For example, in the case of the gate system having the gate width for one person, when the collation of the person 1 in front fails, a large number of subsequent persons 1 stop to wait. However, in the case of the gate system 9 having the gate width by which a plurality of persons 1 can pass side by side as in the present embodiment, even when the collation of the person 1 in front fails, a large number of subsequent persons 1 only need to move while avoiding the person 1 in front who fails in the collation, and thus the persons 1 can smoothly pass through the gate without stopping to wait. That is, the gate system 9 according to the present embodiment can restrain occurrence of congestion at the time of entering and exiting the facility or the like. Hereinafter, the gate system 9 according to the present embodiment will be described in detail.

Configuration of Gate System

Figure 3:
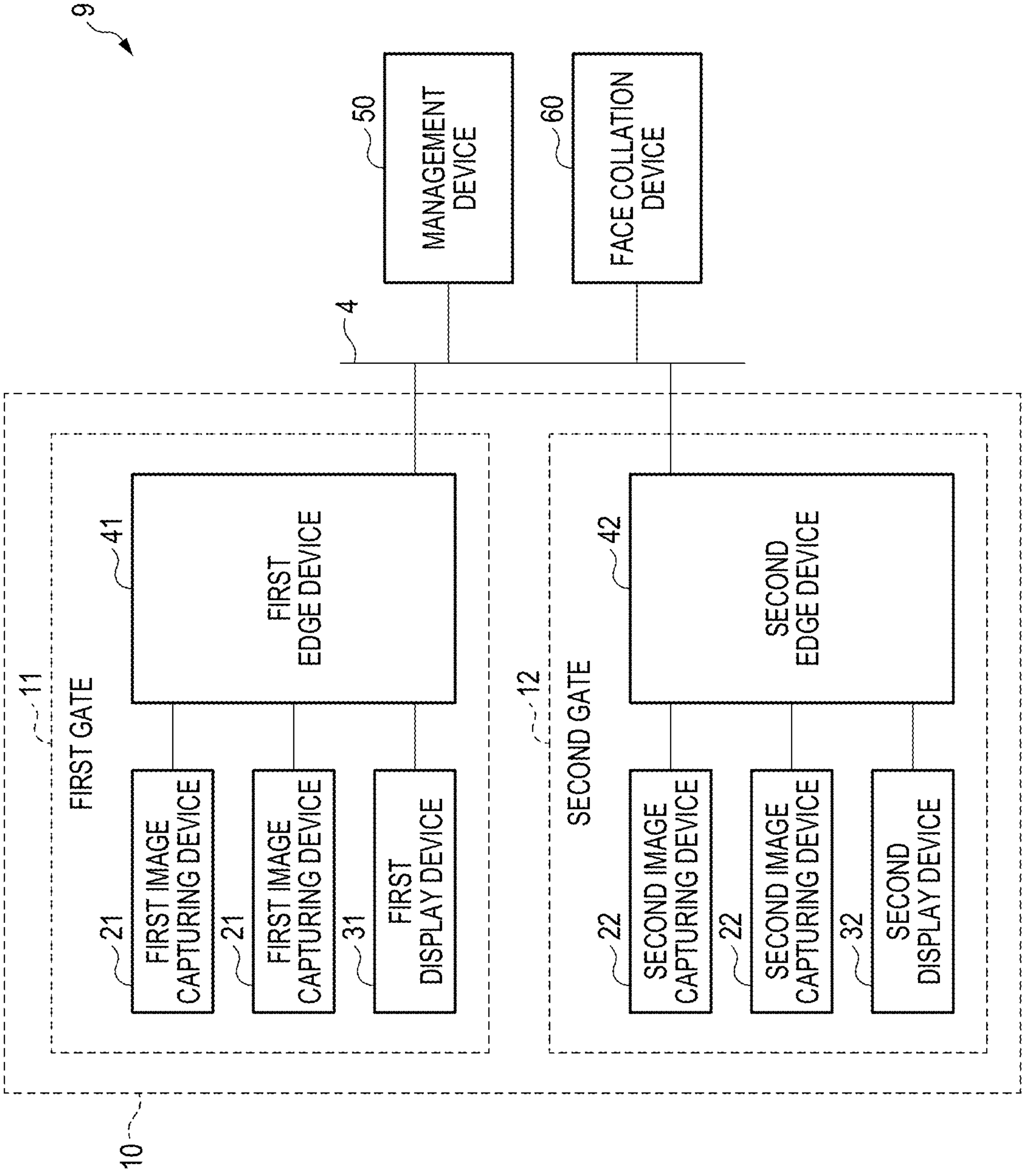
FIG. 3 is a block diagram showing a configuration example of the gate system according to Embodiment 1.
Figure 4A:
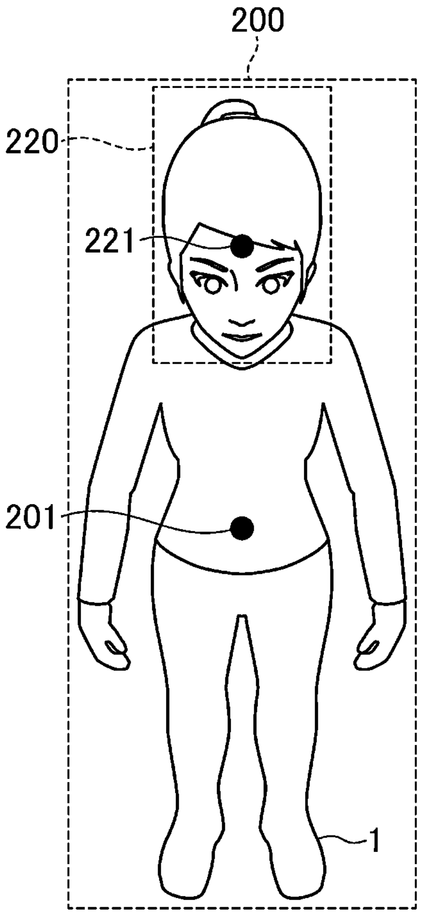
FIGS. 4A and 4B are a diagram for illustrating a face image and a body image according to Embodiment 1.
Figure 4B:
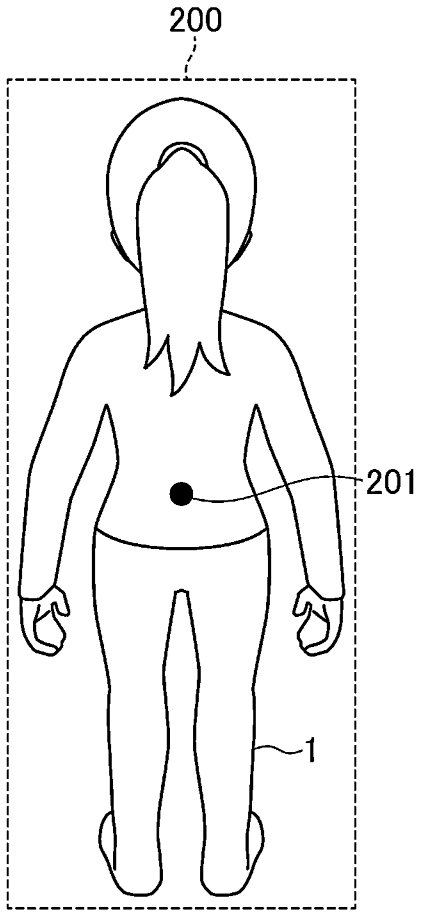

FIG. 3 is a block diagram showing a configuration example of the gate system 9 according to Embodiment 1. FIGS. 4A and 4B are a diagram for illustrating the face image and a body image according to Embodiment 1.

The gate system 9 includes the first gate 11 and the second gate 12. The first gate 11 includes the first image capturing devices 21 and the first display device 31. The second gate 12 includes the second image capturing devices 22 and the second display device 32. The first gate 11, the first image capturing devices 21, the first display device 31, the second gate 12, the second image capturing devices 22, and the second display device 32 may be collectively referred to as a gate device 10.

The gate system 9 further includes a first edge device 41, a second edge device 42, a management device 50, and a face collation device 60. Each first image capturing device 21 is connected to the first edge device 41 via an electrical cable (for example, a USB cable or an Ethernet (registered trademark) cable). The first display device 31 is connected to the first edge device 41 via an electrical cable (for example, an HDMI (registered trademark) cable). Each second image capturing device 22 is connected to the second edge device 42 via an electrical cable (for example, a USB cable or an Ethernet cable). The second display device 32 is connected to the second edge device 42 via an electrical cable (for example, an HDMI (registered trademark) cable). The first edge device 41 and the second edge device 42 are connected to the management device 50 via a communication network 4. The management device 50 is connected to the face collation device 60 via the communication network 4. Examples of the communication network 4 include a wired LAN, a wireless LAN, a mobile communication network (for example, LTE, 4G, 5G), the Internet, and/or a VPN.

Each first image capturing device 21 captures the detection area 3 to generate a captured image, and transmits the captured image to the first edge device 41. Each second image capturing device 22 captures the detection area 3 to generate a captured image, and transmits the captured image to the second edge device 42. The captured image may be a still image or a moving image.

As shown in FIGS. 4A and 4B, the first edge device 41 detects the entire body of the person 1 from the captured images received from the first image capturing devices 21. In the present embodiment, an image of the entire body of the person 1 detected from the captured images is referred to as a body image 200. The first edge device 41 transmits the detected body image 200 to the management device 50. As shown in FIG. 4A, the first edge device 41 detects a face portion of the person 1 from the captured images received from the first image capturing devices 21. In the present embodiment, an image of the face portion of the person 1 detected from the captured images is referred to as a face image 220. The first edge device 41 transmits the detected face image 220 to the management device 50.

As shown in FIGS. 4A and 4B, the second edge device 42 detects the entire body of the person 1 from the captured images received from the second image capturing devices 22. The second edge device 42 transmits the body image 200 detected from the captured images to the management device 50. As shown in FIG. 4A, the second edge device 42 detects the face portion of the person 1 from the captured images received from the second image capturing devices 22. The second edge device 42 transmits the face image 220 detected from the captured images to the management device 50. The details of processes performed by the first edge device 41 and the second edge device 42 will be described later.

The management device 50 generates person information 100 (see FIG. 6) corresponding to the person 1 located in the detection area 3 based on the body image 200 or the face image 220 received from the first edge device 41, or the body image 200 or the face image 220 received from the second edge device 42. The management device 50 may generate the person information 100 for each person 1 detected in the detection area 3. Details of the person information 100 will be described later (see FIG. 6). The management device 50 transmits a face collation request including the face image 220 to the face collation device 60.

The face collation device 60 stores the collation face image of the person 1 who has the right to pass through (for example, enter or exit) the gate in advance. For example, the face collation device 60 stores the collation face image of the person 1 who is registered in advance to enter the facility. The face collation device 60 may manage the collation face image in association with name, age, gender, credit card information, and the like of the person 1.

The face collation device 60 collates the face image 220 received from the management device 50 with each collation face image. When the face collation device 60 succeeds in the collation with any one of the registered collation face images, the face collation device 60 generates face collation result information including a result "successfully collated" and transmits the face collation result information to the management device 50. At this time, the face collation device 60 may perform charging in real time by using the credit card information associated with the collation face image which is successfully collated. When the face collation device 60 fails in the collation with all of the registered collation face images, the face collation device 60 generates face collation result information including a result "unsuccessfully collated" and transmits the face collation result information to the management device 50. The collation between the face image 220 and the collation face image may be achieved by a known face image matching technique. In addition, the "collation" may be described as "authentication".

The management device 50 receives the face collation result information from the face collation device 60. The management device 50 transmits, to the first edge device 41, person collation information including the face collation result information on the face image 220 of the person 1 moving in the first direction, and transmits, to the second edge device 42, person collation information including the face collation result information on the face image 220 of the person 1 moving in the second direction.

When receiving the person collation information from the management device 50, the first edge device 41 displays the face collation result information included in the person collation information on the first display device 31 as shown in FIG. 2. Accordingly, the person 1 who is located in the detection area 3 and is moving in the first direction can know his or her collation result by viewing the screen of the first display device 31 located ahead of the movement direction. That is, the first edge device 41 can cause the person 1 moving in the first direction to visually confirm the collation result of the person 1.

When receiving the person collation information from the management device 50, the second edge device 42 displays the face collation result information included in the person collation information on the second display device 32 as shown in FIG. 2. Accordingly, the person 1 who is located in the detection area 3 and is moving in the second direction can know his or her collation result by viewing the screen of the second display device 32 located ahead of the movement direction. That is, the second edge device 42 can cause the person 1 moving in the second direction to visually confirm the collation result of the person 1. Hereinafter, the details of the processes performed by the first edge device 41, the second edge device 42, and the management device 50 will be described later.

Detection Process in First Edge Device

Figure 5:
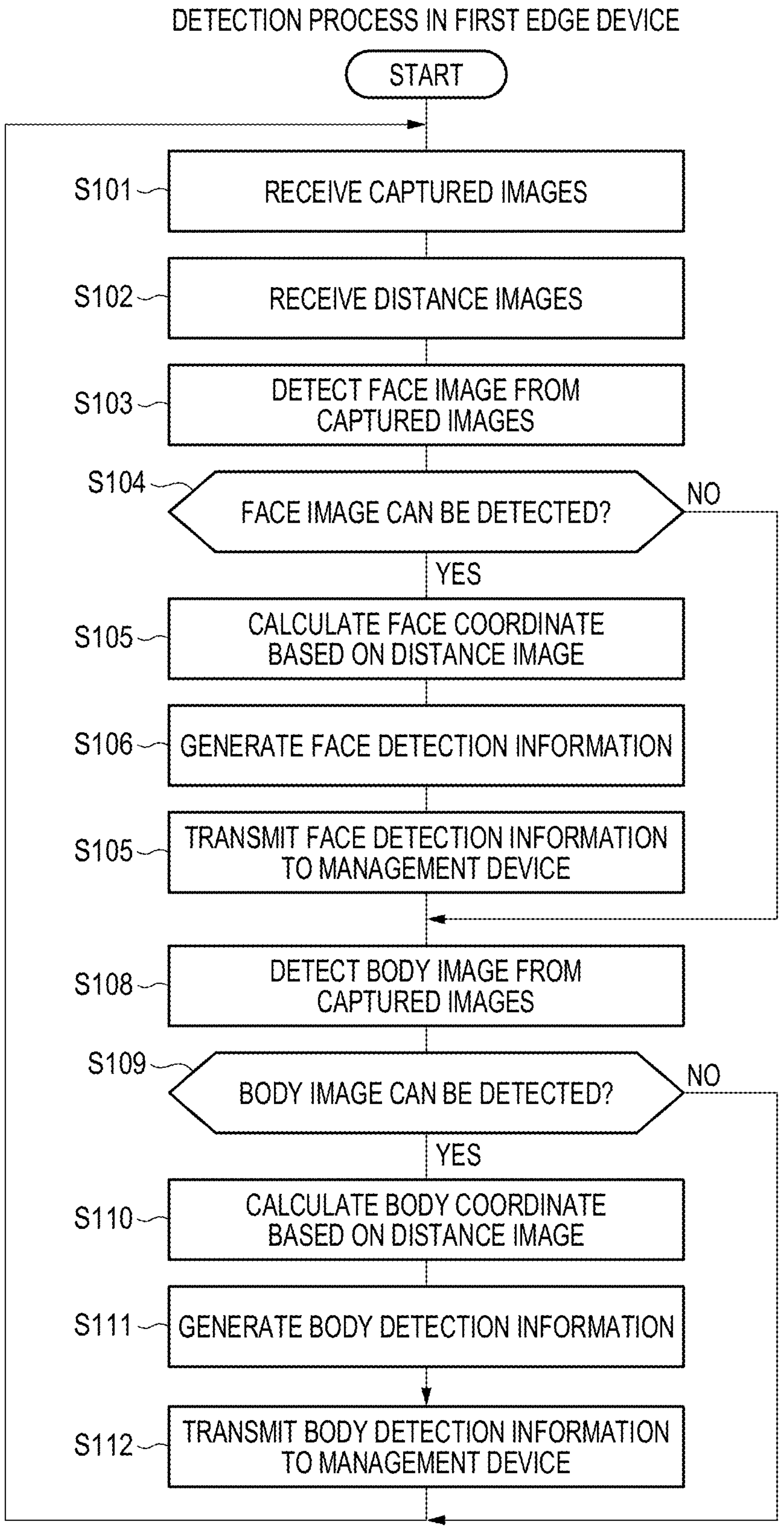
FIG. 5 is a flowchart showing an example of a detection process performed by a first edge device according to Embodiment 1.

FIG. 5 is a flowchart showing an example of a detection process performed by the first edge device 41 according to Embodiment 1. Regarding a detection process performed by the second edge device 42 according to Embodiment 1, the "first image capturing devices 21" may be described as the "second image capturing devices 22" in the following description with reference to FIG. 5.

The first edge device 41 receives the captured images from the first image capturing devices 21 (S101).

The first edge device 41 receives a distance image from each first image capturing device 21 (S102). In this manner, each first image capturing device 21 may generate the distance image indicating a distance to the person 1 or the like present in the detection area 3. The same applies to each second image capturing device 22. The generation of the distance image may be achieved by using any known technique such as using a stereo camera or a distance measuring sensor (for example, a light detection and ranging (LiDAR)). In the present embodiment, the process in step S102 is performed after the process in step S101, but the present invention is not limited thereto, and the order may be switched.

As shown in FIG. 4A, the first edge device 41 detects the face image 220 of the person 1 from the captured images (S103). The detection of the face image 220 of the person may be achieved by using any known technique such as using pattern matching or artificial intelligence (AI). Further, the AI may be an image recognition technique using deep learning (for example, a convolutional neural network (CNN)) or the like.

The first edge device 41 determines whether the face image 220 can be detected from the captured images in step S103 (S104). When the face image 220 cannot be detected (S104: NO), the first edge device 41 proceeds the process to step S108.

When the face image 220 can be detected (S104: YES), the first edge device 41 calculates three-dimensional coordinates (hereinafter, referred to as a face coordinate 221 (see FIGS. 4A and 4B)) related to the detected face image 220 by using the distance image (S105). For example, as shown in FIG. 4A, the first edge device 41 calculates a center point of the face image 220 as the face coordinate 221.

The first edge device 41 generates face detection information (S106). For example, the first edge device 41 generates the face detection information that includes an ID (hereinafter, referred to as an image capturing device ID) for identifying each first image capturing device 21 as a transmission source of the captured image, the face image 220, a size of the face image 220 (hereinafter, referred to as a face image size), the face coordinate 221, and an image capturing time point of the captured image.

The first edge device 41 transmits the generated face detection information to the management device 50 (S107), and proceeds the process to the next step S108.

As shown in FIGS. 4A and 4B, the first edge device 41 detects the body image 200 of the person 1 from the captured images (S108). The detection of the body image 200 of the person 1 may be achieved by using any known technique such as using the pattern matching or the AI. Further, the AI may be the image recognition technique using deep learning (for example, CNN) or the like.

The first edge device 41 determines whether the body image 200 can be detected from the captured images in step S108 (S109). When the body image 200 cannot be detected (S109: NO), the first edge device 41 returns the process to step S101.

When the body image 200 can be detected (S109: YES), the first edge device 41 calculates three-dimensional coordinates (hereinafter, referred to as a body coordinate 201 (see FIGS. 4A and 4B)) related to the detected body image 200 by using the distance image (S110). For example, as shown in FIGS. 4A and 4B, the first edge device 41 calculates a center point of the body image 200 as the body coordinate 201.

The first edge device 41 generates body detection information (S111). For example, the first edge device 41 generates the body detection information including the image capturing device ID, a body ID for identifying the body image 200, the body image 200, the body coordinate 201, and the image capturing time point of the captured image.

The first edge device 41 transmits the generated body detection information to the management device 50 (S112), and returns the process to step S101. In the present embodiment, after the process of detecting the face image from the captured images (S103 to S107) is performed, the process of detecting the body image from the captured images (S108 to S112) is performed, but the present invention is not limited thereto, and the order may be switched.

As described above, by performing the process of detecting the face image 220 and/or the body image 200 of the person 1 from the captured images and the process of calculating the face coordinate 221 and/or the body coordinate 201 in the first edge device 41 or the second edge device 42, it is possible to distribute a processing load compared to a case in which these processes are performed in the management device 50. When the distribution of the processing load is not considered, the gate system 9 may not include the first edge device 41 and the second edge device 42. In this case, the first image capturing devices 21, the first display device 31, the second image capturing devices 22, and the second display device 32 may be directly connected to the management device 50. Then, the management device 50 may perform the process of detecting the face image 220 and/or the body image 200 of the person 1 from the captured images and the process of calculating the face coordinate 221 and/or the body coordinate 201.

Person Information

Figure 6:
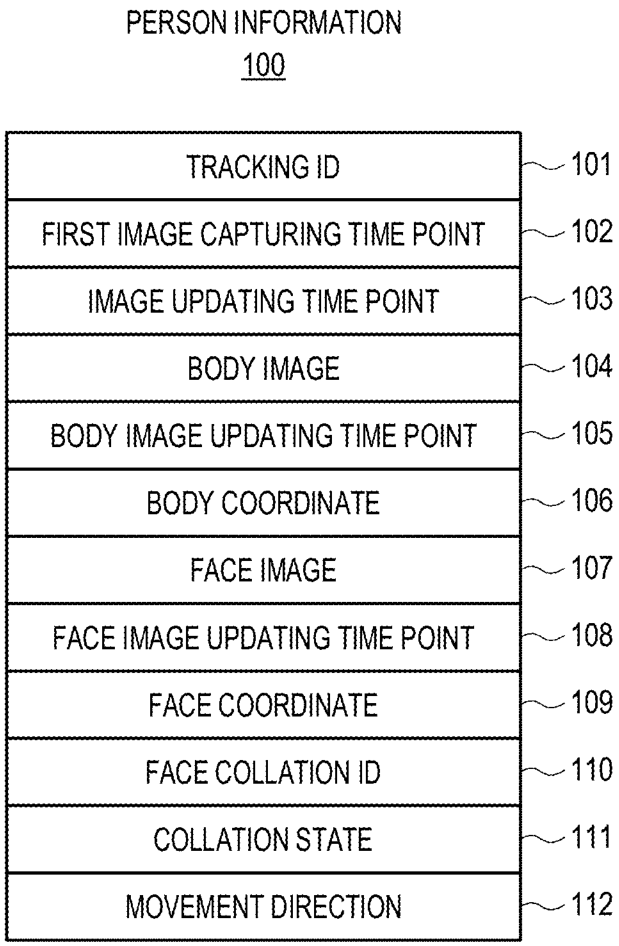
FIG. 6 is a configuration example of person information according to Embodiment 1.

FIG. 6 shows a configuration example of the person information 100 according to Embodiment 1.

The person information 100 is generated for each person 1 detected in the detection area 3. The person information 100 includes, as information or data, a tracking ID 101, a first image capturing time point 102, an image updating time point 103, a body image 104, a body image updating time point 105, a body coordinate 106, a face image 107, a face image updating time point 108, a face coordinate 109, a face collation ID 110, a collation state 111, and a movement direction 112.

An ID used for tracking the same person in the detection area 3 is set as the tracking ID 101. The tracking ID 101 can also be referred to as an ID for identifying the person information 100.

A time point at which the body image 104 or the face image 107 included in the person information 100 is captured for the first time is set as the first image capturing time point 102. The first image capturing time point can also be referred to as a time point at which the person information 100 is generated for the first time.

A time point at which the body image 104 or the face image 107 included in the person information 100 is last updated is set as the image updating time point 103. The image updating time point 103 can also be referred to as a time point at which the person information 100 is last updated.

The body image 200 detected from the captured images of the person 1 indicated by the person information 100 is set as the body image 104. The body image 104 may be dynamically updated to the body image 200 detected from the latest captured images.

A time point at which the body image 104 included in the person information 100 is last updated is set as the body image updating time point 105.

The body coordinate 201 calculated based on the body image 104 is set as the body coordinate 106. The body coordinate 106 may be represented as three-dimensional coordinates (an X-coordinate, a Y-coordinate, and a Z-coordinate) in the detection area 3.

The face image 220 detected from the captured images of the person 1 indicated by the person information 100 is set as the face image 107. The face image 107 may be dynamically updated to the face image 220 detected from the latest captured images.

A time point at which the face image 107 included in the person information 100 is last updated is set as the face image updating time point 108.

The face coordinate 221 calculated based on the face image 107 is set as the face coordinate 109. The face coordinate 109 may be represented as three-dimensional coordinates (an X-coordinate, a Y-coordinate, and a Z-coordinate) in the detection area 3.

An ID assigned to the collation face image which is successfully collated is set as the face collation ID 110. That is, the face collation ID 110 can also be referred to as an ID for certifying the person 1 corresponding to the face image 107. When there is no collation face image which is successfully collated (that is, face collation fails), NULL may be set as the face collation ID 110.

A state of collation with the face image 107 is set as the collation state 111. For example, any one of "before collation request", "during collation", "successfully collated", and "unsuccessfully collated" is set as the collation state 111.

The movement direction of the person 1 indicated by the person information 100 is set as the movement direction 112.

For example, either the first direction or the second direction is set as the movement direction.

The management device 50 manages a plurality of pieces of person information 100 as a person information table (not shown). The person information table may be stored in a memory 1002 or a storage 1003 (see FIG. 32) included in the management device 50, or may be stored in a device different from the management device 50.

Overall Process in Management Device

Figure 7:
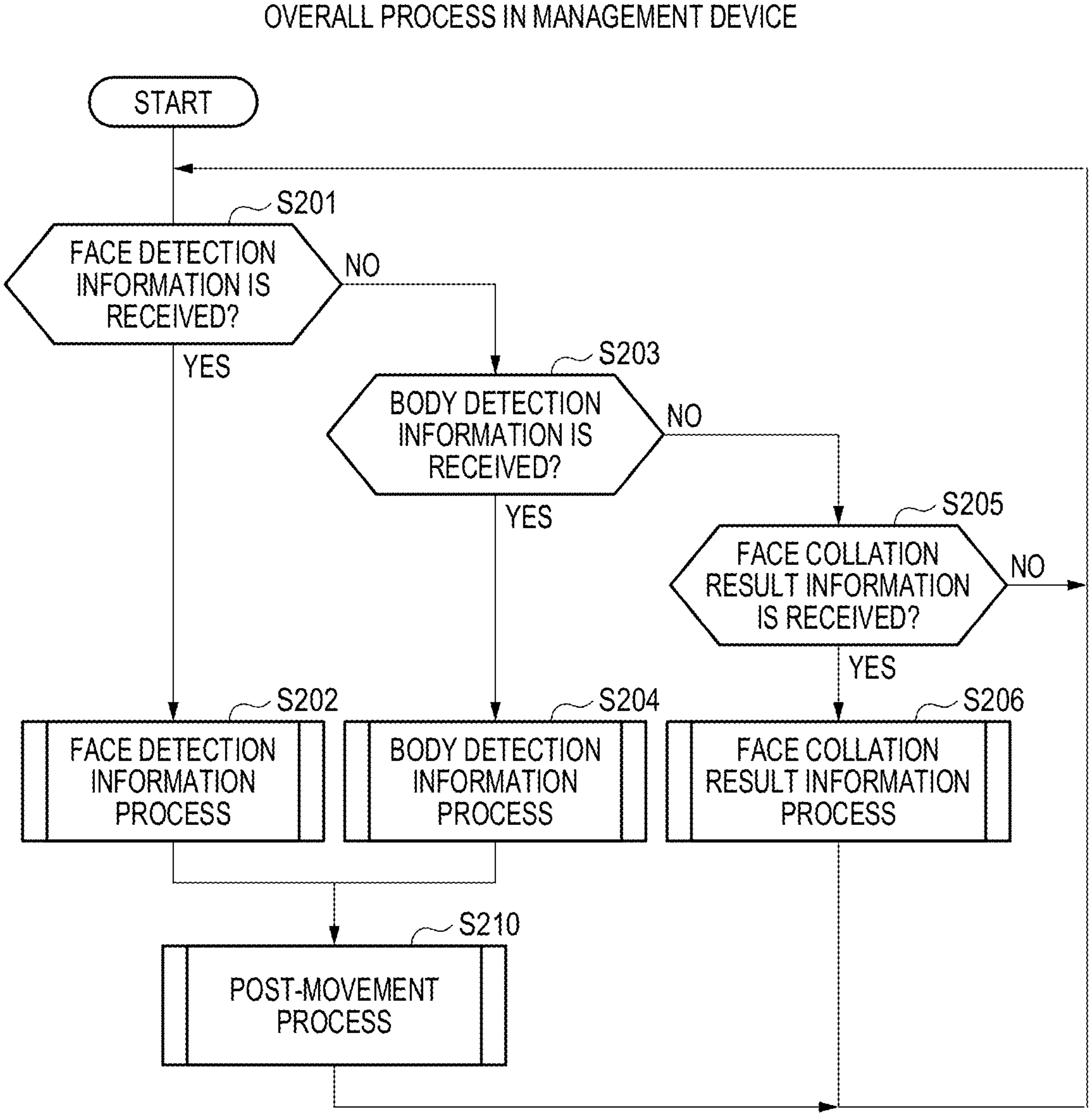
FIG. 7 is a flowchart showing an example of an overall process performed by a management device according to Embodiment 1.

FIG. 7 is a flowchart showing an example of an overall process performed by the management device 50 according to Embodiment 1.

The management device 50 determines whether the face detection information (see step S107 in FIG. 5) is received from the first edge device 41 or the second edge device 42 (S201).

When the face detection information is received (S201: YES), the management device 50 executes a face detection information process (S202). Details of the face detection information process will be described later (see FIG. 8).

When the face detection information is not received (S202: NO), the management device 50 determines whether the body detection information (see step S112 in FIG. 5) is received from the first edge device 41 or the second edge device 42 (S203).

When the body detection information is received (S203: YES), the management device 50 executes a body detection information process (S204). Details of the body detection information process will be described later (see FIG. 9).

When the body detection information is not received (S203: NO), the management device 50 determines whether the face collation result information is received (S205). The face collation result information refers to information returned from the face collation device 60 in response to the face collation request transmitted from the management device 50 to the face collation device 60 in FIG. 8 to be described later, and refers to information that includes a result of the face collation (for example, a result "successfully collated" or a result "unsuccessfully collated").

When the face collation result information is received (S205: YES), the management device 50 executes a face collation result information process (S206). Details of the face collation result information process will be described later (see FIG. 11).

When the face collation result information is not received (S205: NO), the management device 50 returns the process to step S201.

After executing the face detection information process (S202) or the body detection information process (S204), the management device 50 executes a post-movement process (S210), and returns the process to step S201. Details of the post-movement process will be described later (see FIG. 10). In the present embodiment, the processes in step S201, step S203, and step S205 are performed in a stepwise manner, but the present invention is not limited thereto, and the processes in step S201, step S203, and step S205 may be switched or may be performed in parallel.

Face Detection Information Process in Management Device

Figure 8:
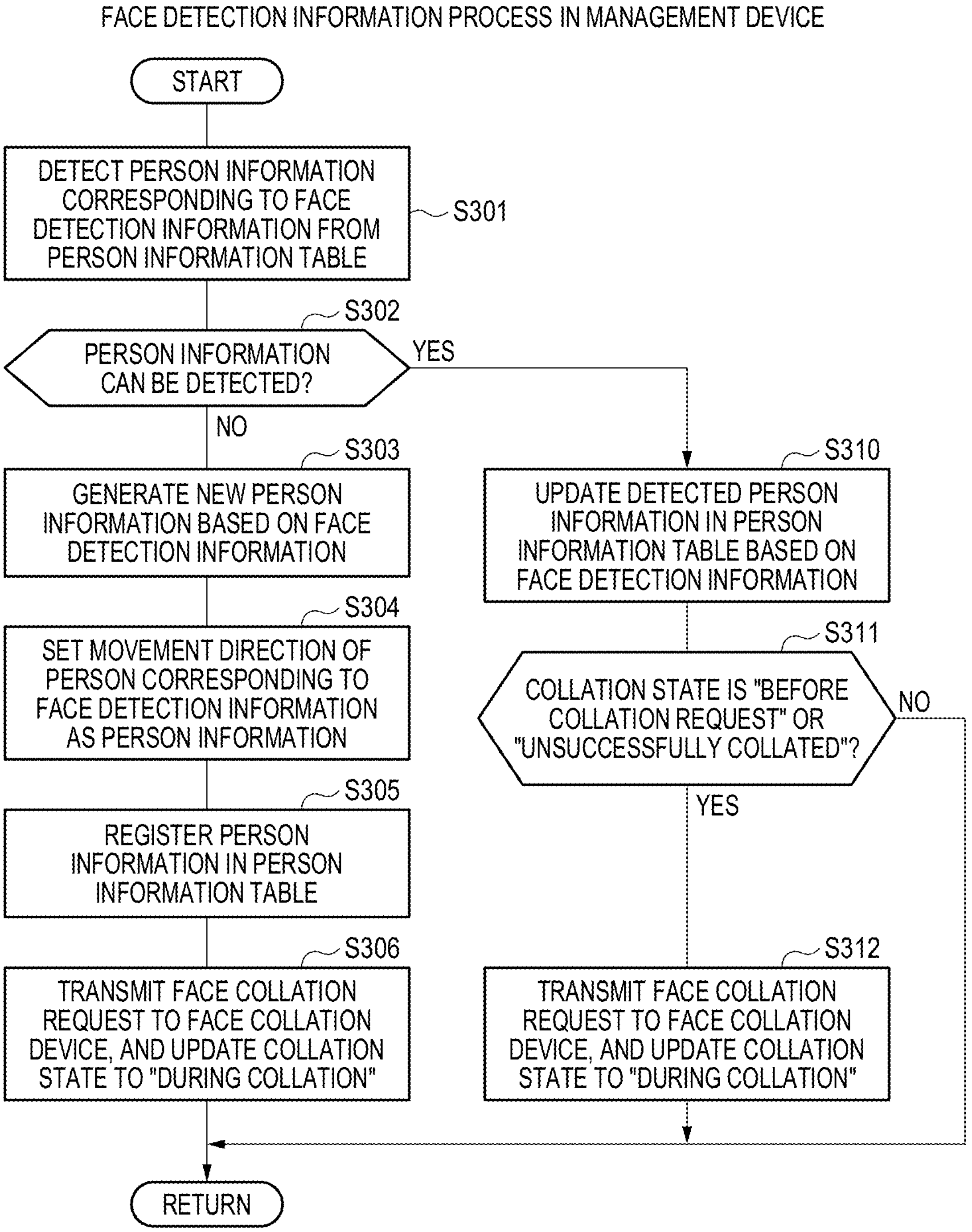
FIG. 8 is a flowchart showing an example of a face detection information process shown in FIG. 7.

FIG. 8 is a flowchart showing an example of the face detection information process (S202) shown in FIG. 7.

The management device 50 detects, from the person information table, the person information 100 corresponding to the face detection information received from the first edge device 41 or the second edge device 42 (S301). In the present embodiment, the person information 100 corresponding to the face detection information refers to the person information 100 by which the person is estimated to be the same person as the person 1 indicated by the face detection information. Details of a method of detecting, from the person information table, the person information 100 by which the person is estimated to be the same person as the person 1 indicated by the face detection information will be described later (see FIGS. 15A and 15B).

The management device 50 determines whether the person information 100 can be detected from the person information table in step S301 (S302).

Next, a case in which it is determined in step S302 that the person information 100 cannot be detected from the person information table (S302: NO) will be described.

The management device 50 generates new person information 100 based on the face detection information (S303). At this time, the management device 50 sets the following contents for the new person information 100.

- set a new tracking ID as the tracking ID 101 of the person information 100
- set the face image 220 included in the face detection information as the face image 107 of the person information 100
- set the face coordinate 221 included in the face detection information as the face coordinate 109 of the person information 100
- set an image capturing time point included in earliest face detection information (that is, an image capturing time point acquired earliest) as the first image capturing time point 102 of the person information 100
- set the "before collation request" as the collation state 111 of the person information 100

The management device 50 detects the movement direction of the person 1 corresponding to the face detection information, and sets the detected movement direction as the movement direction 112 of the person information 100 generated in step S303 (S304). Details of a method of detecting the movement direction of the person will be described later (see FIG. 16).

The management device 50 newly registers the person information 100 generated and set in step S303 and step S304 in the person information table (S305).

The management device 50 transmits a face collation request including the face image 107 and the tracking ID 101 to the face collation device 60, and updates the collation state 111 of the person information 100 to the "during collation" (S306).

Then, the management device 50 completes the process.

Next, a case in which it is determined in step S302 that the person information 100 can be detected from the person information table (S302: YES) will be described.

The management device 50 updates the contents of the person information 100 detected in step S301 based on the face detection information (S310). For example, the management device 50 updates the detected person information 100 as follows.

- update the face coordinate 109 of the person information 100 as the face coordinate 221 included in the face detection information
- update the image updating time point 103 and the face image updating time point 108 of the person information 100 as the image capturing time point included in the face detection information The management device 50 determines whether the collation state 111 of the detected person information 100 is the "before collation request" or the "unsuccessfully collated" (S311). When the collation state 111 is neither the "before collation request" nor the "unsuccessfully collated" (S311: NO), the management device 50 completes the process.

When the collation state 111 is the "before collation request" or the "unsuccessfully collated" (S311: YES), the management device 50 transmits the face collation request including the face image 107 and the tracking ID 101 to the face collation device 60, and updates the collation state 111 of the person information 100 to the "during collation" (S312). Then, the management device 50 completes the process.

Body Detection Information Process in Control Device

Figure 9:
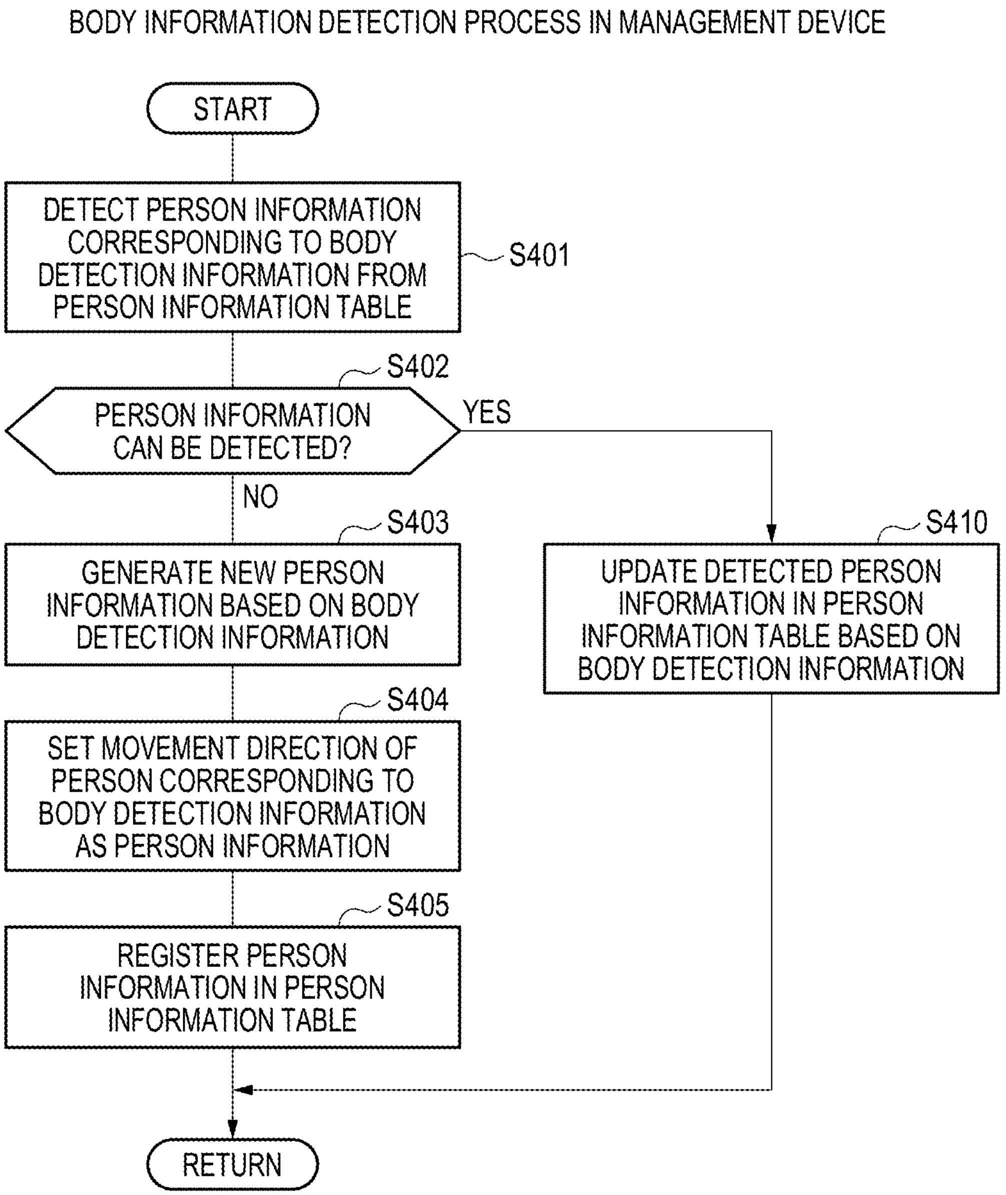
FIG. 9 is a flowchart showing an example of a body detection information process shown in FIG. 7.

FIG. 9 is a flowchart showing an example of the body detection information process (S204) shown in FIG. 7.

The management device 50 detects, from the person information table, the person information 100 corresponding to the body detection information received from the first edge device 41 or the second edge device 42 (S401). In the present embodiment, the person information 100 corresponding to the body detection information refers to the person information 100 by which the person is estimated to be the same person as the person 1 indicated by the body detection information. Details of a method of detecting, from the person information table, the person information 100 by which the person is estimated to be the same person as the person 1 indicated by the body detection information will be described later (see FIGS. 15A and 15B).

The management device 50 determines whether the person information 100 can be detected from the person information table in step S401 (S402).

Next, a case in which it is determined in step S402 that the person information 100 cannot be detected from the person information table (S402: NO) will be described.

The management device 50 generates new person information 100 based on the received body detection information (S403). At this time, the management device 50 sets the following contents for the new person information 100.

- set a new tracking ID as the tracking ID 101 of the person information 100
- set the body image 200 included in the body detection information as the body image 104 of the person information 100
- set a body coordinate 202 included in the body detection information as the body coordinate 106 of the person information 100
- set an image capturing time point included in earliest body detection information (that is, an image capturing time point acquired earliest) as the first image capturing time point 102 of the person information 100

The management device 50 detects the movement direction of the person 1 corresponding to the body detection information, and sets the detected movement direction as the movement direction 112 of the person information 100 generated in step S403 (S404). Details of the method of detecting the movement direction of the person 1 will be described later (see FIG. 16).

The management device 50 newly registers the person information 100 generated and set in step S403 and step S404 in the person information table (S405). Then, the management device 50 completes the process.

Next, a case in which it is determined in step S402 that the person information 100 can be detected from the person information table (S402: YES) will be described.

The management device 50 updates the contents of the person information 100 detected in step S401 based on the body detection information (S410). For example, the management device 50 updates the detected person information 100 as follows.

- update the body coordinate 106 of the person information 100 as the body coordinate 202 included in the body detection information
- update the image updating time point 103 and the body image updating time point 105 of the person information 100 as a body image capturing time point included in the body detection information Then, the management device 50 completes the process.

Post-Movement Process in Management Device

Figure 10:
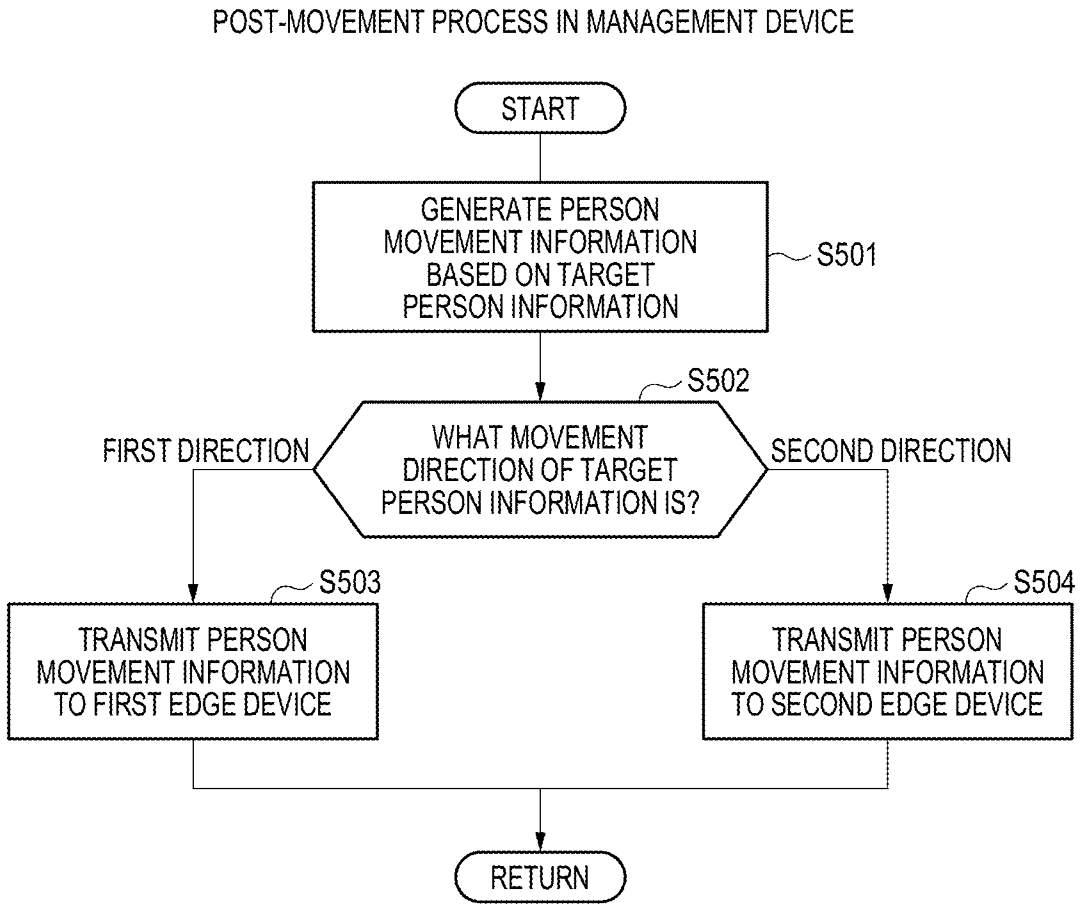
FIG. 10 is a flowchart showing an example of a post-movement process shown in FIG. 7.

FIG. 10 is a flowchart showing an example of the post-movement process (S210) shown in FIG. 7.

The management device 50 generates person movement information based on target person information (S501). In the present embodiment, the target person information refers to the person information 100 detected from the person information table or the newly generated person information 100 in the face detection information process shown in FIG. 8, or the person information 100 detected from the person information table or the newly generated person information 100 in the body detection information process shown in FIG. 9. At this time, the management device 50 sets the following contents for the person movement information.

- tracking ID
- zone information
- face image (body image when there is no face image)
- collation state
- face collation ID Here, the zone information refers to information indicating that the person 1 corresponding to the target person information is located in a collation zone 301 or is located in a passing determination zone 302 in the detection area 3. Details of the collation zone 301 and the passing determination zone 302 will be described later (see FIG. 13).

The management device 50 determines whether the movement direction of the target person information is the first direction or the second direction (S502).

When the movement direction is the first direction (S502: the first direction), the management device 50 transmits the person movement information generated in step S501 to the first edge device 41 (S503), and completes the process.

When the movement direction is the second direction (S502: the second direction), the management device 50 transmits the person movement information generated in step S501 to the second edge device 42 (S504), and completes the process.

Face Collation Result Information Process in Control Device

Figure 11:
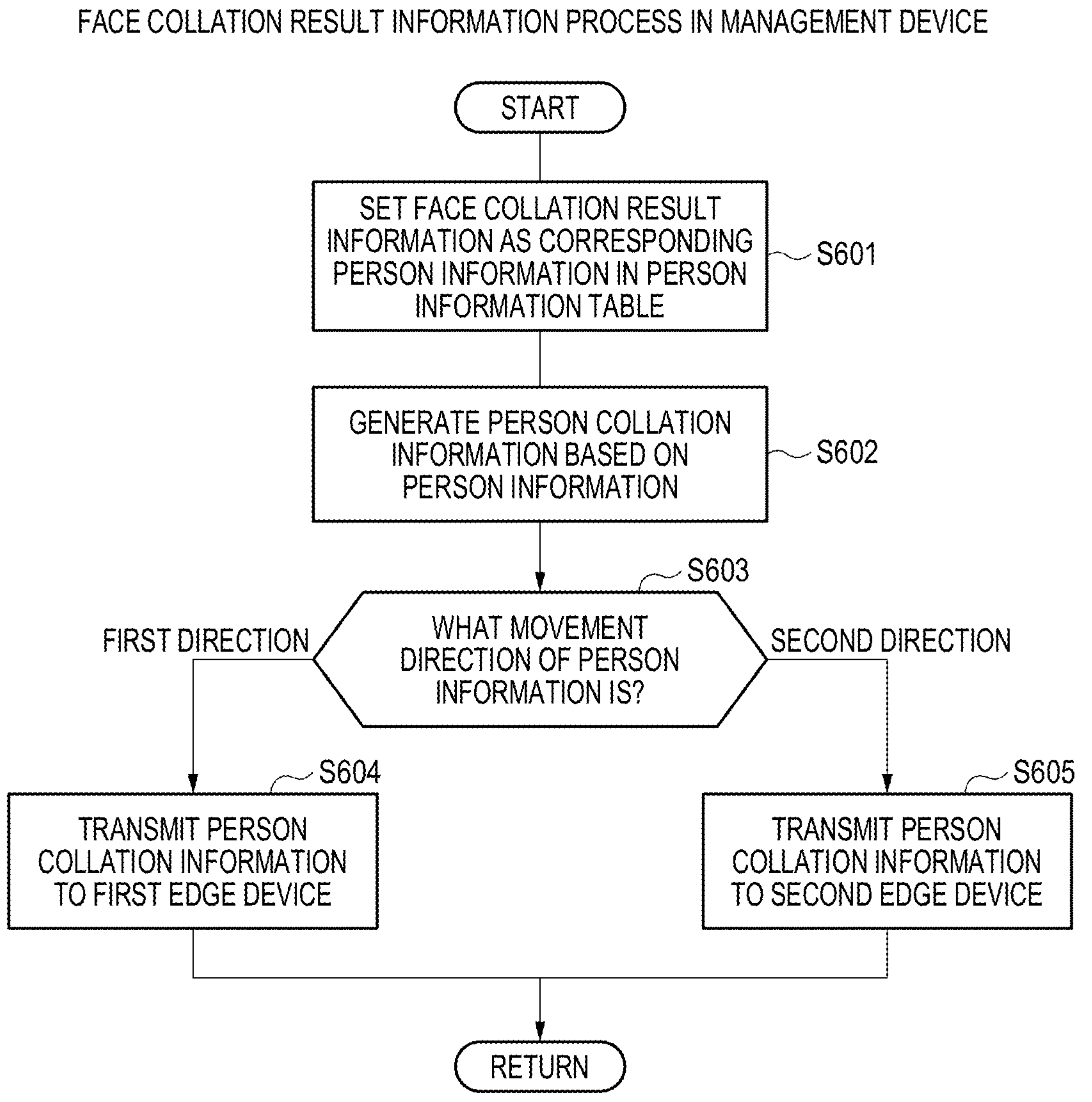
FIG. 11 is a flowchart showing an example of a face collation result information process shown in FIG. 7.

FIG. 11 is a flowchart showing an example of the face collation result information process (S206) shown in FIG. 7.

The management device 50 sets contents of the face collation result information received from the face collation device 60 as the person information 100 corresponding to the face collation result information in the person information table (S601). For example, the management device 50 sets the contents of the face collation result information as the person information 100 as follows.

- set the face collation ID of the face collation result information as the face collation ID 110 of the person information 100
- set the collation result (the result "successfully collated" or the result "unsuccessfully collated") of the face collation result information as the collation state 111 of the person information 100

The management device 50 generates the person collation information based on the person information 100 set in step S601 (S602).

At this time, the management device 50 sets the following contents for the person collation information.

tracking ID
zone information
face image
collation state
face collation ID

The management device 50 determines whether the movement direction 112 of the person information 100 set in step S601 is the first direction or the second direction (S603).

When the movement direction 112 is the first direction (S602: the first direction), the management device 50 transmits the person collation information generated in step S602 to the first edge device 41 (S604), and completes the process.

When the movement direction 112 is the second direction (S602: the second direction), the management device 50 transmits the person collation information generated in step S602 to the second edge device 42 (S605), and completes the process.

Display Process in First Edge Device

Figure 12:
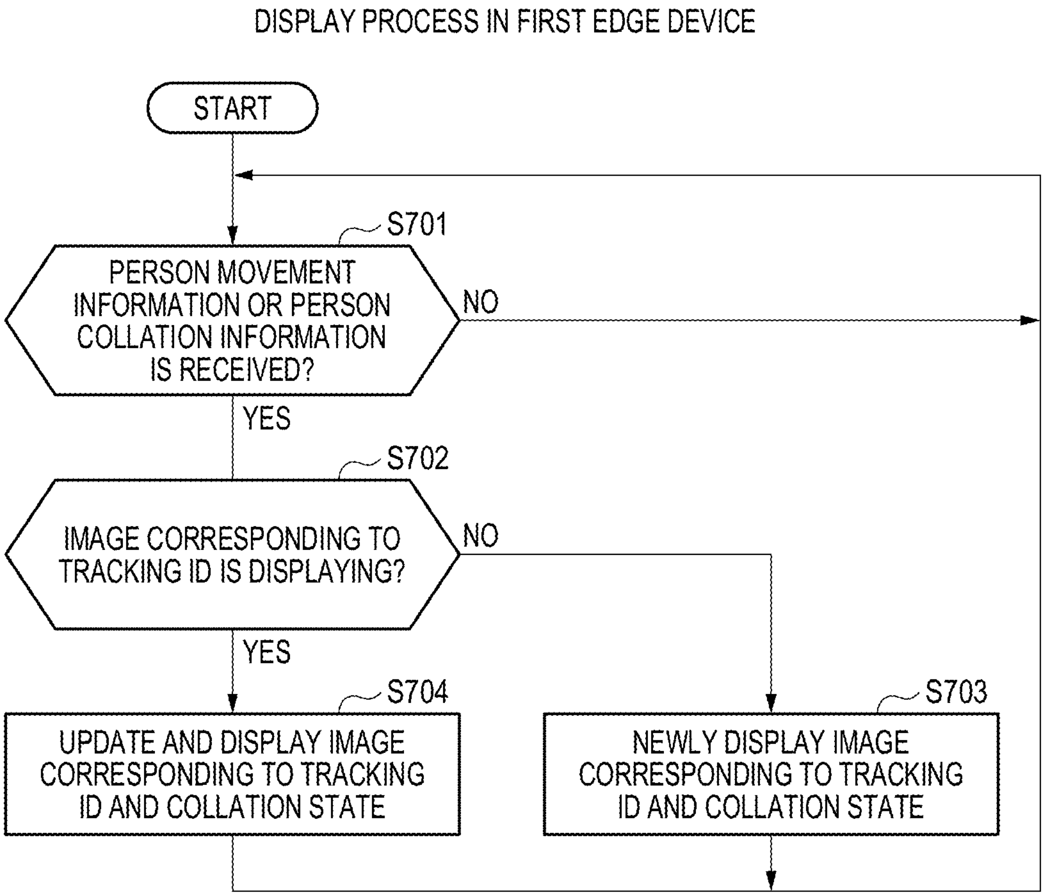
FIG. 12 is a flowchart showing an example of a display process performed by the first edge device according to Embodiment 1.

FIG. 12 is a flowchart showing an example of a display process performed by the first edge device 41 according to Embodiment 1. Regarding a display process performed by the second edge device 42 according to Embodiment 1, in the following description with reference to FIG. 12, the "first edge device 41" may be described as the "second edge device 42", the "first display device 31" may be described as the "second display device 32", and the "first direction" may be described as the "second direction".

The first edge device 41 determines whether the person movement information or the person collation information is received from the management device 50 (S701). When neither the person movement information nor the person collation information is received (S701: NO), the first edge device 41 returns the process to step S701. When the person movement information or the person collation information is received (S701: YES), the first edge device 41 performs the following process.

The first edge device 41 determines whether the face image or the body image corresponding to the tracking ID included in the received person movement information or person collation information is displayed on the first display device 31 (S702).

When the face image or the body image corresponding to the tracking ID is not displayed on the first display device 31 (S702: NO), the first edge device 41 newly displays the face image or the body image and the collation state included in the person movement information or the person collation information on the first display device 31 (S703). Then, the first edge device 41 returns the process to step S701.

When the face image or the body image corresponding to the tracking ID is displayed on the first display device 31 (S702: YES), the first edge device 41 updates the displayed face image or body image and collation state to the face image or the body image and the collation state included in the person movement information or the person collation information, and displays the face image or the body image and the collation state (S704). Then, the first edge device 41 returns the process to step S701.

Accordingly, as shown in FIG. 2, the first display device 31 displays collation result images 70A, 70B, 70C, 70E, and 70F indicating the face images or the body images and the collation states (for example, the result "successfully collated", the result "unsuccessfully collated", or the like) of the persons 1 moving in the first direction. Therefore, each person 1 moving in the first direction can visually confirm his or her collation result from the first display device 31 installed ahead of the movement direction.

Similarly, as shown in FIG. 2, the second display device 32 displays the collation result images 70A, 70B, 70C, 70E, and 70F indicating the face images or the body images and the collation states (for example, the result "successfully collated", the result "unsuccessfully collated", or the like) of the persons 1 moving in the second direction. Therefore, each person 1 moving in the second direction can visually confirm his or her collation result from the second display device 32 installed ahead of the movement direction.

The contents related to the display process described above can be described as follows. That is, the management device 50 detects the movement direction of each person 1 moving between the first gate 11 and the second gate 12, displays the collation result of the face image 220 of the person 1 moving in the first direction on the first display device 31 but not on the second display device 32, and displays the collation result of the face image 220 of the person 1 moving in the second direction on the second display device 32 but not on the first display device 31.

Accordingly, the collation result of the person 1 is displayed on the display device installed in the movement direction of the person 1, and the collation result of the person is not displayed on the display device installed in a direction opposite to the movement direction of the person 1. Therefore, the management device 50 can appropriately show the collation result for each of the persons 1 moving in the first direction and the persons 1 moving in the second direction through the passage 2.

Display Pattern

Figure 13:
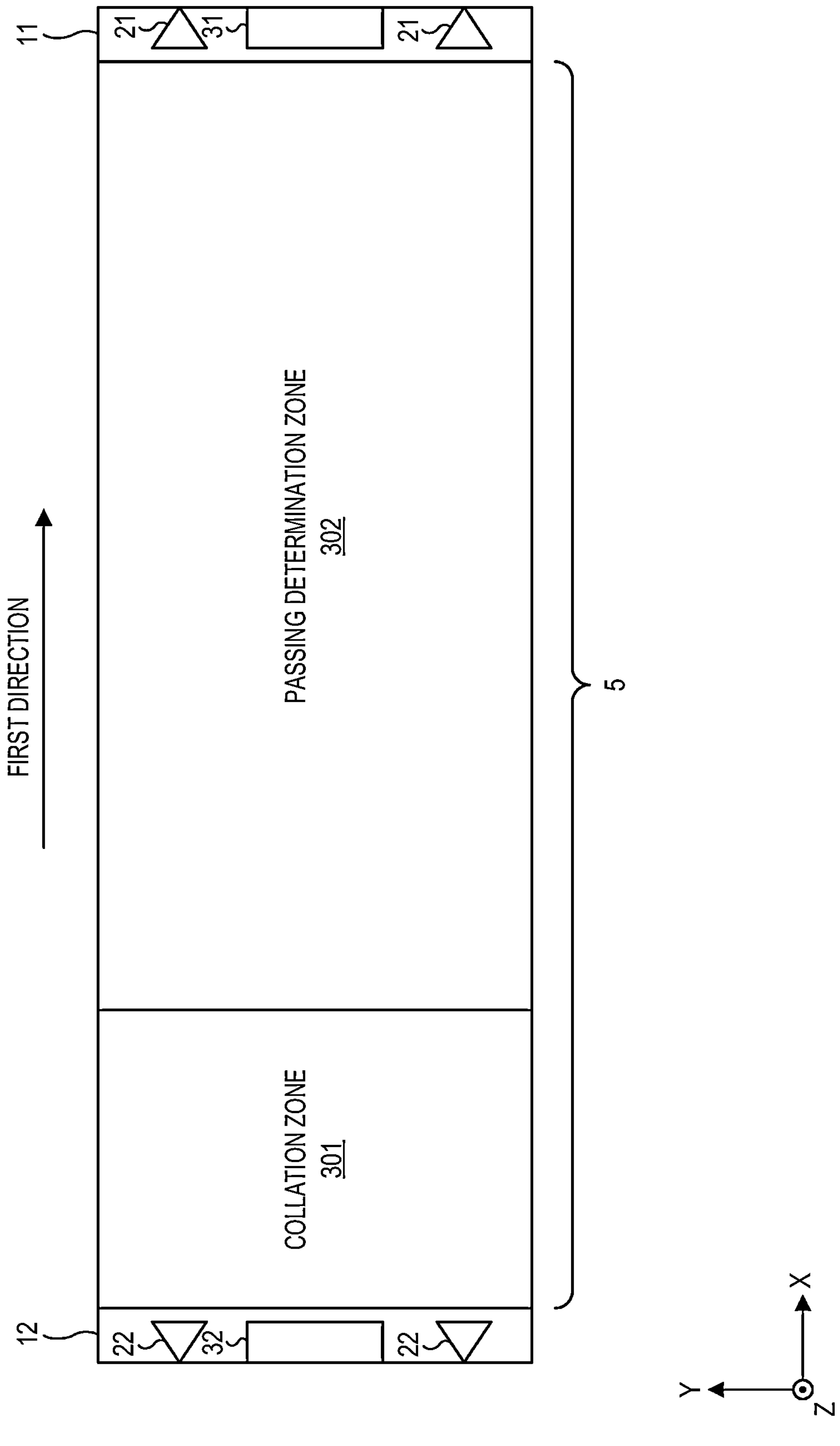
FIG. 13 is a diagram showing a passing determination zone and a collation zone in a detection area according to Embodiment 1.

FIG. 13 is a diagram showing the collation zone 301 and the passing determination zone 302 in the detection area 3 according to Embodiment 1. Although the first gate 11 and the first direction are described below as an example, the same applies to the second gate 12 and the second direction.

The captured images captured by the first image capturing devices 21 of the first gate 11 are used for the face collation of the person 1 moving in the first direction. In the detection area 3, a predetermined area close to the second gate 12 is set as the collation zone 301, and a predetermined area close to the first gate 11 is set as the passing determination zone 302. The first edge device 41 may change a display pattern on the first display device 31 depending on whether the person 1 is located in the collation zone 301 or the passing determination zone 302. Next, the display pattern will be described.

FIG. 14 is a diagram for illustrating examples of the display pattern on the first display device 31 according to Embodiment 1. Regarding a display pattern on the second display device 32, in the following description with reference to FIG. 14, the "first edge device 41" may be described as the "second edge device 42", and the "first display device 31" may be described as the "second display device 32".

When the person 1 is located outside the detection area 3 (outside of the zones), the first edge device 41 does not display the collation result image of the person 1 on the first display device 31.

When the person 1 is located in the collation zone 301, the first edge device 41 controls the display of the first display device 31 as the following patterns (A0) to (A3).

(A0) When the face image 220 of the person 1 is present and the collation state 111 is the "during collation", the first edge device 41 displays a collation result image including the face image 220 of the person 1 and a message "during collation" on the first display device 31.

(A1) When the face image 220 of the person 1 is present and the collation state 111 is the "successfully collated", the first edge device 41 displays a collation result image including the face image 220 of the person 1 and a message "successfully collated" on the first display device 31. At this time, the first edge device 41 may output a collation success sound from a speaker included in the first display device 31.

(A2) When the face image 220 of the person 1 is present and the collation state 111 is the "unsuccessfully collated", the first edge device 41 displays a collation result image including the face image 220 of the person 1 and a message "unsuccessfully collated" on the first display device 31. At this time, the first edge device 41 may output a collation failure sound from the speaker included in the first display device 31.

(A3) When the face image 220 of the person 1 is not present and the body image 200 is present, the first edge device 41 displays a collation result image including the body image 200 of the person 1 and a message "warning" on the first display device 31. At this time, the first edge device 41 may output a warning sound from the speaker included in the first display device 31.

When the person 1 is located in the passing determination zone 302, the first edge device 41 controls the display of the first display device 31 as the following patterns (A4) to (A7).

(A4) When the face image 220 of the person 1 is present and the collation state 111 is the "during collation", the first edge device 41 displays the collation result image including the face image 220 of the person 1 and the message "during collation" on the first display device 31.

(A5) When the face image 220 of the person 1 is present and the collation state 111 is the "successfully collated", the first edge device 41 displays a collation result image including the face image 220 of the person 1 and a message "passing" on the first display device 31. At this time, the first edge device 41 may output a passing sound from the speaker included in the first display device 31.

(A6) When the face image 220 of the person 1 is present and the collation state 111 is the "unsuccessfully collated", the first edge device 41 displays a collation result image including the face image 220 of the person 1 and a message "unauthorized passing" on the first display device 31. At this time, the first edge device 41 may output an unauthorized passing sound from the speaker included in the first display device 31.

(A7) When the face image 220 of the person 1 is not present and the body image 200 is present, the first edge device 41 displays a collation result image including the body image 200 of the person 1 and the message "unauthorized passing" on the first display device 31. At this time, the first edge device 41 may output the unauthorized passing sound from the speaker included in the first display device 31.

Display priorities may be set as follows.

The passing determination zone 302 has a higher display priority than the collation zone 301.

The message "passing" has the highest display priority, and the message "successfully collated" has the next highest display priority.

When there is the face image 220, the message "during collation" has the lowest display priority.

A case in which the face image 220 is present has a higher display priority than a case in which only the body image 200 is present.

For example, display priorities of the patterns (A0) to (A7) described above may be set as follows in ascending order.

(A3)<(A7)<(A0)<(A4)<(A2)<(A6)<(A1)<(A5)

Method of Detecting Person Information of the Same Person

Figure 15A:
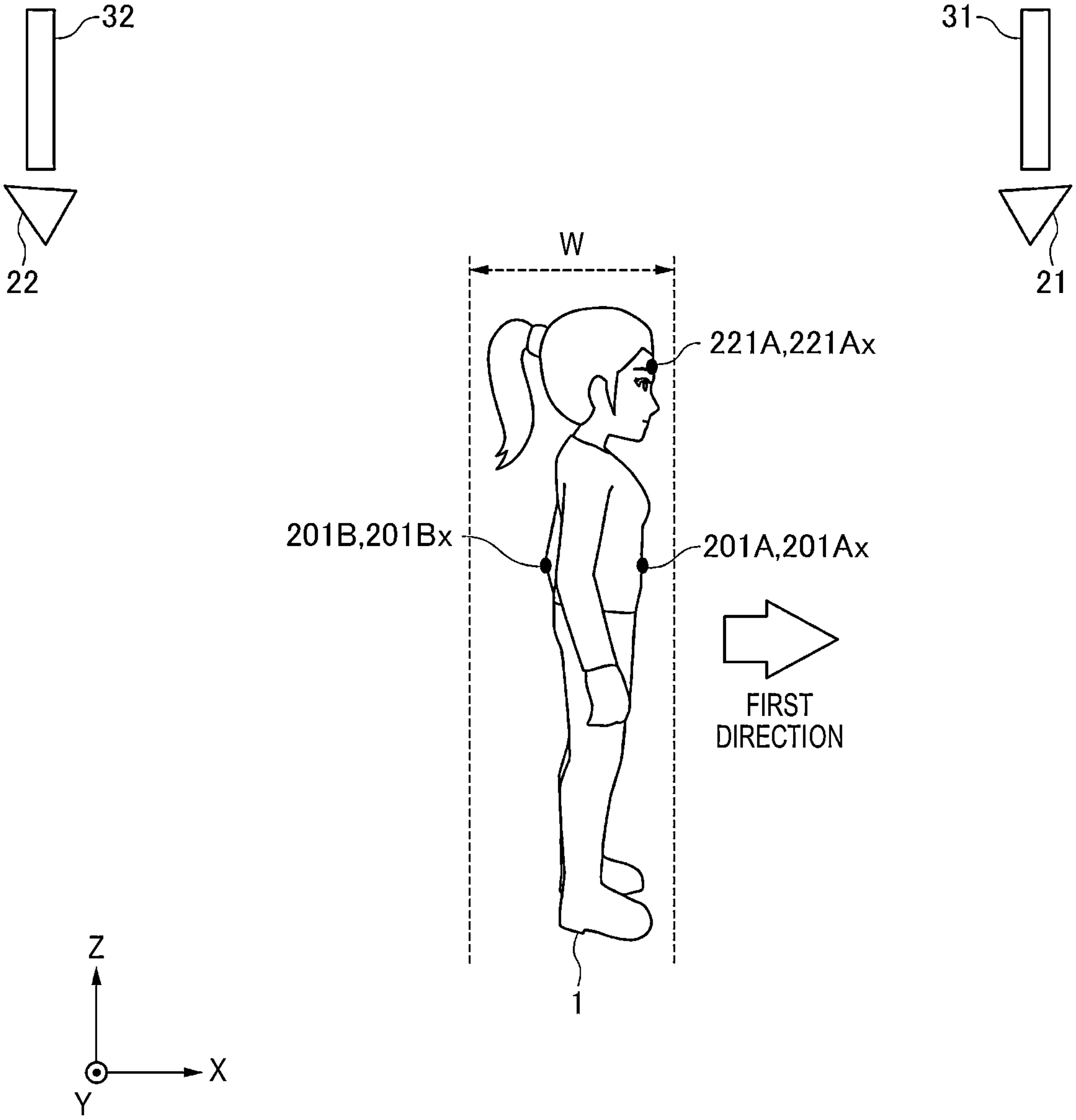
FIG. 15A is a side view for illustrating a method of detecting, from a person information table, person information by which a person is estimated to be the same person as a person indicated by body detection information according to Embodiment 1.
Figure 15B:
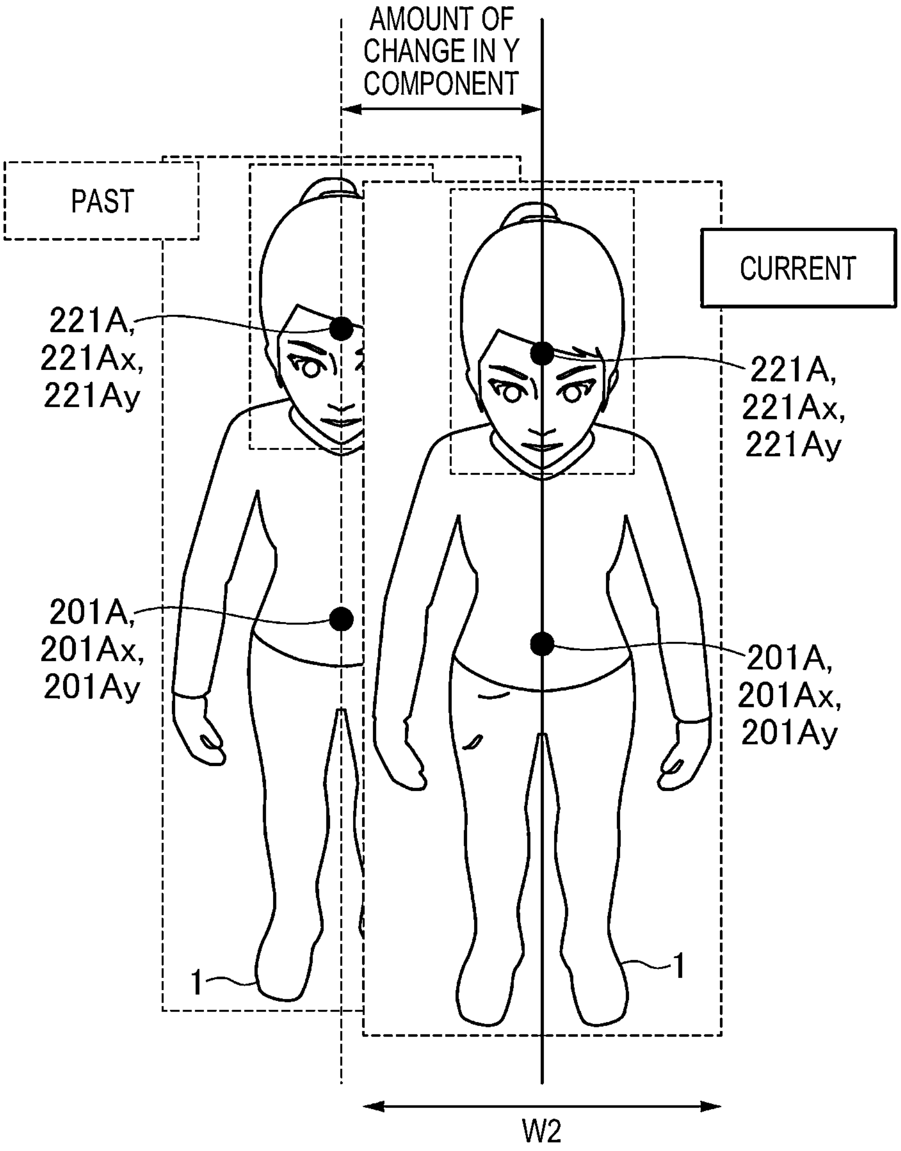
FIG. 15B is a front view for illustrating the method of detecting, from the person information table, the person information by which the person is estimated to be the same person as the person indicated by the body detection information according to Embodiment 1.

FIGS. 15A and 15B are views for illustrating the method of detecting, from the person information table, the person information 100 by which the person is estimated to be the same person as the person 1 indicated by the body detection information according to Embodiment 1. In FIGS. 15A and 15B, it is assumed that the person 1 moves in the first direction. Regarding a case in which the person 1 moves in the second direction, in the following description with reference to FIGS. 15A and 15B, the "first image capturing devices 21" may be described as the "second image capturing devices 22", and the "second image capturing devices 22" may be read as the "first image capturing devices 21".

The body image 200 of the person 1 moving in the first direction, which is captured by the first image capturing devices 21, shows a front view of the body of the person 1. Hereinafter, an X-coordinate and a Y-coordinate of a body coordinate 201A calculated from the body image 200 as the front view are referred to as an X-coordinate 201Ax and a Y-coordinate 201Ay of the front view of the body, respectively. Further, the face image 220 of the person 1 moving in the first direction, which is captured by the first image capturing devices 21, shows a front view of the face of the person 1. Hereinafter, an X-coordinate and a Y-coordinate of a face coordinate 221A calculated from the face image 220 as the front view are referred to as an X-coordinate 221Ax and a Y-coordinate 221Ay of the front view of the face, respectively.

The body image 200 of the person 1 moving in the first direction, which is captured by the second image capturing devices 22, shows a rear view of the body of the person 1. Hereinafter, an X-coordinate and a Y-coordinate of a body coordinate 201B calculated from the body image 200 as the rear view are referred to as an X-coordinate 201Bx and a Y-coordinate 201By of the rear view of the body, respectively.

As shown in FIG. 15A, the X-coordinate 201Ax of the front view of the body and the X-coordinate 201Bx of the rear view of the body are separated by a thickness of the body of the person 1 in a front-rear direction. Therefore, when a position difference between the X-coordinate 201Ax of the front view of the body and the X-coordinate 201Bx of the rear view of the body is smaller than a predetermined threshold value (hereinafter, referred to as a body thickness threshold value) W based on the thickness of the body, the X-coordinate 201Ax of the front view of the body and the X-coordinate 201Bx of the rear view of the body can be estimated to correspond to the X-coordinate of the same person. The body thickness threshold value W may be a value slightly larger than an average body thickness. Similarly, when a position difference between the X-coordinate 221Ax of the front view of the face and the X-coordinate 201Bx of the rear view of the body is smaller than the body thickness threshold value W, the X-coordinate 221Ax of the front view of the face and the X-coordinate 201Bx of the rear view of the body can be estimated to be the X-coordinate of the same person.

Further, as shown in FIG. 15B, when an amount of change in a Y component between the Y-coordinate 201Ay (that is, the current Y-coordinate) of the body coordinate 201A included in the received body detection information and the Y-coordinate 201Ay (that is, the past Y-coordinate) of the body coordinate 201A included in the person information 100 is equal to or less than a predetermined threshold value (hereinafter, referred to as a body width threshold value) W2, the Y-coordinate 201Ay of the current body coordinate and the Y-coordinate 201Ay of the past body coordinate can be estimated to be the Y-coordinate of the same person. The face coordinate 221A may be used instead of the body coordinate 201A.

That is, when the management device 50 can detect, from the person information table, the person information 100 for which a position difference between the Y-coordinate of the body coordinate 201 (or the face coordinate 221) included in the received body detection information and the Y-coordinate of the body coordinate 201 (or the face coordinate 221) included in the person information 100 is equal to or smaller than the body width threshold value W2 and a position difference between the X-coordinate of the body coordinate 201 included in the received body detection information and the X-coordinate of the body coordinate 201 or the X-coordinate of the face coordinate 221 included in the person information 100 is smaller than the body thickness threshold value W, the detected person information 100 may be the information by which the person is estimated to be the same person as the person 1 indicated by the body detection information.

Similarly, when the management device 50 can detect, from the person information table, the person information 100 for which the position difference between the Y-coordinate of the body coordinate 201 (or the face coordinate 221) included in the received body detection information and the Y-coordinate of the body coordinate 201 (or the face coordinate 221) included in the person information 100 is smaller than the body width threshold value W2 and a position difference between the X-coordinate of the face coordinate 221 included in the received face detection information and the X-coordinate of the body coordinate 201 or the X-coordinate of the face coordinate 221 included in the person information 100 is smaller than the body thickness threshold value W, the detected person information 100 may be the information by which the person is estimated to be the same person as the person 1 indicated by the face detection information.

The condition related to the position difference of the Y-coordinate and the body width threshold value W2 and the condition related to the position difference of the X-coordinate and the body thickness threshold value W described above are satisfied when a time difference between a face image capturing time point included in the face detection information or the body image capturing time point included in the body detection information and a face image updating time point 126 or a body image updating time point 123 included in the person information 100 is sufficiently small (that is, when the time difference is smaller than a predetermined time threshold value T). This is because the person 1 is moving, and thus when the time difference is large, the person information 100, which satisfies the condition related to the position difference of the Y-coordinate and the body width threshold value W2 and the condition related to the position difference of the X-coordinate and the body thickness threshold value W described above, is more likely to be information by which the person is estimated to be another person located at the position in the past.

That is, the following process may be performed in step S301 of FIG. 8. The management device 50 detects, from the person information table, the person information 100 for which a time difference between the face image capturing time point included in the face detection information and the face image updating time point 108 or the body image updating time point 105 included in the person information 100 is less than the predetermined time threshold value T, a position difference between the Y-coordinate of the face coordinate 221 included in the face detection information and the Y-coordinate of the face coordinate 109 included in the person information 100 is less than the body width threshold value W2, and a position difference between the X-coordinate of the face coordinate 221 included in the face detection information and the X-coordinate of the face coordinate 109 or the X-coordinate of the body coordinate 106 included in the person information 100 is less than the body thickness threshold value W.

Further, the following process may be performed in step S401 of FIG. 9. The management device 50 detects, from the person information table, the person information 100 for which a time difference between the body image capturing time point included in the body detection information and the face image updating time point 108 or the body image updating time point 105 included in the person information 100 is less than the predetermined time threshold value T, a position difference between the Y-coordinate of the body coordinate 201 included in the body detection information and the Y-coordinate of the body coordinate 106 included in the person information 100 is less than the body width threshold value W2, and a position difference between the X-coordinate of the body coordinate 201 included in the body detection information and the X-coordinate of the face coordinate 109 or the X-coordinate of the body coordinate 106 included in the person information 100 is less than the body thickness threshold value W.

The contents described above can be described as follows. That is, when a difference between a position (for example, the body coordinate 201 or the face coordinate 221) of the person 1 included in a first image (for example, the body image 200 or the face image 220) captured by the first image capturing devices 21 and a position (for example, the body coordinate 201 or the face coordinate 221) of the person 1 included in a second image (for example, the body image 200 or the face image 220) captured by the second image capturing devices 22 is smaller than the predetermined threshold value W based on the body thickness of the person, the management device 50 estimates that the position of the person 1 included in the first image and the position of the person 1 included in the second image indicate the position of the same person.

Accordingly, for example, the management device 50 can estimate whether the first image acquired by capturing a front side of the person 1 and the second image acquired by capturing a rear side of the person 1 belong to the same person.

Case in Which There Is Accompanying Person

Figure 16:
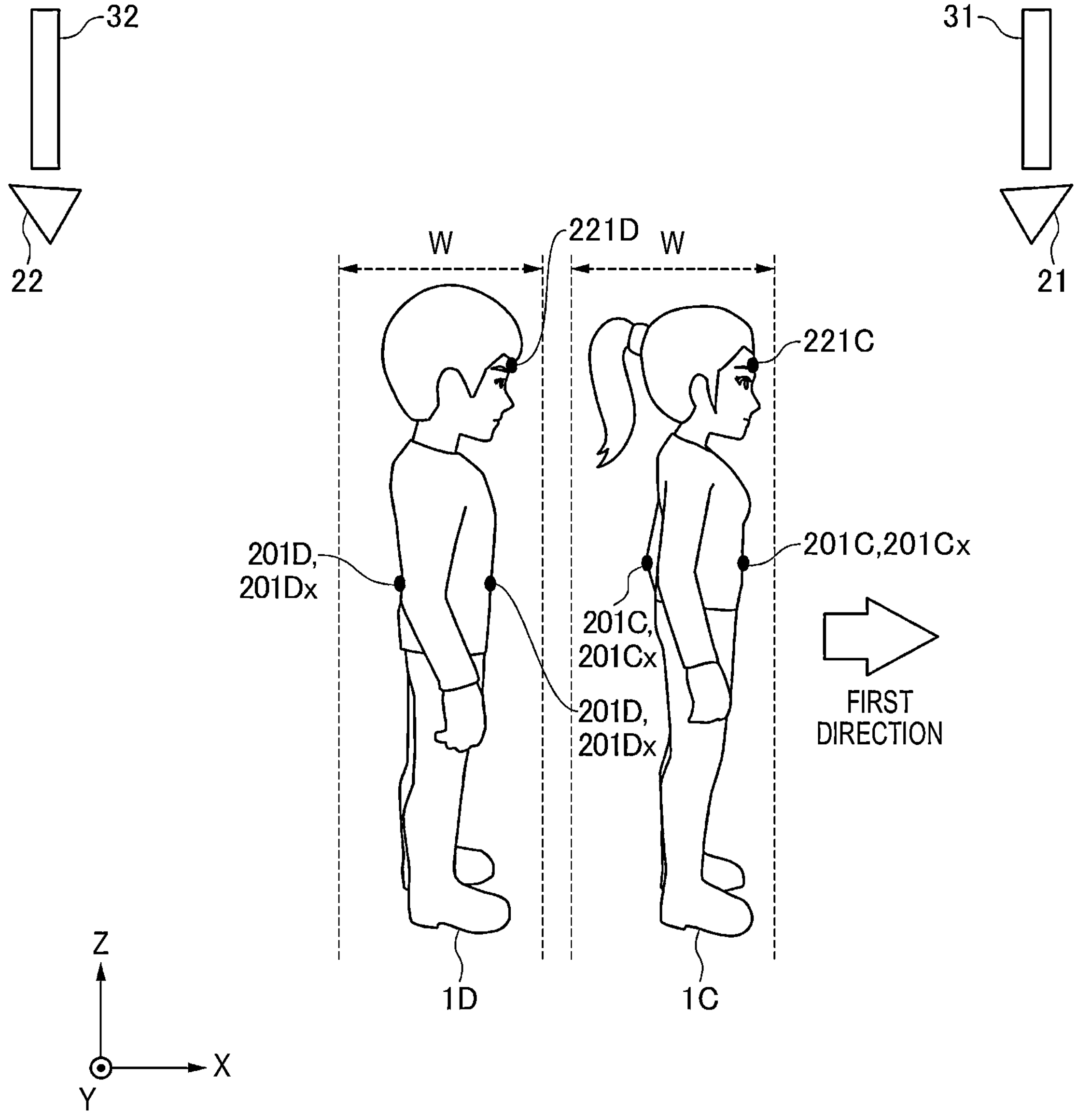
FIG. 16 is a diagram for illustrating a case in which there is a person walking immediately behind a person walking in front according to Embodiment 1.

FIG. 16 is a diagram for illustrating a case in which there is a person (hereinafter, referred to as an accompanying person 1D) walking immediately behind a person (hereinafter, referred to as a front person 1C) walking in front according to Embodiment 1. In FIG. 16, it is assumed that the front person 1C and the accompanying person 1D move in the first direction. Regarding a case in which the front person 1C and the accompanying person 1D move in the second direction, in the following description, the "first image capturing devices 21" may be described as the "second image capturing devices 22", the "second image capturing devices 22" may be described as the "first image capturing devices 21", and the "first edge device 41" may be described as the "second edge device 42".

The body image 200 captured by the first image capturing devices 21 shows a front view of the body of the front person 1C. Therefore, the first edge device 41 generates body detection information (hereinafter, referred to as the body detection information of the front person 1C) based on the body image 200 showing the front view of the body of the front person 1C, and transmits the body detection information to the management device 50.

The body image 200 captured by the second image capturing devices 22 shows a rear view of the body of the accompanying person 1D. Therefore, the second edge device 42 generates body detection information (hereinafter, referred to as the body detection information of the accompanying person 1D) based on the body image 200 showing the rear view of the body of the accompanying person 1D, and transmits the body detection information to the management device 50.

A position difference between an X-coordinate 201Cx of a body coordinate 201C included in the body detection information of the front person 1C and an X-coordinate 201Dx of a body coordinate 201D included in the body detection information of the accompanying person 1D is larger than the body thickness threshold value W of one person. Therefore, the management device 50 can estimate the front person IC and the accompanying person 1D as different persons by the above method of detecting the person information 100 of the same person.

A process of estimating whether the persons are the accompanying persons may be executed when a Y-coordinate of the body coordinate 201C of a first person and a Y-coordinate of the body coordinate 201D of a second person are less than the body width threshold value W2, and may not be executed when the Y-coordinate of the body coordinate 201C of the first person and the Y-coordinate of the body coordinate 201D of the second person are equal to or larger than the body width threshold value W2. This is because when the Y-coordinate of the body coordinate 201C of the first person and the Y-coordinate of the body coordinate 201D of the second person are equal to or larger than the body width threshold value W2, the first person and the second person are not walking in an accompanying manner, and thus it is not necessary to estimate whether the persons are the accompanying persons.

In addition, since the face of the accompanying person 1D is hidden by the front person 1C, the first image capturing devices 21 cannot capture an image of the face of the accompanying person 1D. Therefore, regarding the accompanying person 1D, the first edge device 41 displays, on the first display device 31, a collation result image including the message "unauthorized passing" shown in the pattern (A3) of FIG. 14 or the message "warning" shown in the pattern (A7) of FIG. 14. When displaying the collation result image including the message "unauthorized passing" or "warning", the first edge device 41 may display the body image 200 of the rear side of the accompanying person 1D captured by the second image capturing devices 22 on the first display device 31 together with the message.

That is, even when the accompanying person 1D as shown in FIG. 16 is present, the gate system 9 can determine the front person 1C and the accompanying person 1D as different persons without erroneously determining the front person IC and the accompanying person 1D as the same person in the process in step S401 of FIG. 9. Then, regarding the accompanying person 1D who hides the face by the front person 1C and tries to illegally enters (or exits), the gate system 9 can display the collation result image including the message "unauthorized passing" or "warning".

Method of Detecting Movement Direction of Person

Figure 17:
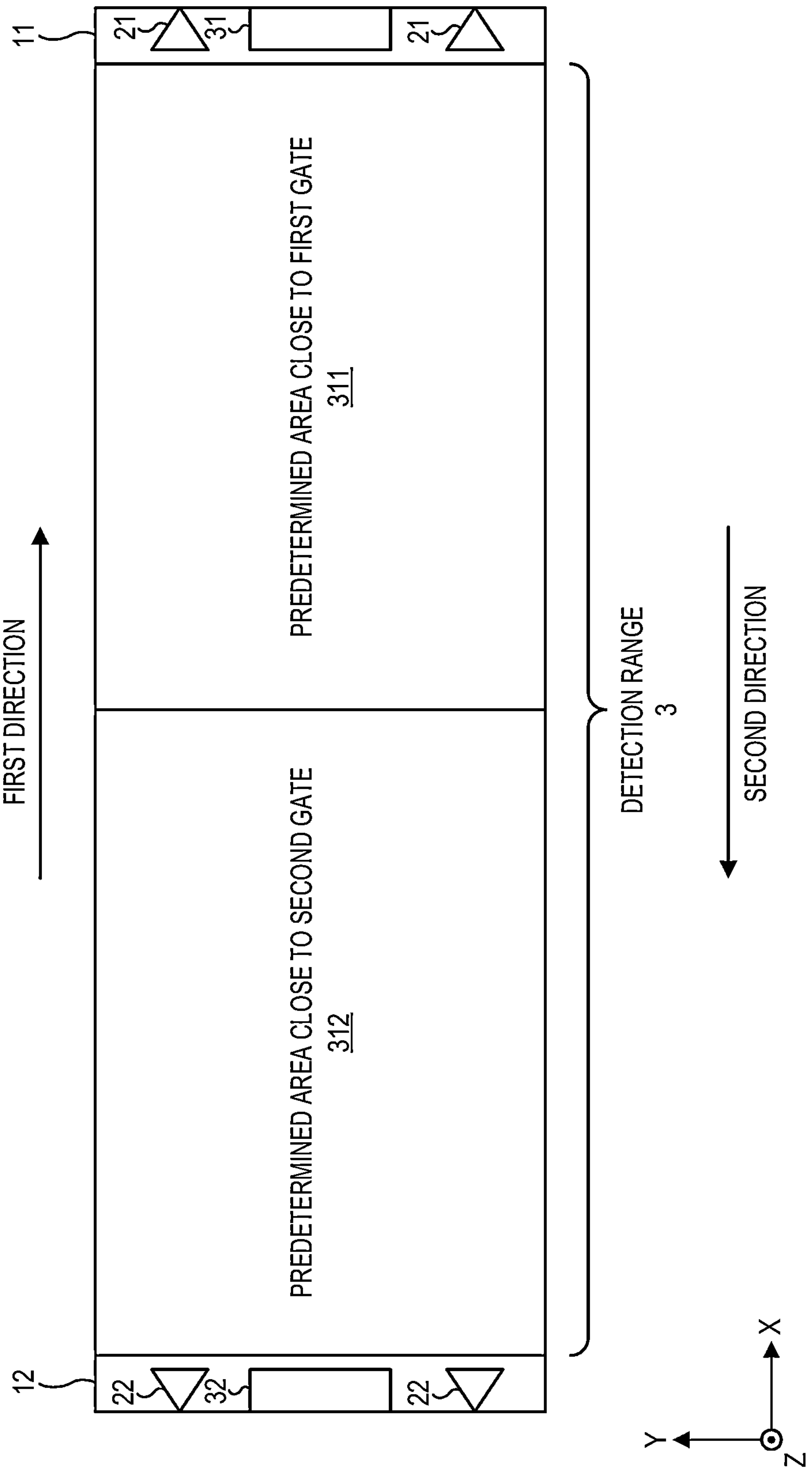
FIG. 17 is a diagram for illustrating a method of detecting a movement direction of a person according to Embodiment 1.

FIG. 17 is a diagram for illustrating the method of detecting the movement direction of the person 1 according to Embodiment 1.

The management device 50 detects the movement direction of the person 1 by, for example, any one of the following first method, second method, and third method.

First Method

The management device 50 detects the movement direction 112 of the person information 100 based on a movement direction of the face coordinate 109 or the body coordinate 106 included in the person information 100 over time. For example, when detecting that the X-coordinate of the face coordinate 109 or the X-coordinate of the body coordinate 106 included in the person information 100 moves in a positive direction of the X-axis over time, the management device 50 detects the movement direction 112 of the person 1 as the first direction. When detecting that the X-coordinate of the face coordinate 109 or the X-coordinate of the body coordinate 106 included in the person information 100 moves in a negative direction of the X-axis over time, the management device 50 detects the movement direction 112 of the person 1 as the second direction.

Second Method

The management device 50 determines, based on the image capturing device ID, whether the captured image of the person 1 detected for the first time is captured by the first image capturing devices 21 or is captured by the second image capturing devices 22. When the captured image of the person 1 detected for the first time is captured by the first image capturing devices 21, the management device 50 detects the movement direction 112 of the person 1 as the first direction. This is because the image of the person 1 entering the detection area 3 from the second gate 12 is first captured by the first image capturing devices 21 provided in the first gate 11. When the captured image of the person 1 detected for the first time is captured by the second image capturing devices 22, the management device 50 detects the movement direction 112 of the person 1 as the second direction. This is because the image of the person 1 entering the detection area 3 from the first gate 11 is first captured by the second image capturing devices 22 provided in the second gate 12.

Third Method

As shown in FIG. 17, when the face coordinate 109 or the body coordinate 106 of the person 1 detected for the first time is included in a predetermined area 312 closer to the second gate 12 in the detection area 3, the management device 50 detects the movement direction 112 of the person 1 as the first direction. This is because the person 1 entering the detection area 3 from the second gate 12 first enters the predetermined area 312 closer to the second gate 12. When the face coordinate 109 or the body coordinate 106 of the person 1 detected for the first time is included in a predetermined area 311 closer to the first gate 11 in the detection area 3, the management device 50 detects the movement direction 112 of the person 1 as the second direction. This is because the person 1 entering the detection area 3 from the first gate 11 first enters the predetermined area 311 closer to the first gate 11.

Embodiment 2

The gate system 9 according to Embodiment 2 has the same configuration as the gate system 9 described in Embodiment 1. In Embodiment 2, the same reference numerals are given to the components described in Embodiment 1, and the description thereof may be omitted.

Figure 18:
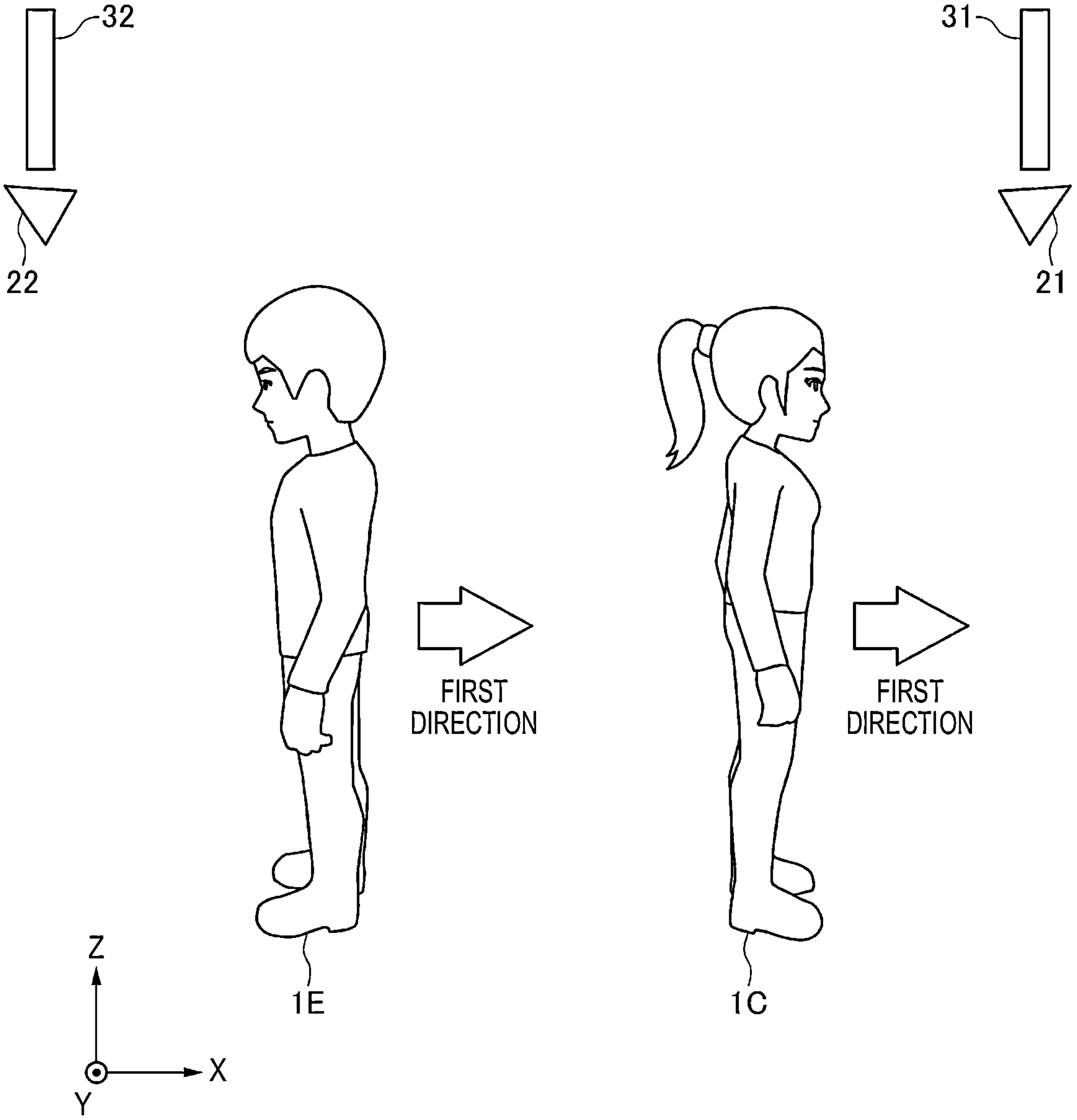
FIG. 18 is a diagram for illustrating a case in which there is a person facing backward and moving in a first direction according to Embodiment 2.

FIG. 18 is a diagram for illustrating a case in which there is a person 1E facing backward and moving in the first direction according to Embodiment 2.

In a case in which the gate system 9 includes only the first gate 11 and does not include the second gate 12, since an image of the face of the person 1E who faces backward and moves in the first direction cannot be captured, the gate system 9 determines that the person 1E is performing unauthorized passing (see the pattern (A3) in FIG. 14). In contrast, in the gate system 9 according to Embodiment 2, the second image capturing devices 22 provided in the second gate 12 can also capture an image of the face of the person 1E who faces backward and moves in the first direction. Therefore, even when the image of the face of the person 1E who faces backward and moves in the first direction is captured by the second image capturing devices 22, the gate system 9 according to Embodiment 2 displays, to the person 1E, a face image of the person 1E including the message "warning" on the second display device 32 provided in the second gate 12, and then displays a collation result image of the person 1E on the first display device 31 provided in the first gate 11. Accordingly, the gate system 9 can also perform the face collation for the person 1E who faces backward and moves in the first direction, and display the collation result image on the display device located ahead of the movement direction of the person 1. Hereinafter, the details will be described.

Figure 19:
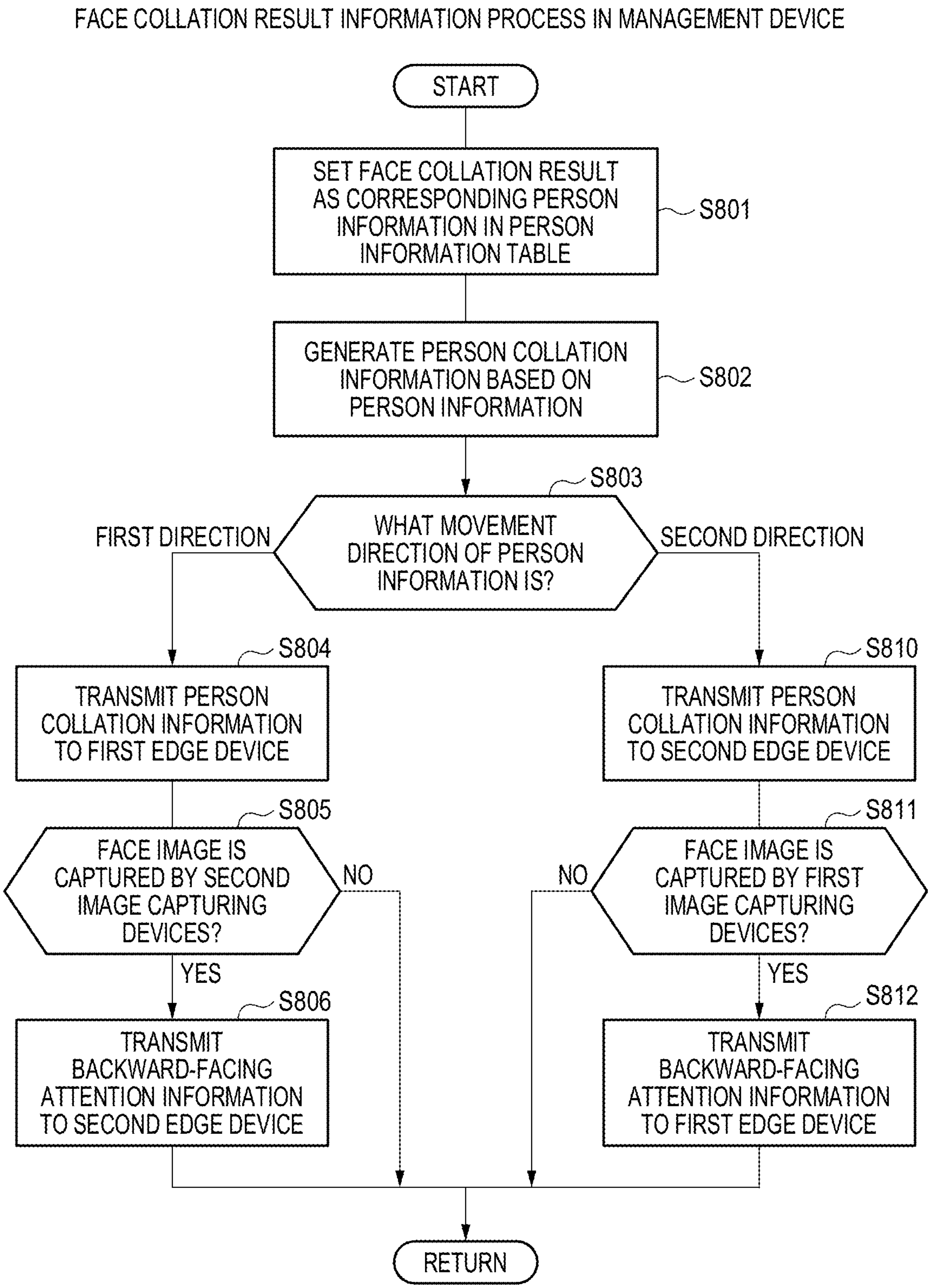
FIG. 19 is a flowchart showing an example of the face collation result information process according to Embodiment 2.

FIG. 19 is a flowchart showing an example of the face collation result information process according to Embodiment 2. The management device 50 according to Embodiment 2 may perform the following process described with reference to FIG. 19 in the face collation result information process (S206) shown in FIG. 7.

The management device 50 sets the contents of the face collation result information received from the face collation device 60 as the person information 100 corresponding to the face collation result information in the person information table (S801).

The management device 50 generates the person collation information based on the person information 100 set in step S801 (S802).

The management device 50 determines whether the movement direction of the person information 100 set in step S801 is the first direction or the second direction (S803).

Next, a process in a case in which the movement direction is determined as the first direction in step S803 (S803: the first direction) will be described.

The management device 50 transmits the person collation information generated in step S802 to the first edge device 41 (S804).

The management device 50 determines whether the face image included in the person collation information is captured by the second image capturing devices 22 (S805).

When the face image included in the person collation information is not captured by the second image capturing devices 22 (S805: NO), the management device 50 completes the process.

When the face image included in the person collation information is captured by the second image capturing devices 22 (S805: YES), the management device 50 transmits, to the second edge device 42, backward-facing attention information including the same tracking ID as the tracking ID included in the person collation information (S806), and completes the process. The second edge device 42 that has received the backward-facing attention information displays, on the second display device 32, a message (hereinafter, referred to as a backward-facing attention message) for paying attention to backward movement to the person 1 corresponding to the tracking ID, as shown in a collation result image 70D of FIG. 2. Accordingly, the backward-facing attention message can be visually confirmed by the person 1 who faces backward and moves in the first direction.

Next, a process in a case in which the movement direction is determined as the second direction in step S803 (S803: the second direction) will be described.

The management device 50 transmits the person collation information generated in step S802 to the second edge device 42 (S810).

The management device 50 determines whether the face image included in the person collation information is captured by the first image capturing devices 21 (S811).

When the face image included in the person collation information is not captured by the first image capturing devices 21 (S811: NO), the management device 50 completes the process.

When the face image included in the person collation information is captured by the first image capturing devices 21 (S811: YES), the management device 50 transmits, to the first edge device 41, the backward-facing attention information including the same tracking ID as the tracking ID included in the person collation information (S812), and completes the process. The first edge device 41 that has received the backward-facing attention information displays, on the first display device 31, the message (the backward-facing attention message) for paying attention to the backward movement to the person corresponding to the tracking ID, as shown in the collation result image 70D of FIG. 2. Accordingly, the backward-facing attention message can be visually confirmed by the person 1 who faces backward and moves in the second direction.

The contents of Embodiment 2 described above can be described as follows. That is, when the face image 220 of the person 1 moving in the first direction is captured by the second image capturing devices 22, the management device 50 causes the second display device 32 to display warning information (for example, the backward-facing attention message), and when the face image 220 of the person 1 moving in the second direction is captured by the first image capturing devices 21, the management device 50 causes the first display device 31 to display the warning information (for example, the backward-facing attention message).

Accordingly, the management device 50 can display, to the person 1E who moves backward, the warning information on the display device on the side on which the person 1E can visually confirm the warning information.

Embodiment 3

The gate system 9 according to Embodiment 3 has the same configuration as the gate system 9 described in Embodiment 1. In Embodiment 3, the same reference numerals are given to the components described in Embodiment 1, and the description thereof may be omitted.

Figure 20A:
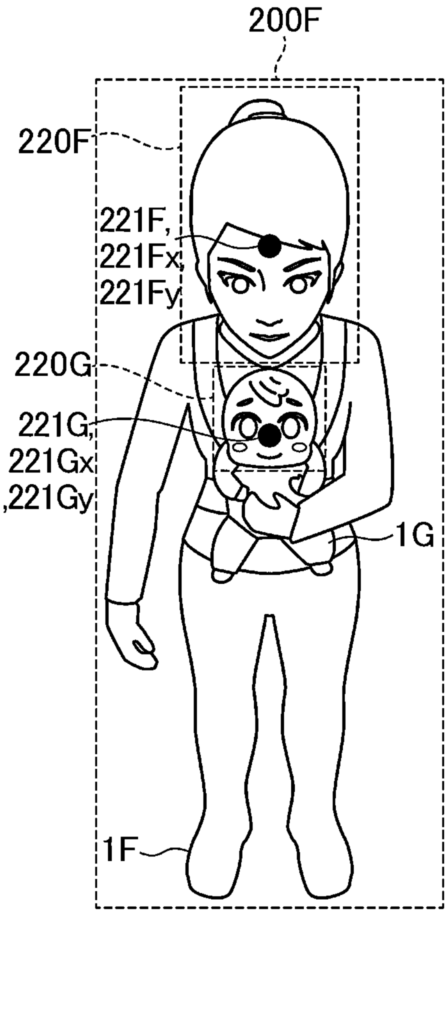
FIGS. 20A and 20B are a diagram showing an example according to Embodiment 3 in which an adult holds a child.
Figure 20B:
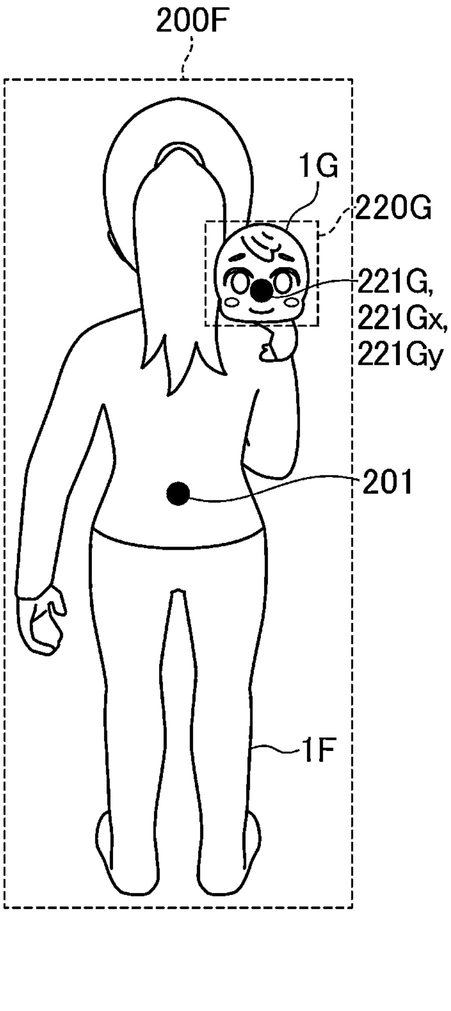

FIGS. 20A and 20B are a diagram showing an example according to Embodiment 3 in which an adult 1F holds a child 1G. FIG. 20A shows a case in which the face of the child 1G held by the adult 1F faces forward. FIG. 20B shows a case in which the face of the child 1G held by the adult 1F faces backward.

As shown in FIGS. 20A and 20B, the adult 1F may pass through the gate while holding the child 1G. In this case, the gate system 9 according to Embodiment 3 detects the face of the adult 1F and the face of the child 1G. In FIGS. 20A and 20B, a face coordinate calculated from a face image 220F of the adult 1F is referred to as an adult face coordinate 221F, and a face coordinate calculated from a face image 220G of the child 1G is referred to as a child face coordinate 221G.

A position difference between a Y-coordinate 221Fy of the adult face coordinate 221F and a Y-coordinate 221Gy of the face coordinate 221G of the child 1G held by the adult 1F may be smaller than the body width threshold value W2 described in Embodiment 1, and a position difference between an X-coordinate 221Fx of the adult face coordinate 221F and an X-coordinate 221Gx of the face coordinate 221G of the child 1G held by the adult 1F may be smaller than the body thickness threshold value W described in Embodiment 1. Therefore, according to the method of detecting the person information 100 of the same person described in Embodiment 1, the management device 50 may erroneously estimate that the face image 220F of the adult and the face image 220G of the child belong to the same person. Thus, when the position differences between the XYZ-coordinates of the two face coordinates 221F and 221G are equal to or larger than the predetermined threshold values, the management device 50 according to Embodiment 3 estimates that these two face coordinates 221F and 221G belong to two different persons who are in a holding relation. This estimation process is referred to as a holding estimation process.

Figure 21:
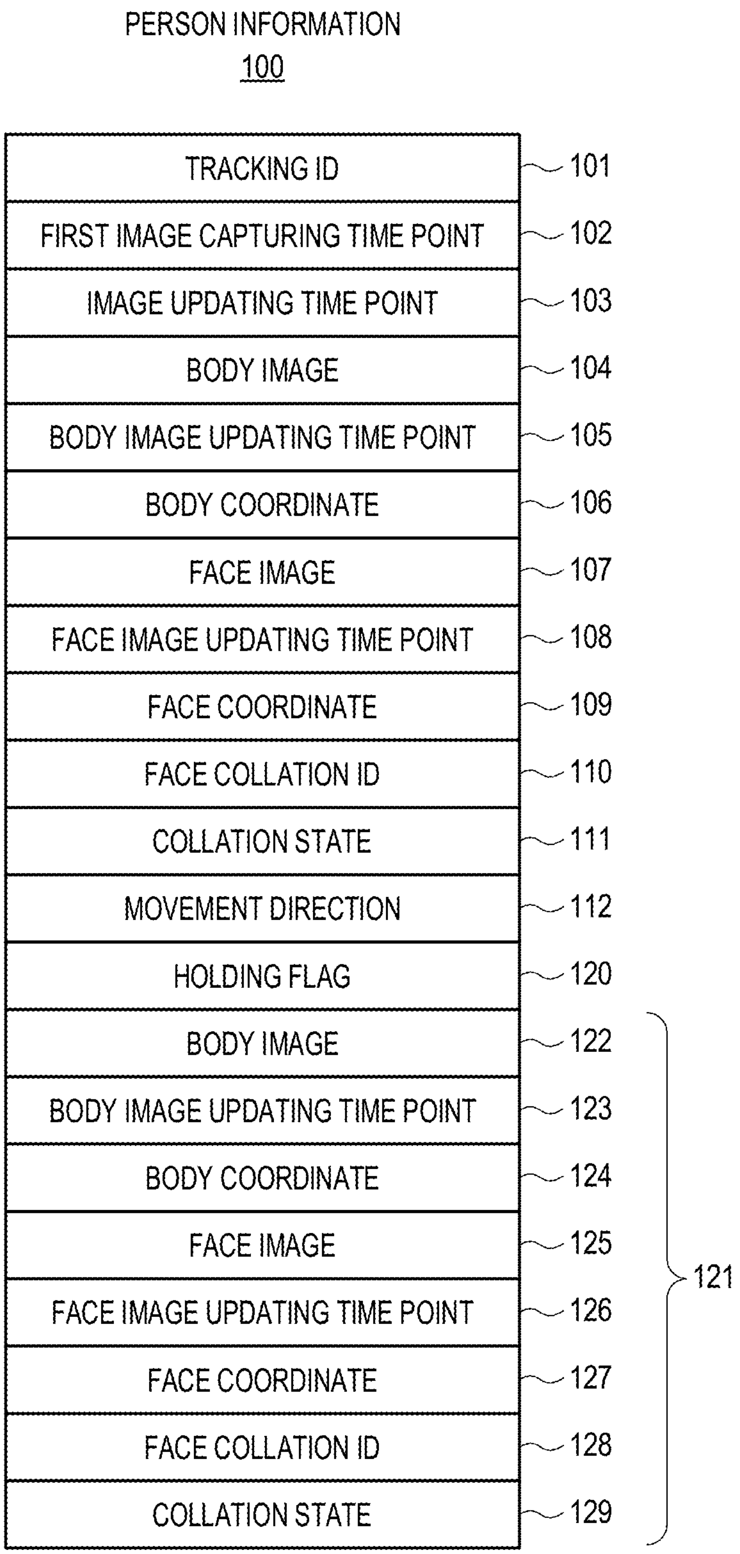
FIG. 21 is a configuration example of the person information according to Embodiment 3.

FIG. 21 shows a configuration example of the person information 100 according to Embodiment 3.

The person information 100 shown in FIG. 21 includes, in addition to the items included in the person information 100 shown in FIG. 6, a holding flag 120 and information related to the person in the holding relation (hereinafter, referred to as holding-related person information 121). The holding flag 120 indicates whether the person information 100 includes the holding-related person information 121. When the person information 100 includes the holding-related person information 121, the holding flag 120 is set to ON. When the person information 100 does not include the holding-related person information 121, the holding flag 120 is set to OFF. Note that the descriptions "ON" and "OFF" are examples, and for example, "1" may be set instead of the "ON" and "0" may be set instead of the "OFF" for the holding flag 120.

The holding-related person information 121 includes, as items, a body image 122, the body image updating time point 123, a body coordinate 124, a face image 125, the face image updating time point 126, a face coordinate 127, a face collation ID 128, and a collation state 129 of the person in the holding relation.

Figure 22:
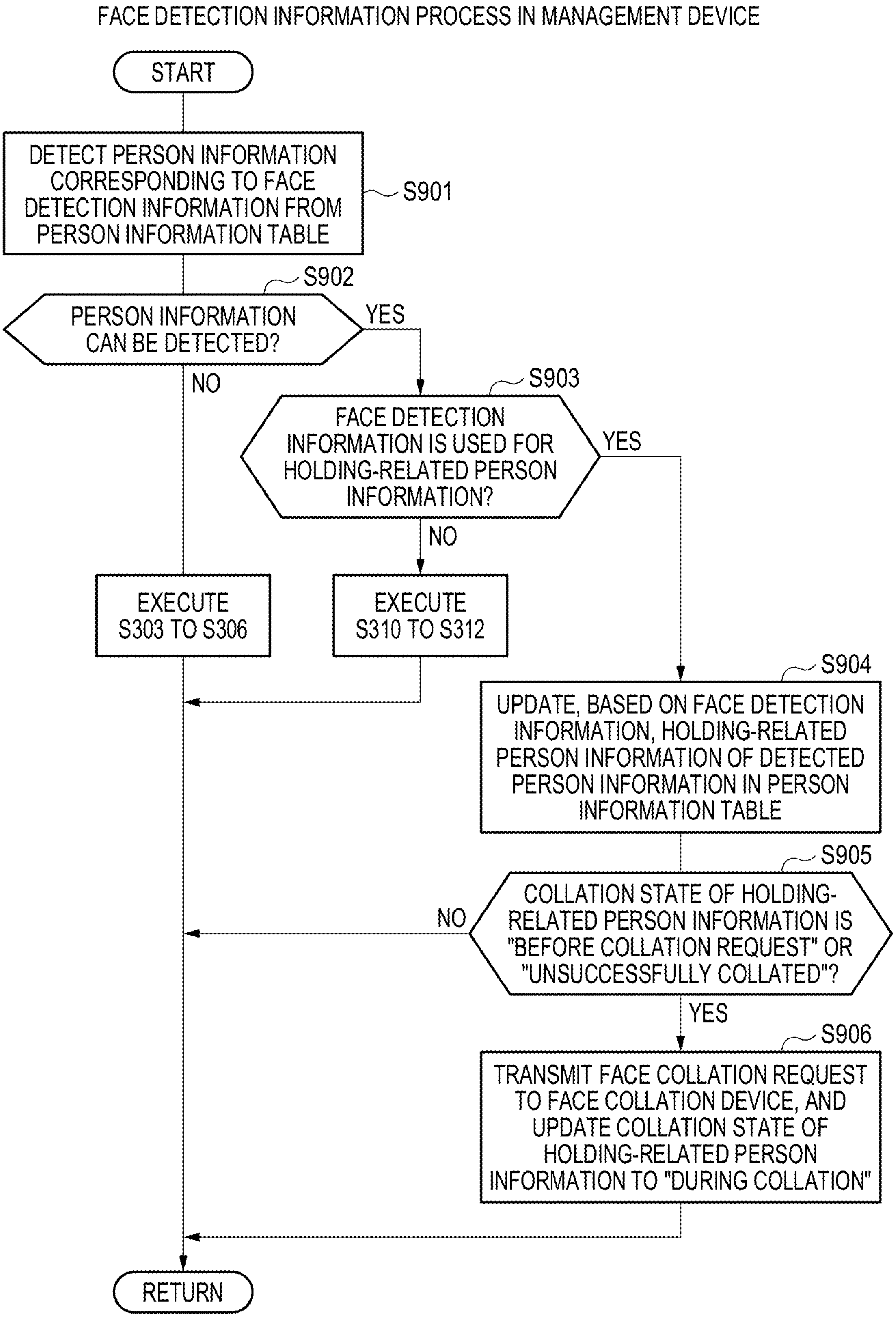
FIG. 22 is a flowchart showing an example of the face detection information process according to Embodiment 3.

FIG. 22 is a flowchart showing an example of the face detection information process according to Embodiment 3. The management device 50 according to Embodiment 3 may perform the following process described with reference to FIG. 22 in the face detection information process (S202) shown in FIG. 7.

The management device 50 detects, from the person information table, the person information 100 corresponding to the face detection information received from the first edge device 41 or the second edge device 42 (S901).

The management device 50 determines whether the person information 100 can be detected from the person information table in step S901 (S902).

When it is determined in step S901 that the person information 100 cannot be detected from the person information table (S902: NO), the management device 50 executes the processes of steps S303 to S306 shown in FIG. 8 and completes the process.

When it is determined in step S901 that the person information 100 can be detected from the person information table (S902: YES), the management device 50 determines whether the face detection information is used for the holding-related person information (S903). For example, the management device 50 performs the determination by performing the above holding estimation process on the face coordinate 221 of the received face detection information and the face coordinate 109 of the person information 100 detected in step S901.

When the face detection information is not used for the holding-related person information (S903: NO), the management device 50 executes the processes of steps S310 to S312 shown in FIG. 8, and completes the process.

When the face detection information is used for the holding-related person information (S903: YES), the management device 50 executes the following process.

The management device 50 updates, based on the face detection information, the holding-related person information 121 included in the person information 100 detected in step S901 in the person information table (S904).

The management device 50 determines whether the collation state 129 of the holding-related person information 121 is the "before collation request" or the "unsuccessfully collated" (S905).

When the collation state 129 of the holding-related person information 121 is the "before collation request" or the "unsuccessfully collated" (S905: YES), the management device 50 transmits a face collation request including the face image 125 and the tracking ID 101 to the face collation device 60, and updates the collation state 129 of the holding-related person information 121 to the "during collation" (S906).

Then, the management device 50 completes the process.

When the collation state 129 of the holding-related person information 121 is neither the "before collation request" nor the "unsuccessfully collated" (S905: NO), the management device 50 completes the process.

Figure 23:
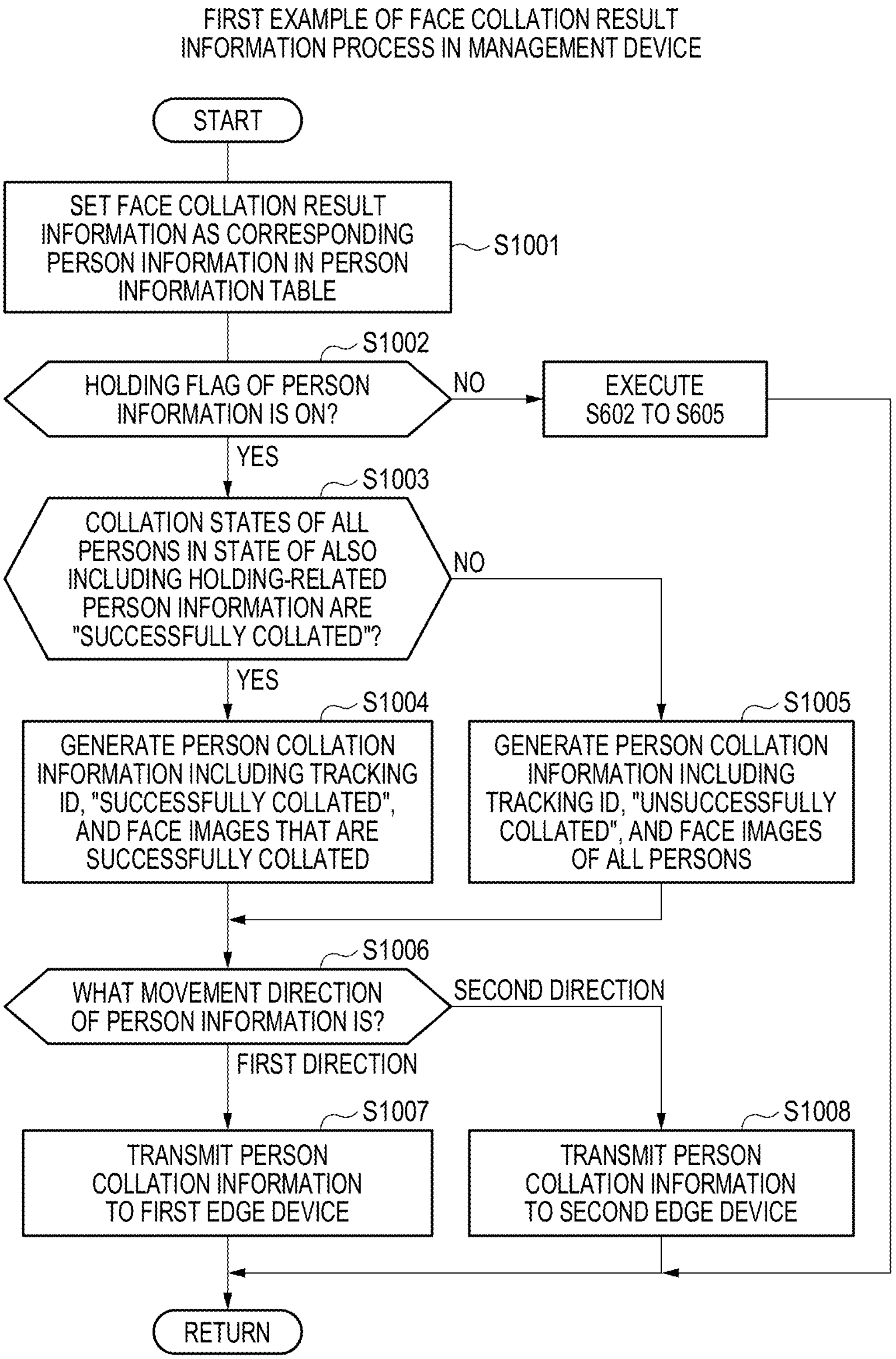
FIG. 23 is a flowchart showing a first example of the face collation result information process according to Embodiment 3.

FIG. 23 is a flowchart showing a first example of the face collation result information process according to Embodiment 3. The management device 50 according to Embodiment 3 may perform the following process described with reference to FIG. 23 in the face collation result information process (S206) shown in FIG. 7.

The management device 50 sets the contents of the face collation result information received from the face collation device 60 as the person information 100 corresponding to the face collation result information in the person information table (S1001).

The management device 50 determines whether the holding flag 120 of the person information 100 is ON (S1002).

When the holding flag 120 of the person information 100 is OFF (S1002: NO), the management device 50 executes the processes of S602 to S605 shown in FIG. 11, and completes the process.

When the holding flag 120 of the person information 100 is ON (S1002: YES), the management device 50 determines whether the collation states 111 and 129 of all the persons included in the person information 100 in a state of also including the holding-related person information 121 are the "successfully collated" (S1003).

When the collation states 111 and 129 of all the persons included in the person information 100 are the "successfully collated" (S1003: YES), the management device 50 generates person collation information including at least the tracking ID 101, the "successfully collated", and the face images 107 and 125 of all the persons included in the person information 100 (S1004), and proceeds the process to step S1006.

When the collation state 111 or 129 of at least one person included in the person information 100 is the "unsuccessfully collated" (S1003: NO), the management device 50 generates person collation information including at least the tracking ID 101, the "unsuccessfully collated", and the face images 107 and 125 of all the persons included in the person information 100 (S1005), and proceeds the process to step S1006.

That is, in the process shown in FIG. 23, the adult 1F and the child 1G who is held are set as one group, when the face collation of both the adult 1F and the child 1G who is held (that is, the face collation of all the persons in the group) is successful, the group is set as the "successfully collated", and when the face collation of at least one of the adult 1F and the child 1G who is held (that is, the face collation of at least one person in the group) is unsuccessful, the group is set as the "unsuccessfully collated".

The management device 50 determines whether the movement direction 112 of the person information 100 is the first direction or the second direction (S1006).

When the movement direction 112 of the person information 100 is the first direction (S1006: the first direction), the management device 50 transmits the person collation information generated in step S1004 or S1005 to the first edge device 41 (S1007), and completes the process. In this case, as shown in the collation result image 70F of FIG. 2, the first edge device 41 collectively displays the face image 107 of the adult 1F and the face image 125 of the child 1G who is held on a display section for one person of the first display device 31, and displays the collation result (that is, the result "successfully collated" or the result "unsuccessfully collated") included in the person collation information.

When the movement direction 112 included in the person information 100 is the second direction (S1006: the second direction), the management device 50 transmits the person collation information generated in step S1004 or S1005 to the second edge device 42 (S1008), and completes the process. In this case, as shown in the collation result image 70F of FIG. 2, the second edge device 42 collectively displays the face image 107 of the adult 1F and the face image 125 of the child 1G who is held on a display section for one person of the second display device 32, and displays the collation result (that is, the result "successfully collated" or the result "unsuccessfully collated") included in the person collation information.

The contents of the first example described above can be described as follows. That is, the management device 50 detects the position of each person 1 moving between the first gate 11 and the second gate 12, when a plurality of different face images 220 are detected within a predetermined range (for example, within a range of the body thickness threshold value W) based on the positions of the persons 1 moving in the first direction and all the face images 220 of the plurality of different face images 220 are successfully collated, causes the first display device 31 to display a collation result including all the face images 220 which are successfully collated, and when a plurality of different face images 220 are detected within a predetermined range (for example, within a range of the body thickness threshold value W) based on the positions of the persons 1 moving in the second direction and all the face images 220 of the plurality of different face images 220 are successfully collated, causes the second display device 32 to display a collation result including all the face images 220 which are successfully collated.

Accordingly, for example, even when the face image 107 of the adult 1F and the face image 125 of the child 1G held by the adult 1F are detected and the face image 125 of the child 1G is captured by the image capturing devices opposite to the movement direction, the management device 50 can cause the display device installed ahead of the movement direction to display both the face image 107 of the adult 1F and the face image 125 of the child 1G.

Figure 24:
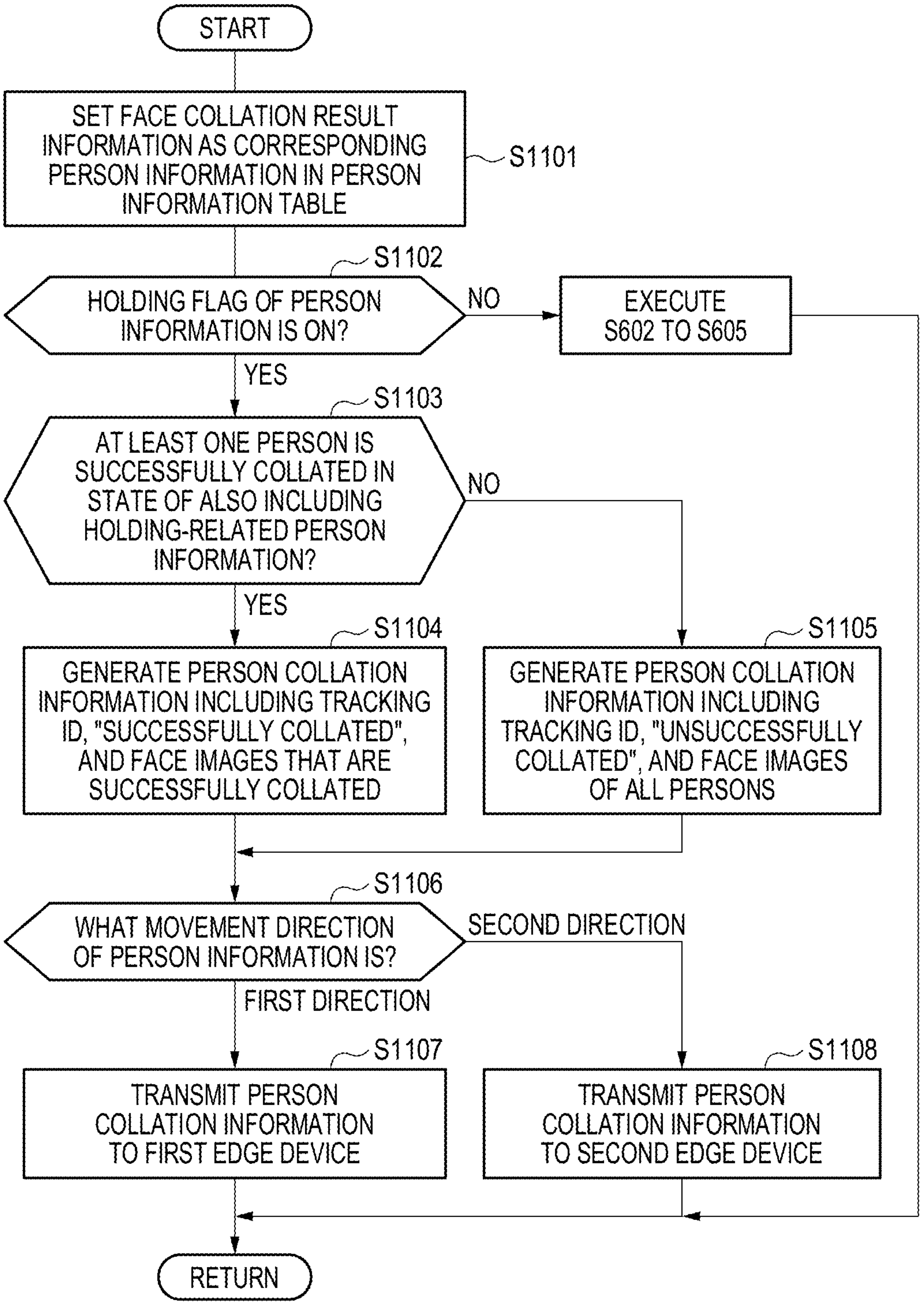
FIG. 24 is a flowchart showing a second example of the face collation result information process according to Embodiment 3.

FIG. 24 is a flowchart showing a second example of the face collation result information process according to Embodiment 3. The management device 50 according to Embodiment 3 may perform the following process described with reference to FIG. 24 in the face collation result information process (S206) shown in FIG. 7. In addition, the management device 50 may adopt the process in the first example shown in FIG. 23 or the process in the second example shown in FIG. 24.

The management device 50 performs the same processes as the processes of steps S1001 to S1002 shown in FIGS. 23 (S1101 to S1102).

When the holding flag 120 of the person information 100 is OFF (S1102: NO), the management device 50 executes the processes of steps S602 to S605 shown in FIG. 11, and completes the process.

When the holding flag 120 of the person information 100 is ON (S1102: YES), the management device 50 determines whether the collation state 111 or 129 of at least one person included in the person information 100 in the state of also including the holding-related person information 121 is the "successfully collated" (S1103).

When the collation state 111 or 129 of at least one person included in the person information 100 is the "successfully collated" (S1103: YES), the management device 50 generates person collation information including at least the tracking ID 101, the "successfully collated", and the face image 107 or 125 which is successfully collated (S1104), and proceeds the process to step S1106.

When the collation states 111 and 129 of all the persons included in the person information 100 are the "unsuccessfully collated" (S1103: NO), the management device 50 generates person collation information including at least the tracking ID 101, the "unsuccessfully collated", and the face images 107 and 125 of all the persons included in the person information 100 (S1105), and proceeds the process to step S1106.

That is, in the process shown in FIG. 24, the adult 1F and the child 1G who is held are set as one group, when the face collation of at least one of the adult 1F and the child 1G who is held (that is, the face collation of at least one person in the group) is successful, the group is set as the "successfully collated", and when the face collation of both the adult 1F and the child 1G who is held (that is, the face collation of all the persons in the group) is unsuccessful, the group is set as the "unsuccessfully collated".

The management device 50 determines whether the movement direction 112 of the person information 100 is the first direction or the second direction (S1106).

When the movement direction 112 of the person information 100 is the first direction (S1106: the first direction), the management device 50 transmits the person collation information generated in step S1104 or S1105 to the first edge device 41 (S1107), and completes the process. In this case, when the person collation information indicates the "successfully collated", the first edge device 41 may display, on the first display device 31, a collation result image including only the face image which is successfully collated and the message "successfully collated". When the person collation information indicates the "unsuccessfully collated", the first edge device 41 may display, on the first display device 31, a collation result image including the face image 107 of the adult 1F, the face image 125 of the child 1G who is held, and the message "unsuccessfully collated".

When the movement direction of the person information 100 is the second direction (S1106: the second direction), the management device 50 transmits the person collation information generated in step S1104 or S1105 to the second edge device 42 (S1108), and completes the process. In this case, when the person collation information indicates the "successfully collated", the second edge device 42 may display, on the second display device 32, the collation result image including only the face image which is successfully collated and the message "successfully collated". When the person collation information indicates the "unsuccessfully collated", the second edge device 42 may display, on the second display device 32, the collation result image including the face image 107 of the adult 1F, the face image 125 of the child 1G who is held, and the message "unsuccessfully collated".

The contents of the second example described above can be described as follows. That is, the management device 50 detects the position of each person 1 moving between the first gate 11 and the second gate 12, when the plurality of different face images 220 are detected within the predetermined range (for example, within the range of the body thickness threshold value W) based on the positions of the persons 1 moving in the first direction and at least one face image 220 of the plurality of different face images 220 is successfully collated, causes the first display device 31 to display a collation result including the at least one face image 220 which is successfully collated, and when the plurality of different face images 220 are detected within the predetermined range (for example, within the range of the body thickness threshold value W) based on the positions of the persons 1 moving in the second direction and at least one face image 220 of the plurality of different face images 220 is successfully collated, causes the second display device 32 to display a collation result including the at least one face image 220 which is successfully collated.

Accordingly, for example, even when the face image 107 of the adult 1F and the face image 125 of the child 1G held by the adult 1F are detected and one of the face images is unsuccessfully collated, the management device 50 can cause the display device installed ahead of the movement direction to display the face image which is successfully collated.

Embodiment 4

The gate system 9 according to Embodiment 4 has the same configuration as the gate system 9 described in Embodiment 1. In Embodiment 4, the same reference numerals are given to the components described in Embodiment 1, and the description thereof may be omitted.

Figure 25:
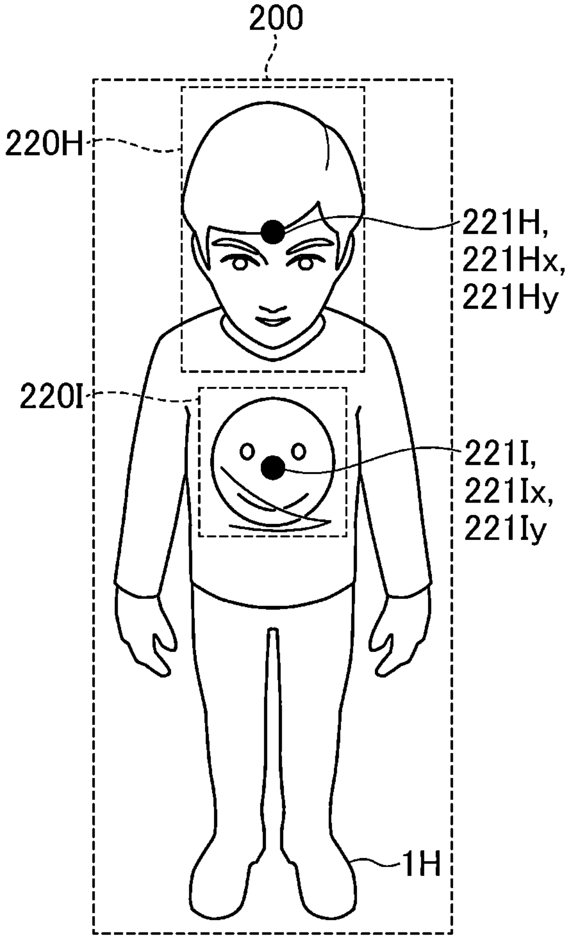
FIG. 25 is a diagram showing an example in which a human face is printed on clothes worn by a person according to Embodiment 4.

FIG. 25 is a diagram showing an example in which a human face picture is printed on clothes worn by a person 1H according to Embodiment 4.

As shown in FIG. 25, the human face picture may be printed on the clothes worn by the person 1H. Hereinafter, the face picture printed on the clothes is referred to as a face image 220I on the clothes. In this case, in a face detection process, a face image 220H of the person 1H and the face image 220I on the clothes may be detected. In the present embodiment, a face coordinate calculated from the face image 220H of the person is referred to as a face coordinate 221H of the person, and a face coordinate calculated from the face image 220I on the clothes is referred to as a face coordinate 221I of the clothes.

A position difference between a Y-coordinate 221Hy of the face coordinate 221H of the person and a Y-coordinate 221Iy of the face coordinate 221I of the clothes may be smaller than the body width threshold value W2 described in Embodiment 1, and a position difference between an X-coordinate 221Hx of the face coordinate 221H of the person and an X-coordinate 221Ix of the face coordinate 221I of the clothes may be smaller than the body thickness threshold value W described in Embodiment 1. Therefore, the face image 220H of the person and the face image 220I on the clothes may be erroneously estimated to belong to the same person. Thus, when a position difference between Z-coordinates of the two face coordinates 221H and 221I is equal to or larger than a predetermined threshold value, the management device 50 according to Embodiment 4 determines which one of the two face images 220H and 220I is the face image of the person. This determination process is referred to as a multi-face determination process.

As shown in FIG. 25, typically, the face image 220H of the person is located at a position higher than the face image 220I on the clothes (in a positive direction of the Z-axis). Therefore, when the two face images 220H and 220I are detected, in the multi-face determination process, the management device 50 may determine the face image located on the higher side (in the positive direction of the Z-axis) as the face image 220H of the person. In the present embodiment, in order to make the description easy to understand, an example in which one of the two face images 220H and 220I is the face image 220I on the clothes will be described, but two or more of a plurality of face images may be the face image on the clothes.

Figure 26:
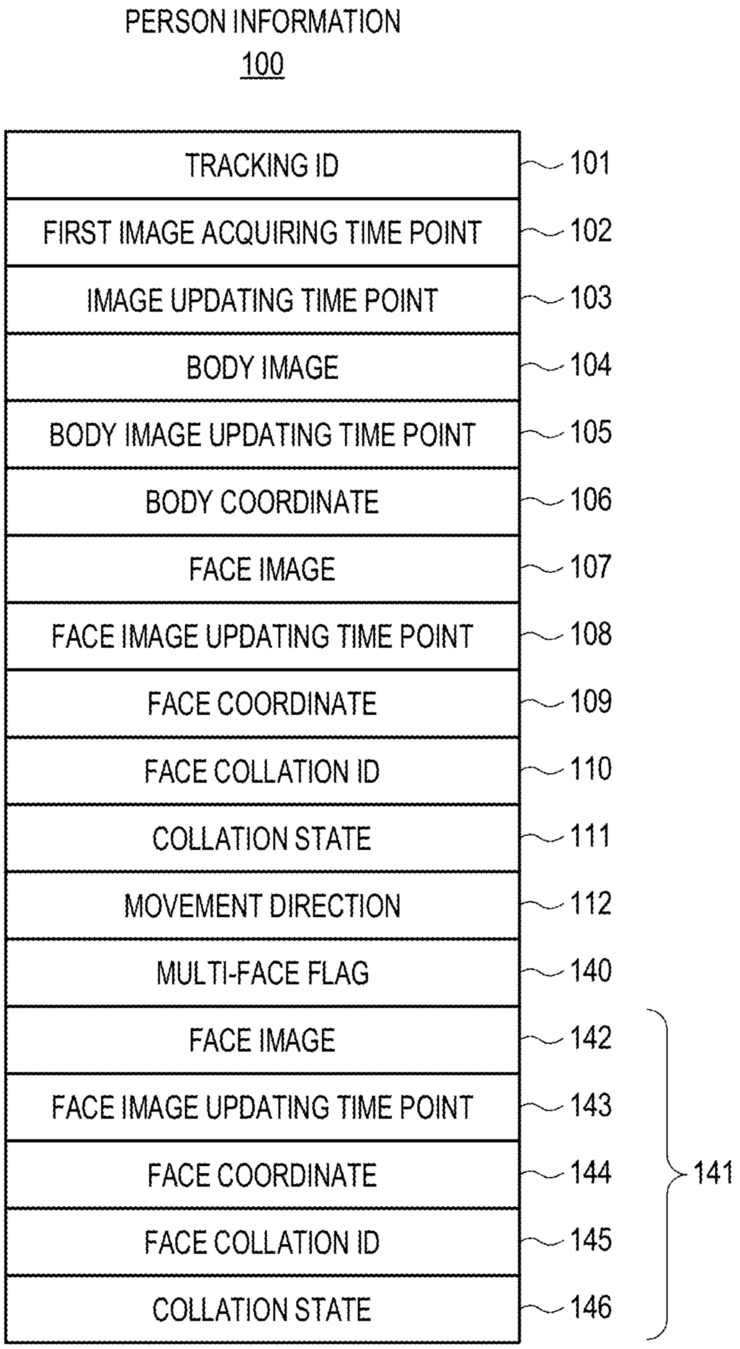
FIG. 26 is a configuration example of the person information according to Embodiment 4.

FIG. 26 shows a configuration example of the person information 100 according to Embodiment 4.

The person information 100 shown in FIG. 26 includes, in addition to the items included in the person information 100 shown in FIG. 6, a multi-face flag 140 and information related to a plurality of faces (hereinafter, referred to as multi-face information 141). The multi-face flag 140 indicates whether the person information 100 includes the multi-face information 141. When the person information 100 includes the multi-face information 141, the multi-face flag 140 may be set to ON. When the person information 100 does not include the multi-face information 141, the multi-face flag 140 may be set to OFF. Note that the descriptions "ON" and "OFF" are examples, and for example, "1" may be set instead of the "ON" and "0" may be set instead of the "OFF" for the multi-face flag 140.

The multi-face information 141 includes, as items, a face image 142, a face image updating time point 143, a face coordinate 144, a face collation ID 145, and a collation state 146 of a face picture of a face or on clothes of a person in a multi-face relation.

Figure 27:
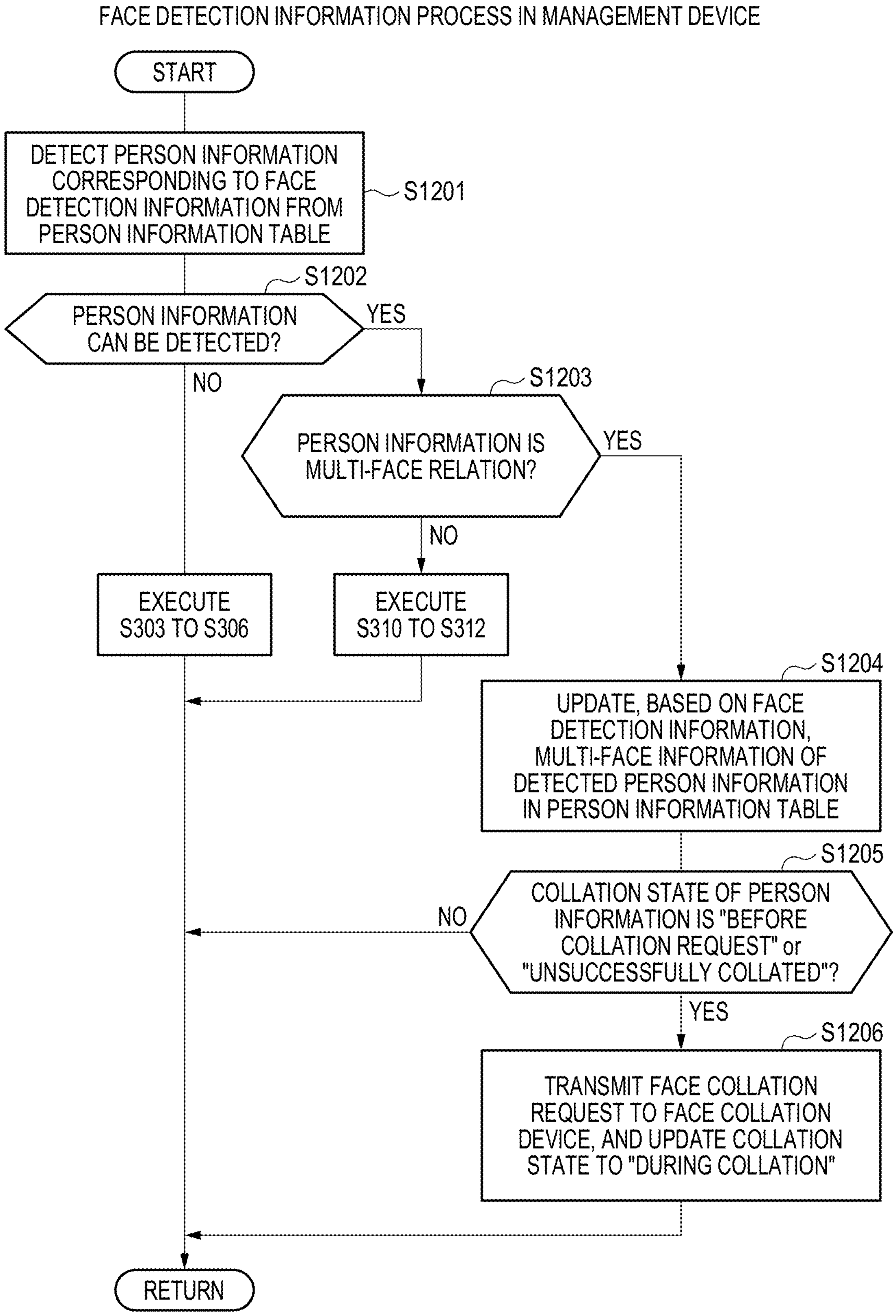
FIG. 27 is a flowchart showing an example of the face detection information process according to Embodiment 4.

FIG. 27 is a flowchart showing an example of the face detection information process according to Embodiment 4. The management device 50 according to Embodiment 4 may perform the following process described with reference to FIG. 27 in the face detection information process (S202) shown in FIG. 7.

The management device 50 detects, from the person information table, the person information 100 corresponding to the face detection information received from the first edge device 41 or the second edge device 42 (S1201).

The management device 50 determines whether the person information 100 can be detected from the person information table in step S1201 (S1202).

When it is determined in step S1201 that the person information 100 cannot be detected from the person information table (S1202: NO), the management device 50 executes the processes of steps S303 to S306 shown in FIG. 8 and completes the process.

When it is determined in step S1201 that the person information 100 can be detected from the person information table (S1202: YES), the management device 50 determines whether the face detection information is used for the multi-face relation (S1203). For example, the management device 50 performs the determination by performing the above multi-face determination process on the face coordinate 221 of the received face detection information and the face coordinate 109 of the person information 100 detected in step S1201.

When the face detection information is not used for the multi-face relation (S1203: NO), the management device 50 executes the processes of steps S310 to S312 shown in FIG. 8, and completes the process.

When the face detection information is used for the multi-face relation (S1203: YES), the management device 50 executes the following process.

The management device 50 updates, based on the face detection information, the multi-face information 141 included in the person information 100 detected in step S1201 in the person information table (S1204).

The management device 50 determines whether the collation state 129 of the multi-face information 141 is the "before collation request" or the "unsuccessfully collated" (S1205).

When the collation state 129 of the multi-face information 141 is the "before collation request" or the "unsuccessfully collated" (S1205: YES), the management device 50 transmits the face collation request including the face image 125 and the tracking ID 101 to the face collation device 60, and updates the collation state 129 of the person information 100 to the "during collation" (S1206). Then, the management device 50 completes the process.

When the collation state 129 of the multi-face information 141 is neither the "before collation request" nor the "unsuccessfully collated" (S1205: NO), the management device 50 completes the process.

Figure 28:
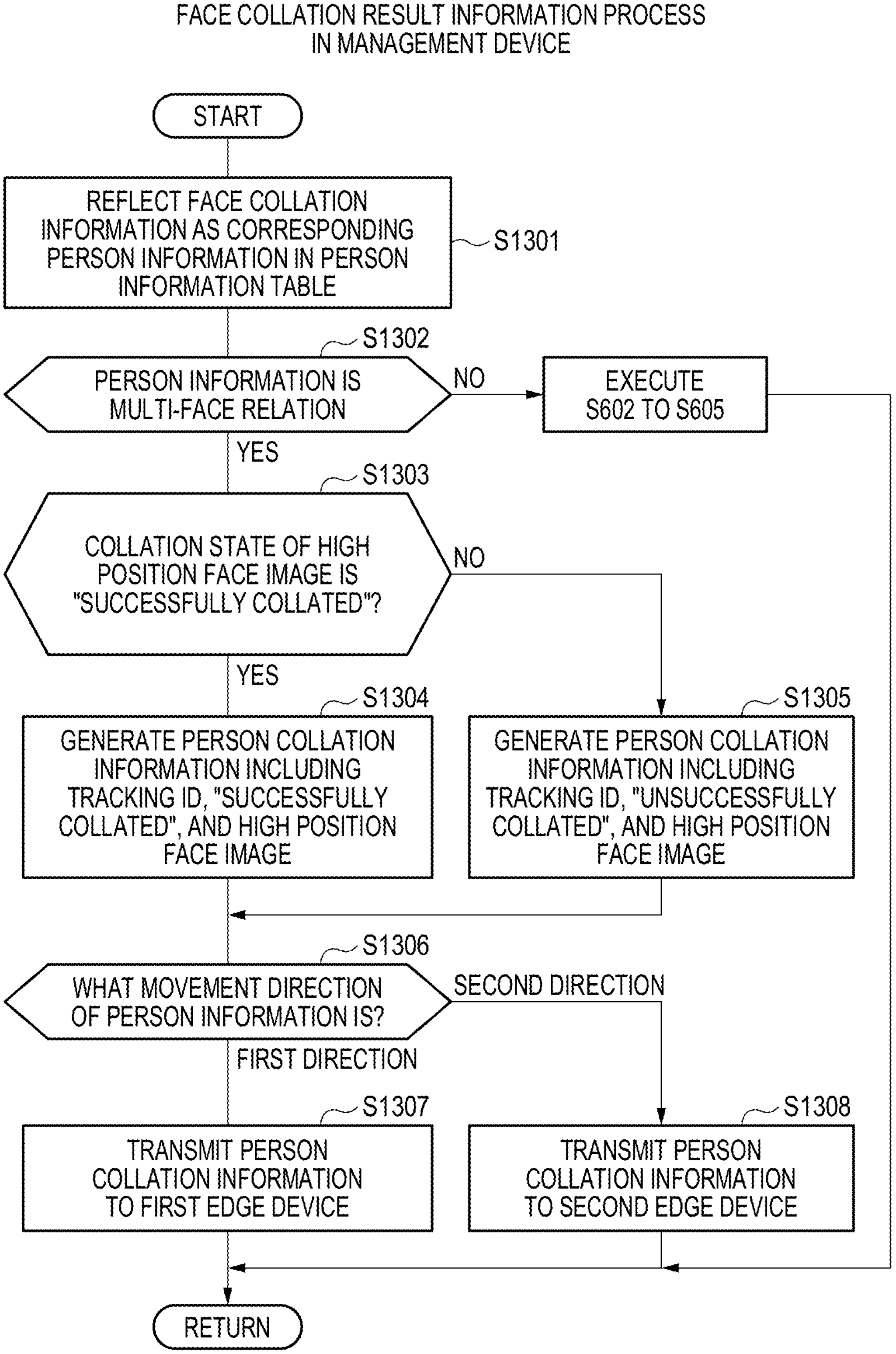
FIG. 28 is a flowchart showing an example of the face collation result information process according to Embodiment 4.

FIG. 28 is a flowchart showing an example of the face collation result information process according to Embodiment 4. The management device 50 according to Embodiment 4 may perform the following process described with reference to FIG. 28 in the face collation result information process (S206) shown in FIG. 7.

The management device 50 sets the contents of the face collation result information received from the face collation device 60 as the person information 100 corresponding to the face collation result information in the person information table (S1301).

The management device 50 determines whether the multi-face flag 140 of the person information 100 is ON (S1302).

When the multi-face flag 140 of the person information 100 is OFF (S1302: NO), the management device 50 executes the processes of steps S602 to S605 shown in FIG. 11, and completes the process.

When the multi-face flag 140 of the person information 100 is ON (S1302: YES), the management device 50 determines whether the collation state 111 or 146 of the face image including the face coordinate 109 and 144 at the highest position (hereinafter, referred to as a high position face image) among the two or more face images 107 and 142 included in the person information 100 in a state of also including the multi-face information 141 is the "successfully collated" (S1303).

When the collation state 111 or 146 of the high position face image included in the person information 100 is the "successfully collated" (S1303: YES), the management device 50 generates person collation information including at least the tracking ID 101, the "successfully collated", and the high position face image included in the person information 100 (S1304), and proceeds the process to step S1306.

When the collation state 111 or 146 of the high position face image included in the person information 100 is the "unsuccessfully collated" (S1303: YES), the management device 50 generates person collation information including at least the tracking ID 101, the "unsuccessfully collated", and the high position face image included in the person information 100 (S1305), and proceeds the process to step S1306.

The management device 50 determines whether the movement direction 112 of the person information 100 is the first direction or the second direction (S1306).

When the movement direction 112 of the person information 100 is the first direction (S1306: the first direction), the management device 50 transmits the person collation information generated in step S1304 or S1305 to the first edge device 41 (S1307), and completes the process. In this case, as shown in the collation result image 70C of FIG. 3, the first edge device 41 does not display the face image 220I on the clothes but displays the face image 220H (that is, the high position face image) of the person 1H on a display section of the first display device 31, and displays the collation result (that is, the result "successfully collated" or the result "unsuccessfully collated") included in the person collation information.

When the movement direction 112 of the person information 100 is the second direction (S1306: the second direction), the management device 50 transmits the person collation information generated in step S1304 or S1305 to the second edge device 42 (S1306), and completes the process. In this case, as shown in the collation result image 70C of FIG. 3, the second edge device 42 does not display the face image 220I on the clothes but displays the face image 220H (that is, the high position face image) of the person 1H on a display section of the second display device 32, and displays the collation result (that is, the result "successfully collated" or the result "unsuccessfully collated") included in the person collation information.

The contents of Embodiment 4 described above can be described as follows. That is, the management device 50 detects the position of each person 1 moving between the first gate 11 and the second gate 12, when the plurality of different face images 220 are detected within the predetermined range (for example, within the range of the body thickness threshold value W) based on the positions of the persons 1 moving in the first direction, causes the first display device 31 to display a collation result of the face image 220 located at the highest position, and when the plurality of different face images 220 are detected within the predetermined range (for example, within the range of the body thickness threshold value W) based on the positions of the persons 1 moving in the second direction, causes the second display device 32 to display a collation result of the face image 220 located at the highest position.

Accordingly, for example, even when the face image 220H of the person 1H and the face image 220I on the clothes, which is printed on the clothes of the person 1H, are detected, the management device 50 can correctly display the collation result of the face image 220H of the person 1H on the display device installed in the movement direction of the person 1H.

The contents of Embodiments 1 to 4 described above may be freely combined. For example, at least one of the content related to Embodiment 2, the content related to Embodiment 3, and the content related to Embodiment 4 may be combined with Embodiment 1. Further, the content of Embodiment 3 and the content of Embodiment 4 are similar to each other, and thus the contents may be achieved as the same process.

Modifications of Gate System

The configuration of the gate system 9 is not limited to the configuration shown in FIG. 1. Hereinafter, modifications of the configuration of the gate system 9 will be described.

Figure 29:
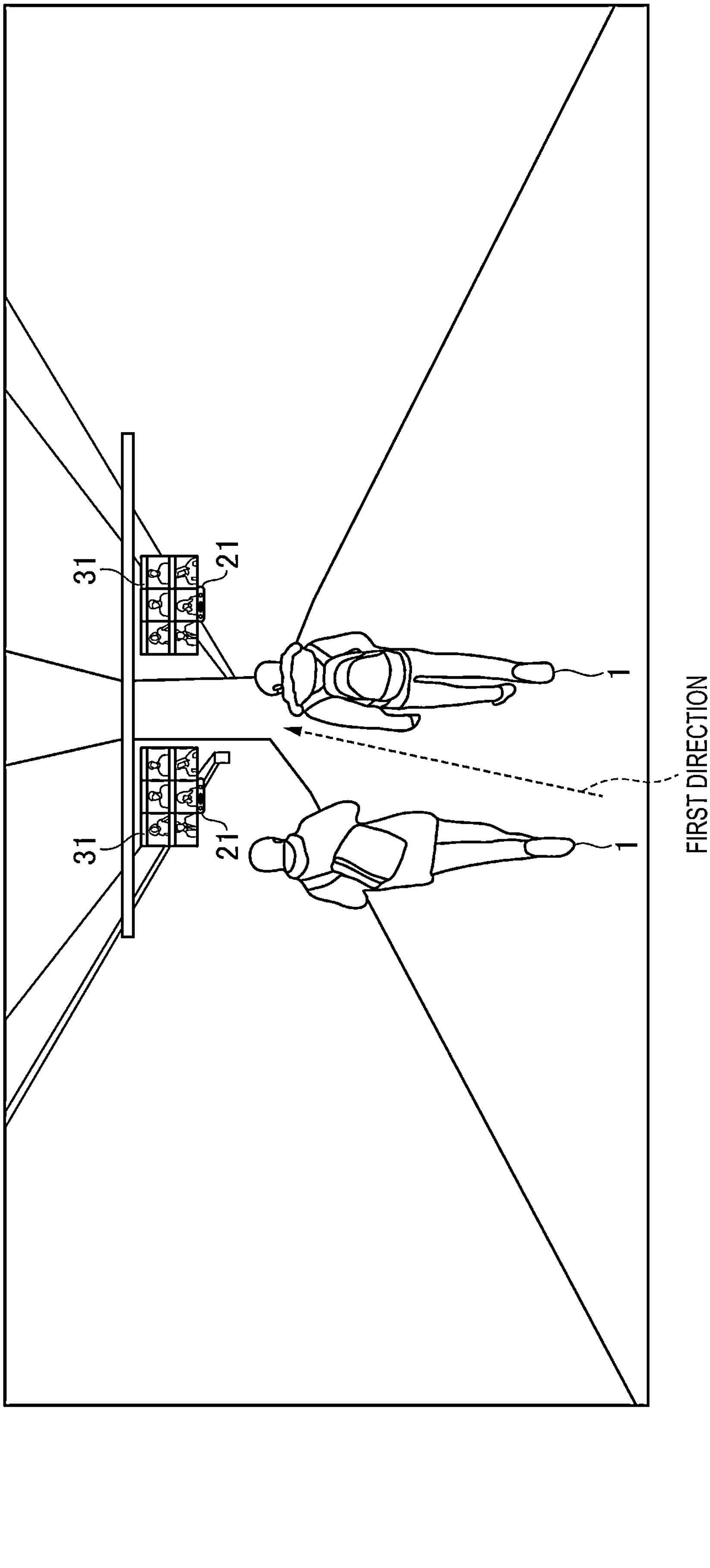
FIG. 29 is a diagram showing a first modification of the gate system according to the present disclosure.

FIG. 29 is a diagram showing a first modification of the gate system 9 according to the present disclosure.

As shown in FIG. 29, in a passage having a ceiling, the gate system 9 may include the first image capturing devices 21 and the first display devices 31, and the second image capturing devices 22 and the second display devices 32, which are suspended from the ceiling. In FIG. 29, the description of the second image capturing devices 22 and the second display devices 32 and the description of the persons 1 moving in the second direction are omitted.

Figure 30:
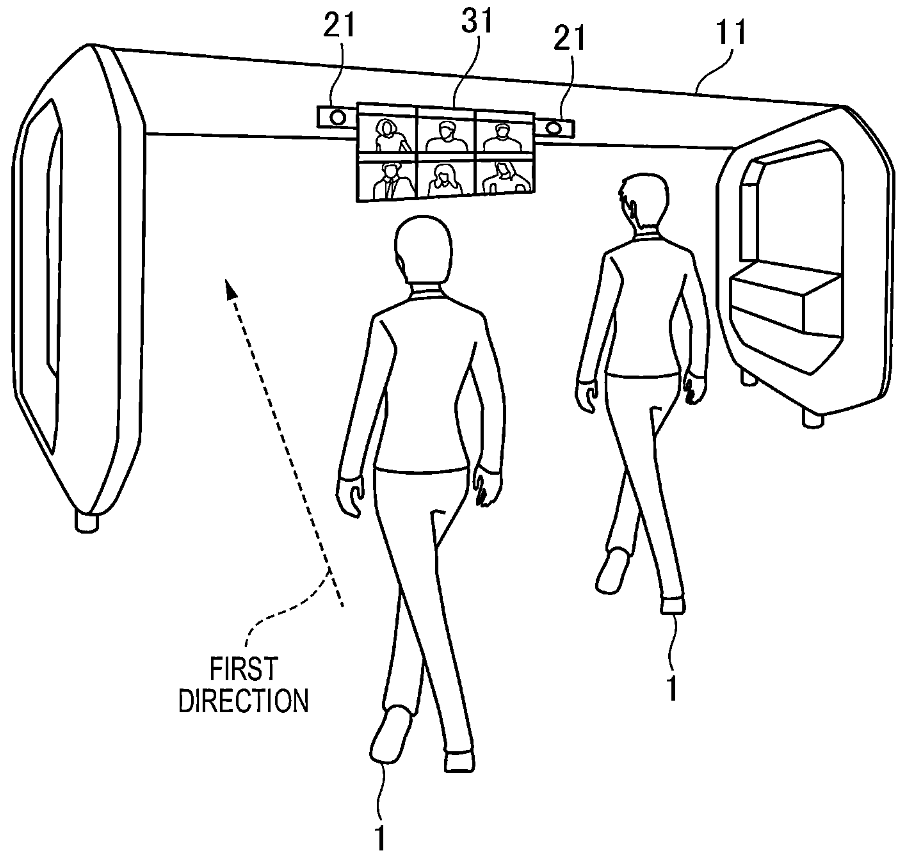
FIG. 30 is a diagram showing a second modification of the gate system according to the present disclosure.

FIG. 30 is a diagram showing a second modification of the gate system 9 according to the present disclosure.

As shown in FIG. 30, the gate system 9 has a tunnel-type configuration through which the persons 1 can pass, and may be an integrated device that includes the first image capturing devices 21, the first display device 31, the second image capturing devices 22, and the second display device 32 on a top surface of a tunnel. That is, the first gate 11 and the second gate 12 described above may be integrally configured. In FIG. 30, the description of the second image capturing devices 22 and the second display device 32 and the description of the persons 1 moving in the second direction are omitted. The tunnel-type gate system 9 may be fixedly installed or may be installed in any place in a movable manner.

Figure 31:
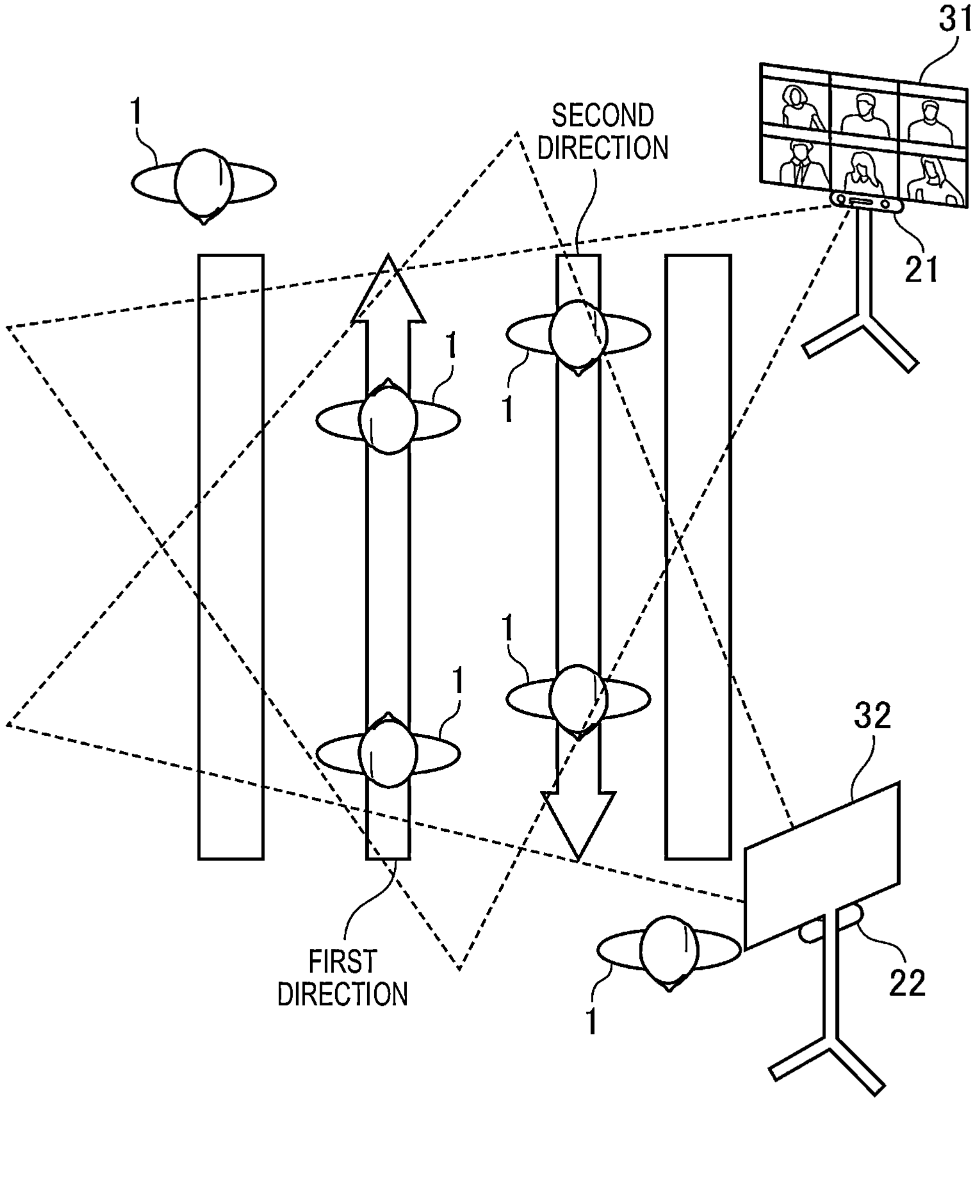
FIG. 31 is a diagram showing a third modification of the gate system according to the present disclosure.

FIG. 31 is a diagram showing a third modification of the gate system 9 according to the present disclosure.

As shown in FIG. 31, the gate system 9 does not necessarily need to have a gate shape through which the persons 1 pass, and may include a movable first set including the first image capturing device 21 and the first display device 31, and a movable second set including the second image capturing device 22 and the second display device 32. Then, the first set may be installed at a position in which the image of the face of the person 1 can be captured without interfering with the movement of the person 1 in the first direction, and the second set may be installed at a position in which the image of the face of the person 1 can be captured without interfering with the movement of the person 1 in the second direction.

Hardware Configuration

Figure 32:
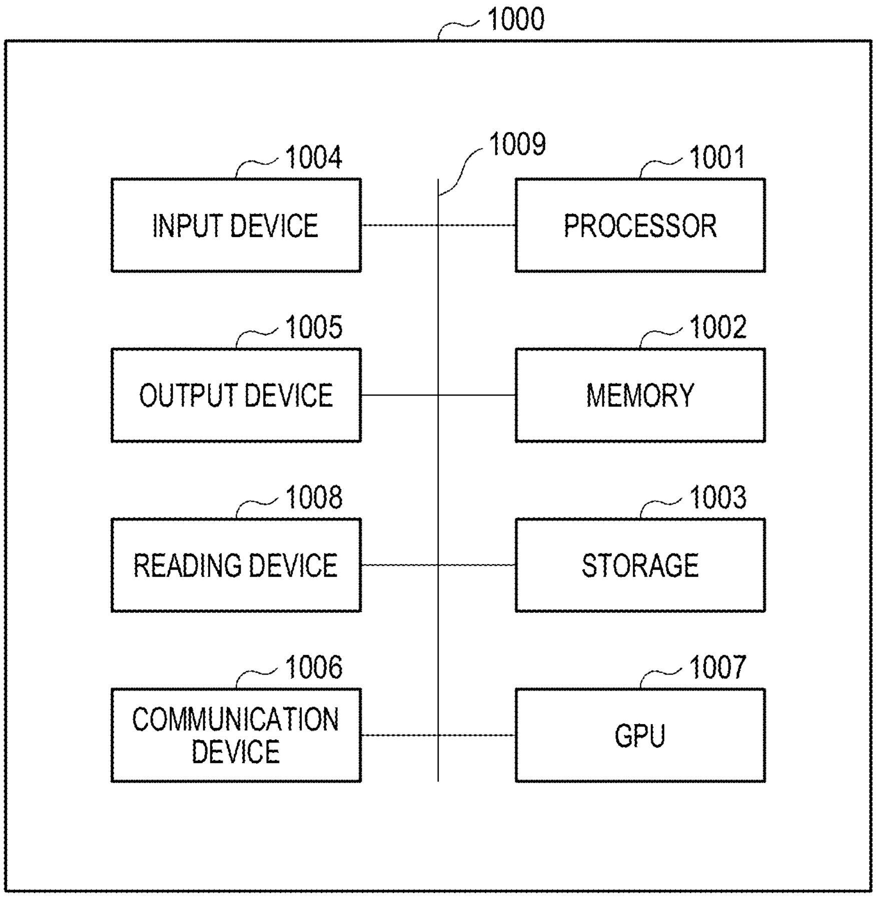
FIG. 32 is a diagram showing an example of a hardware configuration of a computer according to the present disclosure.

FIG. 32 is a diagram showing an example of a hardware configuration of a computer according to the present disclosure.

Each of the first edge device 41, the second edge device 42, the management device 50, and the face collation device 60 described above may include a computer 1000 shown in FIG. 32. The processes performed by the first edge device 41, the second edge device 42, the management device 50, and the face collation device 60 may be achieved by the computer 1000 shown in FIG. 32 executing computer programs.

The computer 1000 includes a processor 1001, the memory 1002, the storage 1003, an input device 1004, an output device 1005, a communication device 1006, a graphics processing unit (GPU) 1007, a reading device 1008, and a bus 1009. The processor 1001, the memory 1002, the storage 1003, the input device 1004, the output device 1005, the communication device 1006, the GPU 1007, and the reading device 1008 are connected to the bus 1009 and can transmit and receive data in both directions via the bus 1009.

The processor 1001 executes the computer programs stored in the memory 1002 to achieve the processes performed by the devices described above. Therefore, the processes performed by the devices described above can be read as processes mainly performed by the processor 1001. Examples of the processor 1001 include a central processing unit (CPU), a micro processing unit (MPU), a controller, a large scale integration (LSI), an application specific integrated circuit (ASIC), a programmable logic device (PLD), and a field-programmable gate array (FPGA).

The memory 1002 stores the computer programs and data handled by the computer 1000. The memory 1002 may include a read-only memory (ROM) and a random access memory (RAM). Further, the memory 1002 may be implemented by a volatile storage medium or a nonvolatile storage medium.

The storage 1003 is implemented by a nonvolatile storage medium, and stores the computer programs and data handled by the computer 1000. Examples of the storage 1003 include a hard disk drive (HDD), a solid state drive (SSD), and a flash memory.

The input device 1004 receives data to be input to the processor 1001. Examples of the input device 1004 include a keyboard, a mouse, a touch pad, and a microphone.

The output device 1005 outputs data generated by the processor 1001. Examples of the output device 1005 include a display and a speaker.

The communication device 1006 transmits and receives data to and from another device via the communication network 4. The communication device 1006 may include a transmitter that transmits data and a receiver that receives data. The communication device 1006 may support either wired communication or wireless communication.

The GPU 1007 is a device that processes image depiction at high speed. The GPU 1007 may be used for AI processing (for example, machine learning or deep learning).

The reading device 1008 is a device that reads data from an external recording medium such as a digital versatile disk read only memory (DVD-ROM) or a universal serial bus (USB) memory.

SUMMARY OF PRESENT DISCLOSURE

The contents of the present disclosure described above can be described as follows.

Item 1

The gate system 9 includes the first image capturing devices 21 that are capable of capturing the face of the person who moves in the first direction within the predetermined area (for example, the detection area 3) of the passage 2, the second image capturing devices 22 that are capable of capturing the face of the person who moves in the second direction opposite to the first direction within the predetermined area of the passage 2, the first display device 31 that has the screen which is visible to the person moving in the first direction, and the second display device 32 that has the screen which is visible to the person moving in the second direction. Each of the first image capturing devices 21 and the second image capturing devices 22 captures the face image of the person moving through the passage 2, the first display device 31 displays the collation result of the face image of the person moving in the first direction and does not display the collation result of the face image of the person moving in the second direction, and the second display device 32 displays the collation result of the face image of the person moving in the second direction and does not display the collation result of the face image of the person moving in the first direction.

Accordingly, it is possible to achieve the gate system 9 in which the collation result of the person 1 is displayed on the display device installed in the movement direction of the person 1, and the collation result of the person 1 is not displayed on the display device installed in the direction opposite to the movement direction of the person 1, and thus the collation results can be appropriately shown to the person 1 moving in the first direction and the person 1 moving in the second direction.

Item 2

In the gate system 9 according to item 1, the predetermined area may be at least a part of the area between the virtual first line and the virtual second line in the passage 2, the first direction may be a direction from the first line to the second line, and the second direction may be a direction from the second line to the first line.

Accordingly, it is possible to appropriately show the collation result to the person 1 moving between the first line and the second line.

Item 3

In the gate system 9 according to item 2, the width of each of the first line and the second line may be a width by which a plurality of persons 1 can pass side by side, and each of the first display device 31 and the second display device 32 may be capable of simultaneously displaying the collation results of the plurality of persons 1.

Accordingly, the plurality of persons 1 can be simultaneously collated, and the occurrence of congestion at the time of collation can be restrained.

Item 4

The gate system 9 according to item 2 or 3 may further include the management device 50. The management device 50 may detect the movement direction 112 of each person 1 moving between the first line and the second line, may cause the first display device 31 but not cause the second display device 32 to display the collation result of the face image 220 of the person 1 moving in the first direction, and may cause the second display device 32 but not cause the first display device 31 to display the collation result of the face image 220 of the person 1 moving in the second direction.

Accordingly, the collation result of the person 1 is displayed on the display device installed in the movement direction 112 of the person 1, and the collation result of the person 1 is not displayed on the display device installed in the direction opposite to the movement direction 112 of the person. Therefore, the management device 50 can appropriately show the collation result for each of the persons 1 moving in the first direction and the persons 1 moving in the second direction.

Item 5

In the gate system 9 according to any one of items 1 to 4, in a case in which there is the first person who moves between the first line and the second line, and whose face image is not capable of being acquired by the first image capturing devices 21 and the second image capturing devices 22, the management device 50 may cause the first display device 31 but not cause the second display device 32 to display the body image of the first person together with the warning information when the first person is moving in the first direction, and may cause the second display device 32 but not cause the first display device 31 to display the body image of the first person together with the warning information when the first person is moving in the second direction.

Accordingly, it is possible to display, on the display device that is visible to the person whose face image cannot be acquired, an image and information visually informing that the face image of the person cannot be acquired, and not to display the image and the information on the display device that is not visible to the person whose face image cannot be acquired.

Item 6

In the gate system 9 according to any one of items 1 to 5, the management device 50 may cause the second display device 32 to display the warning information when the face image 220 of the person 1 moving in the first direction is captured by the second image capturing devices 22, and may cause the first display device 31 to display the warning information when the face image 220 of the person 1 moving in the second direction is captured by the first image capturing devices 21.

Accordingly, the management device 50 can display, to the person 1 who moves backward, the warning information on the display device on the side on which the person 1 can visually confirm the warning information.

Item 7

In the gate system 9 according to any one of items 1 to 6, the management device 50 may detect the position of each person 1 moving between the first line and the second line, when the plurality of different face images 220 are detected within the predetermined range based on the positions of the persons 1 moving in the first direction and all the face images 220 of the plurality of different face images 220 are successfully collated, may cause the first display device 31 to display the collation result including all the face images 220 which are successfully collated, and when the plurality of different face images 220 are detected within the predetermined range based on the positions of the persons moving in the second direction and all the face images 220 of the plurality of different face images 220 are successfully collated, may cause the second display device 32 to display the collation result including all the face images 220 which are successfully collated.

Accordingly, for example, even when an face image 220E of the adult and the face image 220F of the child held by the adult 1F are detected and the face image 220F of the child is captured by the image capturing devices opposite to the movement direction 112, the management device 50 can cause the display device installed ahead of the movement direction to display both the face image 220E of the adult and the face image 220F of the child.

Item 8

In the gate system 9 according to any one of items 1 to 6, the management device 50 may detect the position of each person 1 moving between the first line and the second line, when the plurality of different face images 220 are detected within the predetermined range based on the positions of the persons 1 moving in the first direction and at least one face image 220 of the plurality of different face images 220 is successfully collated, may cause the first display device 31 to display the collation result including the at least one face image 220 which is successfully collated, and when the plurality of different face images 220 are detected within the predetermined range based on the positions of the persons 1 moving in the second direction and at least one face image 220 of the plurality of different face images 220 is successfully collated, may cause the second display device 32 to display the collation result including the at least one face image 220 which is successfully collated.

Accordingly, for example, even when the face image 220E of the adult and the face image 220F of the child held by the adult 1F are detected and one of the face images 220 is unsuccessfully collated, the management device 50 can cause the display device installed ahead of the movement direction to display the face image 220 which is successfully collated.

Item 9

In the gate system 9 according to item 7 or 8, when the face image 220 among the plurality of different face images 220 detected within the predetermined range based on the positions of the persons 1 moving in the first direction, which is unsuccessfully collated, is captured by the second image capturing devices 22, the management device 50 may not cause the second display device 32 to display the collation result including the face image 220 which is unsuccessfully collated, and when the face image 220 among the plurality of different face images 220 detected within the predetermined range based on the positions of the persons 1 moving in the second direction, which is unsuccessfully collated, is captured by the first image capturing devices 21, the management device 50 may not cause the first display device 31 to display the collation result including the face image 220 which is unsuccessfully collated.

Accordingly, for example, even when the face image 220E of the adult and the face image 220F of the child held by the adult 1F are detected, the face image 220F of the child is captured by the image capturing devices opposite to the movement direction 112 and is unsuccessfully collated, the management device 50 can cause the display device opposite to the movement direction to not display that the face image 220F of the child is unsuccessfully collated.

Item 10

In the gate system 9 according to any one of items 1 to 9, the management device 50 may detect the position of each person 1 moving between the first line and the second line, when the plurality of different face images 220 are detected within the predetermined range based on the positions of the persons 1 moving in the first direction, may cause the first display device 31 to display the collation result of the face image 220 located at the highest position, and when the plurality of different face images 220 are detected within the predetermined range based on the positions of the persons 1 moving in the second direction, may cause the second display device 32 to display the collation result of the face image 220 located at the highest position.

Accordingly, for example, even when the face image 220G of the person and the face image 220H on the clothes, which is printed on the clothes of the person 1, are detected, the management device 50 can correctly display the collation result of the face image 220G of the person on the display device installed in the movement direction of the person 1.

Item 11

In the gate system 9 according to any one of items 1 to 10, when the difference between the position of the person 1 included in the first image captured by the first image capturing devices 21 and the position of the person 1 included in the second image captured by the second image capturing devices 22 is smaller than the predetermined threshold value (W) based on the body thickness of the person 1, the management device 50 may estimate that the position of the person 1 included in the first image and the position of the person 1 included in the second image indicate the position of the same person.

Accordingly, for example, the management device 50 can estimate whether the first image acquired by capturing the front side of the person 1 and the second image acquired by capturing the rear side of the person 1 belong to the same person.

Item 12

In the gate system 9 according to item 11, when a component of the difference in a body thickness direction of the person is smaller than a predetermined first threshold value based on the body thickness of the person and a component of the difference in a body width direction of the person is smaller than a predetermined second threshold value, the management device 50 may estimate that the position of the person included in the first image and the position of the person included in the second image are the position of the same person.

Accordingly, for example, the management device 50 can estimate whether the first image acquired by capturing the front side of the person 1 and the second image acquired by capturing the rear side of the person 1 belong to the same person.

Item 13

In the gate system 9 according to item 11 or 12, when a time difference between a first time point at which the person included in the first image captured by the first image capturing devices 21 or the second image capturing devices 22 and a second time point at which the person included in the second image captured by the first image capturing devices 21 or the second image capturing devices 22 is smaller than a predetermined threshold value, the management device 50 may estimate that the position of the person included in the first image and the position of the person included in the second image indicate the position of the same person.

Accordingly, for example, the management device 50 can estimate whether the first image and the second image acquired by capturing the person 1 belong to the same person.

Item 14

The gate system 9 according to any one of items 2 to 13 may further include the first gate 11 provided on the first line, and the second gate 12 provided on the second line, the first image capturing devices 21 and the first display device 31 may be provided in the first gate 11, the second image capturing devices 22 and the second display device 32 may be provided in the second gate 12, the first direction may be a direction from the first gate 11 to the second gate 12, and the second direction may be a direction from the second gate 12 to the first gate 11.

Accordingly, it is possible to appropriately show the collation result to the person 1 moving between the first gate 11 and the second gate 12.

Item 15

The gate device 10 includes the first image capturing devices 21 that are capable of capturing the face of the person who moves in the first direction within the predetermined area (for example, the detection area 3) of the passage 2, the second image capturing devices 22 that are capable of capturing the face of the person who moves in the second direction opposite to the first direction within the predetermined area of the passage 2, the first display device 31 that has the screen which is visible to the person moving in the first direction, and the second display device 32 that has the screen which is visible to the person moving in the second direction. In a controlling method of the gate device 10, each of the first image capturing devices 21 and the second image capturing devices 22 captures the face image of the person moving through the passage 2, the first display device 31 displays the collation result of the face image of the person moving in the first direction and does not display the collation result of the face image of the person moving in the second direction, and the second display device 32 displays the collation result of the face image of the person moving in the second direction and does not display the collation result of the face image of the person moving in the first direction.

Accordingly, it is possible to achieve the controlling method of the gate device 10 in which the collation result of the person 1 is displayed on the display device installed in the movement direction of the person 1, and the collation result of the person 1 is not displayed on the display device installed in the direction opposite to the movement direction of the person 1, and thus the collation results can be appropriately shown to the person 1 moving in the first direction and the person 1 moving in the second direction.

Item 16

The gate device 10 includes the first image capturing devices 21 that are capable of capturing the face of the person who moves in the first direction within the predetermined area (for example, the detection area 3) of the passage 2, the second image capturing devices 22 that are capable of capturing the face of the person who moves in the second direction opposite to the first direction within the predetermined area of the passage 2, the first display device 31 that has the screen which is visible to the person moving in the first direction, and the second display device 32 that has the screen which is visible to the person moving in the second direction. A control program of the gate device 10 is executed so that the gate device 10 causes each of the first image capturing devices 21 and the second image capturing devices 22 to capture the face image of the person moving through the passage 2, causes the first display device 31 to display the collation result of the face image of the person moving in the first direction and not display the collation result of the face image of the person moving in the second direction, and causes the second display device 32 to display the collation result of the face image of the person moving in the second direction and not display the collation result of the face image of the person moving in the first direction.

Accordingly, it is possible to achieve the control program of the gate device 10 in which the collation result of the person 1 is displayed on the display device installed in the movement direction of the person 1, and the collation result of the person 1 is not displayed on the display device installed in the direction opposite to the movement direction of the person 1, and thus the collation results can be appropriately shown to the person 1 moving in the first direction and the person 1 moving in the second direction.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, the components in the embodiments described above may be freely combined without departing from the gist of the invention.

The present application is based on Japanese Patent Application No. 2022-121914 filed on Jul. 29, 2022, and the contents thereof are incorporated herein by reference.

What is claimed is:

1. A gate system comprising:

a first image capturing device capable of capturing an image of a face of a person who moves in a first direction within a predetermined area of a passage;

a second image capturing device capable of capturing an image of a face of a person who moves in a second direction opposite to the first direction within the predetermined area of the passage;

a first display device having a screen which is visible to the person moving in the first direction; and a second display device having a screen which is visible to the person moving in the second direction, wherein each of the first image capturing device and the second image capturing device captures a face image of the person moving through the passage, the first display device displays a collation result of the face image of the person moving in the first direction and does not display a collation result of the face image of the person moving in the second direction, and the second display device displays the collation result of the face image of the person moving in the second direction and does not display the collation result of the face image of the person moving in the first direction.

2. The gate system according to claim 1, wherein
the predetermined area is at least a part of an area between a virtual first line and a virtual second line in the passage,
the first direction is a direction from the first line to the second line, and
the second direction is a direction from the second line to the first line.

3. The gate system according to claim 2, wherein
a width of each of the first line and the second line is a width by which a plurality of persons can pass side by side, and
each of the first display device and the second display device is capable of simultaneously displaying collation results of the plurality of persons.

4. The gate system according to claim 2, further comprising:
a management device, wherein
the management device is configured to:
detect a movement direction of each person moving between the first line and the second line;
cause the first display device but does not cause the second display device to display the collation result of the face image of the person moving in the first direction; and
cause the second display device but does not cause the first display device to display the collation result of the face image of the person moving in the second direction.

5. The gate system according to claim 4, wherein
in a case where there is a first person who moves between the first line and the second line, and the face image of the first person is not capable of being acquired by the first image capturing device and the second image capturing device, the management device is configured to:
cause the first display device but does not cause the second display device to display a body image of the first person together with warning information when the first person is moving in the first direction; and
cause the second display device but does not cause the first display device to display the body image of the first person together with the warning information when the first person is moving in the second direction.

6. The gate system according to claim 4, wherein
the management device is configured to:
cause the second display device to display warning information when the face image of the person moving in the first direction is captured by the second image capturing device; and
cause the first display device to display the warning information when the face image of the person moving in the second direction is captured by the first image capturing device.

7. The gate system according to claim 4, wherein
the management device is configured to:
detect a position of each person moving between the first line and the second line;
when a plurality of different face images are detected within a predetermined range based on positions of persons moving in the first direction and all face images of the plurality of different face images are successfully collated, cause the first display device to display a collation result including all the face images which are successfully collated; and
when a plurality of different face images are detected within a predetermined range based on positions of persons moving in the second direction and all face images of the plurality of different face images are successfully collated, cause the second display device to display a collation result including all the face images which are successfully collated.

8. The gate system according to claim 7, wherein
the management device is configured:
when a face image among the plurality of different face images detected within the predetermined range based on the positions of the persons moving in the first direction, which is unsuccessfully collated, is captured by the second image capturing device, not to cause the second display device to display a collation result including the face image which is unsuccessfully collated; and
when a face image among the plurality of different face images detected within the predetermined range based on the positions of the persons moving in the second direction, which is unsuccessfully collated, is captured by the first image capturing device, not to cause the first display device to display a collation result including the face image which is unsuccessfully collated.

9. The gate system according to claim 7, wherein
when a difference between a position of a person included in a first image captured by the first image capturing device and a position of a person included in a second image captured by the second image capturing device is smaller than a predetermined threshold value based on a body thickness of the person, the management device estimates that the position of the person included in the first image and the position of the person included in the second image indicate the position of the same person.

10. The gate system according to claim 9, wherein
the management device is configured to:
when a component of the difference in a body thickness direction of the person is smaller than a predetermined first threshold value based on the body thickness of the person and a component of the difference in a body width direction of the person is smaller than a predetermined second threshold value, estimate that the position of the person included in the first image and the position of the person included in the second image are the position of the same person.

11. The gate system according to claim 9, wherein
the management device is configured to:
when a time difference between a first time point at which a person included in a first image captured by the first image capturing device or the second image capturing device and a second time point at which a person included in a second image captured by the first image capturing device or the second image capturing device is smaller than a predetermined threshold value, estimate that a position of the person included in the first image and a position of the person included in the second image indicate the position of the same person.

12. The gate system according to claim 4, wherein
the management device is configured to:
detect a position of each person moving between the first line and the second line;
when a plurality of different face images are detected within a predetermined range based on positions of persons moving in the first direction and at least one face image of the plurality of different face images is successfully collated, cause the first display device to display a collation result including the at least one face image which is successfully collated; and when a plurality of different face images are detected within a predetermined range based on positions of persons moving in the second direction and at least one face image of the plurality of different face images is successfully collated, cause the second display device to display a collation result including the at least one face image which is successfully collated.

13. The gate system according to claim 4, wherein the management device is configured to:

detect a position of each person moving between the first line and the second line;

when a plurality of different face images are detected within a predetermined range based on positions of persons moving in the first direction, cause the first display device to display a collation result of a face image located at the highest position; and when a plurality of different face images are detected within a predetermined range based on positions of persons moving in the second direction, cause the second display device to display a collation result of a face image located at the highest position.

14. The gate system according to claim 2, further comprising:

a first gate provided on the first line; and a second gate provided on the second line, wherein the first image capturing device and the first display device are provided in the first gate, the second image capturing device and the second display device are provided in the second gate, the first direction is a direction from the first gate to the second gate, and the second direction is a direction from the second gate to the first gate.

15. A gate device controlling method, wherein the gate device includes:

a first image capturing device capable of capturing an image of a face of a person who moves in a first direction within a predetermined area of a passage;

a second image capturing device capable of capturing an image of a face of a person who moves in a second direction opposite to the first direction within the predetermined area of the passage;

a first display device having a screen which is visible to the person moving in the first direction; and a second display device having a screen which is visible to the person moving in the second direction, the gate device controlling method comprises:

capturing a face image of the person moving through the passage by each of the first image capturing device and the second image capturing device;

displaying a collation result of the face image of the person moving in the first direction on the first display device and not displaying a collation result of the face image of the person moving in the second direction on the first display device; and displaying the collation result of the face image of the person moving in the second direction on the second display device and not displaying the collation result of the face image of the person moving in the first direction on the second display device.

16. A non-transitory computer readable medium storing a control program of a gate device causing the gate device to execute a process, wherein the gate device includes:

a first image capturing device capable of capturing an image of a face of a person who moves in a first direction within a predetermined area of a passage;

a second image capturing device capable of capturing an image of a face of a person who moves in a second direction opposite to the first direction within the predetermined area of the passage;

a first display device having a screen which is visible to the person moving in the first direction; and a second display device having a screen which is visible to the person moving in the second direction, the process comprises:

capturing a face image of the person moving through the passage by each of the first image capturing device and the second image capturing device;

displaying a collation result of the face image of the person moving in the first direction on the first display device and not displaying a collation result of the face image of the person moving in the second direction on the first display device; and displaying the collation result of the face image of the person moving in the second direction on the second display device and not display the collation result of the face image of the person moving in the first direction on the second display device.

* * * * *